(12) United States Patent
Xiao et al.

(10) Patent No.: US 9,814,015 B2
(45) Date of Patent: Nov. 7, 2017

(54) POSITIONING METHOD, POSITIONING SERVER, TERMINAL AND BASE STATION

(71) Applicant: Huawei Technologies Co., Ltd., Shenzhen, Guangdong (CN)

(72) Inventors: Dengkun Xiao, Beijing (CN); Jie Cui, Beijing (CN); Anjian Li, Beijing (CN); Jing Han, Beijing (CN); Yuan He, Shenzhen (CN); Tong Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 143 days.

(21) Appl. No.: 14/333,239

(22) Filed: Jul. 16, 2014

(65) Prior Publication Data
US 2014/0349677 A1  Nov. 27, 2014

Related U.S. Application Data

(63) Continuation of application No. PCT/CN2013/070501, filed on Jan. 16, 2013.

(30) Foreign Application Priority Data

Jan. 16, 2012 (CN) .......................... 2012 1 0013759

(51) Int. Cl.
*H04M 1/00* (2006.01)
*H04W 64/00* (2009.01)
(Continued)

(52) U.S. Cl.
CPC ......... *H04W 64/003* (2013.01); *G01S 5/0215* (2013.01); *G01S 5/0221* (2013.01);
(Continued)

(58) Field of Classification Search
CPC ....... H04W 64/00; H04W 4/02; H04W 88/08; H04W 4/22; H04W 52/0206
(Continued)

(56) References Cited

U.S. PATENT DOCUMENTS

2009/0325625 A1*  12/2009  Hugl ..................... H04W 52/16
                                                            455/522
2010/0120435 A1   5/2010  Mia et al.
(Continued)

FOREIGN PATENT DOCUMENTS

CN        101969694 A       2/2011
WO     WO 2011099909 A1    8/2011

OTHER PUBLICATIONS

"3$^{rd}$ Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.4.0, pp. 1-296, 3$^{rd}$ Generation Partnership Project, Valbonne, France (Dec. 2011).
(Continued)

*Primary Examiner* — Joseph Arevalo
(74) *Attorney, Agent, or Firm* — Leydig, Voit & Mayer, Ltd.

(57) ABSTRACT

Embodiments of the present invention provide a positioning method, a positioning server, a terminal and a base station. The positioning method includes: notifying a terminal of difference threshold information; receiving cell subset information that is determined by the terminal according to the difference threshold information, where the cell subset information is used to indicate a cell pair whose reference signal measured value exceeds the difference threshold, or the cell subset information is used to indicate a cell pair whose reference signal measured value does not exceed the difference threshold; determining a configuration of a PRS according to the cell subset information, and notifying the
(Continued)

terminal of the configuration of the PRS; and receiving an RSTD that is obtained by the terminal through measurement according to the configuration of the PRS, and determining a location of the terminal according to the RSTD.

7 Claims, 13 Drawing Sheets

(51) Int. Cl.
*H04W 4/02* (2009.01)
*G01S 5/02* (2010.01)
*G01S 5/10* (2006.01)

(52) U.S. Cl.
CPC .............. *G01S 5/0226* (2013.01); *G01S 5/10* (2013.01); *H04W 4/02* (2013.01); *H04W 64/00* (2013.01)

(58) Field of Classification Search
USPC ....... 370/252, 332, 330, 328, 280, 311, 329; 455/456.1, 522, 404.2, 456.5, 456.6
See application file for complete search history.

(56) References Cited

U.S. PATENT DOCUMENTS

| | | | |
|---|---|---|---|
| 2010/0195566 A1* | 8/2010 | Krishnamurthy | H04L 5/0007 370/328 |
| 2010/0317343 A1 | 12/2010 | Krishnamurthy et al. | |
| 2010/0323720 A1* | 12/2010 | Jen | H04B 7/2606 455/456.1 |
| 2011/0039577 A1* | 2/2011 | Stern-Berkowitz | G01S 5/0205 455/456.1 |
| 2011/0189944 A1* | 8/2011 | Wang | H04B 7/155 455/7 |
| 2011/0205914 A1 | 8/2011 | Krishnamurthy et al. | |
| 2012/0149392 A1* | 6/2012 | Siomina | H04W 64/00 455/456.1 |
| 2012/0208566 A1* | 8/2012 | Siomina | G01S 5/0236 455/456.5 |
| 2014/0141792 A1* | 5/2014 | Larsson | H04W 64/00 455/452.1 |
| 2014/0349677 A1* | 11/2014 | Xiao | H04W 4/02 455/456.1 |
| 2015/0131749 A1* | 5/2015 | Slomina | H04J 11/005 375/260 |
| 2015/0350941 A1* | 12/2015 | You | H04W 48/12 370/252 |

OTHER PUBLICATIONS

"3$^{rd}$ Generation Partnership Project; Technical Specification Group Radio Access Network; Evolved Universal Terrestrial Radio Access (E-UTRA); LTE Positioning Protocol (LPP) (Release 10)," 3GPP TS 36.355, V10.4.0, pp. 1-116, 3$^{rd}$ Generation Partnership Project, Valbonne, France (Dec. 2011).

"3$^{rd}$ Generation Partnership Project; Technical Specification Group Radio Access Network; Evolved Universal Terrestrial Radio Access (E-UTRA); LTE Positioning Protocol A (LPPa) (Release 10)," 3GPP TS 36.455, V10.2.0, pp. 1-52, 3$^{rd}$ Generation Partnership Project, Valbonne, France (Sep. 2011).

"Positioning with LTE," Ericsson White Paper, 284 23-3155 Uen, pp. 1-12, Telefonaktiebolaget L. M. Ericsson, Stockholm, Sweden (Sep. 2011).

Wigren et al, "Enhanced WCDMA Fingerprinting Localization Using OTDOA Positioning Measurements from LTE," 2012 IEEE Vehicular Technology Conference, pp. 1-5, Institute of Electrical and Electronics Engineers, New York, New York (Sep. 3-6, 2012).

\* cited by examiner

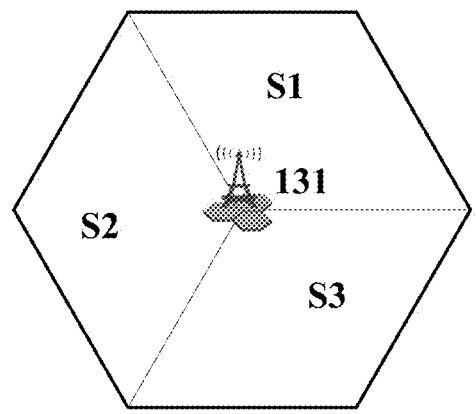
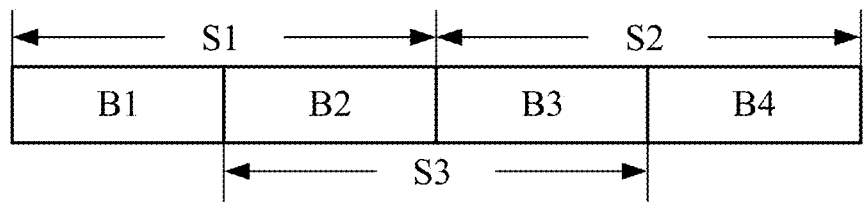
FIG. 13
| Determine configurations of PRSs of a first cell, a second cell and a third cell that are controlled by a base station, so that when any one cell transmits a PRS, other cells do not transmit a service signal on a frequency band overlapped with that of the cell | ⟋ 1401 |
↓
| Transmit the PRS to a terminal on the cell according to a configuration of the PRS | ⟋ 1402 |
FIG. 14

POSITIONING METHOD, POSITIONING SERVER, TERMINAL AND BASE STATION

CROSS-REFERENCE TO RELATED APPLICATIONS

This application is a continuation of International Patent Application No. PCT/CN2013/070501, filed on Jan. 16, 2013, which claims priority to Chinese Patent Application No. CN 201210013759.4, filed on Jan. 16, 2012, both of which are incorporated herein by reference in their entireties.

TECHNICAL FIELD

Embodiments of the present invention relate to the field of wireless communications, and in particular, to a positioning method, a positioning server, a terminal and a base station.

BACKGROUND

A positioning technology is a technology adopted in order to determine a geographic location of a mobile station, and location information of the mobile station may be directly or indirectly obtained by utilizing a resource of a wireless communication network. Standard terminal positioning manners adopted in LTE (long term evolution) include the following three types: network assisted GNSS (global navigation satellite system) positioning; downlink positioning, or referred to as an OTDOA (observed time difference of arrival) manner; and e-CID (enhanced cell identification) positioning.

A mobile station positioning algorithm of the LTE may generally estimate a geometrical location of a mobile terminal by detecting characteristic parameters (such as signal field strength, propagated signal time difference of arrival, and signal direction angle of arrival) of a signal propagated through a radio wave between the mobile station and a base station, and then according to a relevant positioning algorithm. A GNSS positioning method requires that a terminal has a wireless receiver for receiving a GNSS signal, and specific implementation of the GNSS includes GPS (global positioning system) positioning, Galileo positioning, and the like. Both downlink positioning and e-CID positioning belong to a network positioning type, mainly depend on detection of a characteristic parameter of a radio resource in a mobile communication system, then estimate a location of a mobile station according to a positioning algorithm, and are a current research hotspot. With OTDOA positioning, downlink PRSs (positioning reference signal) are received from a plurality of base stations by utilizing a mobile station, measurement is performed at a fixed time, a PRS time difference of arrival between base stations is reported, and calculation is performed on a network positioning server to obtain a geographic location of the mobile station.

Currently, with continuous development of mobile communications technologies, demands for a positioning service are also increased day by day. Application scenarios of the positioning service are on a diversified trend, such as positioning of help seeking in emergency, crime location tracking, navigation and transportation control. However, no matter how the application scenarios are diversified, for demands for positioning, the industry always intends to obtain a reliable, effective, and rapid method; and in other words, a positioning technology that is easy to implement with high precision is a hotspot that people always chase after.

The OTDOA is a common positioning technology, and its principle is: when three or more than three base stations exist in a system, a location of a terminal may be determined according to a time difference of arrival between downlink transmission signals of different base stations. The downlink transmission signals may be reference signals, and may also be synchronization signals. In the LTE, the OTDOA positioning serves as a network assisted terminal positioning technology. After a network side e-SMLC (enhanced serving mobile location center) designates a sending and receiving configuration of a positioning reference signal (PRS) for a base station and a mobile station, the base station sends a PRS in the downlink, and the mobile station receives PRSs from a plurality of positioning base stations, identifies a first arrival path location of each PRS, may obtain a PRS time difference of arrival between different base stations, and reports the PRS time difference of arrival to the e-SMLC. The e-SMLC receives a signal time difference between different base stations through the mobile station, the signal time difference may be mapped into a distance difference between the mobile station and different base stations, and the e-SMLC may obtain an accurate location of the mobile station through mathematical calculation of a hyperbolic model. The OTDOA positioning has an advantage of highly precise positioning, and may be used to position a mobile station of a non-line-of-sight network.

However, the precision of the OTDOA positioning depends on estimation for reception and a first arrival path of a PRS signal to a large extent. Compared with the GPS, the OTDOA may complete terminal positioning in part of dense urban areas or indoor area scenarios, but because a time difference of arrival of a signal needs to be estimated and wireless propagation environments of both a dense urban area and an indoor area influence a multipath of the signal, the OTDOA cannot truly reflect a difference between straight line distances from two base stations to a UE, and in this way, a positioning error is increased. Furthermore, a situation that a downlink PRS is interfered greatly influences positioning precision, and therefore, what is discussed in a current standard is that a PRS is sent in a low interference subframe, that is, except an RE (resource element) of the PRS, an RE of a CRS (cell-specific reference signal) and a public channel, no RE of a data channel exists in a subframe of the PRS. However, A PRS pattern is shifted according to PCI (physical cell identifier) Mod 6 in a frequency domain, and therefore, when values of PCI Mod 6 of two cells are equal, co-channel interference exists between PRSs of the two cells. Therefore, muting is introduced into the Rel-9 protocol, and interference is avoided through separation in a time domain. However, the muting wastes an opportunity that a terminal receives a plurality of PRS time domain signals, and the positioning precision is influenced somewhat. Additionally, if values the PCI Mod 6 of the PRSs are different, although the PRSs of the two cells are mapped into different REs, when a difference between SNRs (signal to noise ratio) of the PRSs of the two cells is excessively large, orthogonality between different REs may be damaged, thereby causing that PRS interference between the different REs is generated, as shown in the following:

| $\Delta$SNR | Length of Search Window | RSTD Error (Ts) |
|---|---|---|
| 10 dB | 320 Ts | 0.5 |
| 20 dB | 320 Ts | 0.5 |
| 30 dB | 320 Ts | 1.1 |

-continued

| ΔSNR | Length of Search Window | RSTD Error (Ts) |
|---|---|---|
| 35 dB | 320 Ts | 1.8 |
| 40 dB | 320 Ts | 130 | where RSTD represents a reference signal time difference, Ts represents a minimal time unit in an LTE system, and 1 Ts=1/(2048×15000) seconds.

When a PRS SNR difference between two cells (different PCIs) is greater than 30 dB, an RSTD (reference signal time difference) estimation error demand of the rel-9 cannot be satisfied. It is found through system-level simulation that, a situation that this difference is greater than 30 dB is not a small probability event, and therefore, current OTDOA muting needs to be enhanced, so as to cancel interference caused by PRSs of different REs.

SUMMARY

Embodiments of the present invention provide a positioning method, a positioning server, a terminal and a base station, so that interference between positioning reference signals can be reduced.

In one aspect, a positioning method is provided and includes: notifying a terminal of difference threshold information, where the difference threshold information is used to indicate a difference threshold of a reference signal measured value of two cells in a cell pair; receiving cell subset information that is determined by the terminal according to the difference threshold information, where the cell subset information is used to indicate a cell pair whose reference signal measured value exceeds the difference threshold, or the cell subset information is used to indicate a cell pair whose reference signal measured value does not exceed the difference threshold; determining a configuration of a PRS according to the cell subset information, and notifying the terminal of the configuration of the PRS; and receiving a reference signal time difference RSTD that is obtained by the terminal through measurement according to the configuration of the PRS, and determining a location of the terminal according to the RSTD.

In another aspect, a positioning method is provided and includes: receiving difference threshold information notified by a positioning server, where the difference threshold information is used to indicate a difference threshold of a reference signal measured value of two cells in a cell pair; determining cell subset information according to the difference threshold information and sending the cell subset information to the positioning server, where the cell subset information is used to indicate a cell pair whose reference signal measured value difference exceeds the difference threshold, or the cell subset information is used to indicate a cell pair whose reference signal measured value difference does not exceed the difference threshold; receiving a configuration of a positioning reference signal PRS, where the configuration of the positioning reference signal PRS is determined by the positioning server according to the cell subset information; and obtaining a reference signal time difference RSTD through measurement according to the configuration of the PRS, and sending the RSTD to the positioning server.

In another aspect, a positioning method is provided and includes: receiving allocation information sent by a positioning server; adjusting a configuration of a positioning reference signal PRS according to the allocation information; feeding back the adjusted configuration of the PRS to the positioning server; and transmitting the PRS to a terminal according to the adjusted configuration of the PRS.

In another aspect, a positioning method is provided and includes: exchanging, with a terminal, positioning capability information that the terminal supports performing of positioning measurement according to a plurality of RATs; determining a first RAT whose load is the lightest among the plurality of RATs; sending allocation information to a base station, where the allocation information is used to instruct the base station to transmit a positioning reference signal PRS to the terminal in the first RAT, and receiving a configuration of the PRS fed back by the base station; notifying the terminal of the configuration of the PRS; and receiving an RSTD that is obtained by the terminal through measurement according to the configuration of the PRS, and determining a location of the terminal according to the RSTD.

In another aspect, a positioning method is provided and includes: exchanging, with a positioning server, positioning capability information that a terminal supports performing of positioning measurement according to a plurality of RATs, so that the positioning server determines a first RAT whose load is the lightest among the plurality of RATs; receiving a configuration of a PRS notified by the positioning server, where the configuration of the PRS indicates that a base station transmits the PRS by using the first RAT; and obtaining an RSTD through measurement according to the configuration of the PRS, and sending the RSTD to the positioning server.

In another aspect, a positioning method is provided and includes: determining configurations of PRSs of a first cell, a second cell and a third cell that are controlled by a base station, where a bandwidth of the base station is divided into a first frequency band, a second frequency band, a third frequency band and a fourth frequency band, the first cell uses the first frequency band and the second frequency band, the second cell uses the third frequency band and the fourth frequency band, and the third cell uses the second frequency band and the third frequency band, so that when any one of the first cell, the second cell and the third cell transmits a PRS, other cells do not transmit a service signal on a frequency band overlapped with that of the one cell; and transmitting the PRS to a terminal on the one cell according to a configuration of the PRS.

In another aspect, a positioning server is provided and includes a transceiver and a processor. The transceiver is configured to notify a terminal of difference threshold information, where the difference threshold information is used to indicate a difference threshold of a reference signal measured value of two cells in a cell pair; the transceiver is configured to receive cell subset information that is determined by the terminal according to the difference threshold information, where the cell subset information is used to indicate a cell pair whose reference signal measured value exceeds the difference threshold, or the cell subset information is used to indicate a cell pair whose reference signal measured value does not exceed the difference threshold; the processor is configured to determine a configuration of a PRS according to the cell subset information; the transceiver is configured to notify the terminal of the configuration of the PRS; the transceiver is configured to receive an RSTD that is obtained by the terminal through measurement according to the configuration of the PRS; and the processor is configured to determine a location of the terminal according to the RSTD.

In another aspect, a terminal is provided and includes a transceiver and a processor. The transceiver is configured to receive difference threshold information notified by a positioning server, where the difference threshold information is used to indicate a difference threshold of a reference signal measured value of two cells in a cell pair; the processor is configured to determine cell subset information according to the difference threshold information, where the cell subset information is used to indicate a cell pair whose reference signal measured value difference exceeds the difference threshold, or the cell subset information is used to indicate a cell pair whose reference signal measured value difference does not exceed the difference threshold; the transceiver is configured to send the cell subset information to the positioning server, and receive a configuration of a PRS, where the configuration of the PRS is determined by the positioning server according to the cell subset information; the processor is configured to obtain an RSTD through measurement according to the configuration of the PRS; and the transceiver is configured to send the RSTD to the positioning server.

In another aspect, a base station is provided and includes a transceiver and a processor. The transceiver is configured to receive allocation information sent by a positioning server; the processor is configured to adjust a configuration of a PRS according to the allocation information; the transceiver is configured to feed back the adjusted configuration of the PRS to the positioning server; and the transceiver is configured to transmit the PRS to a terminal according to the adjusted configuration of the PRS.

In another aspect, a positioning server is provided and includes a transceiver and a processor. The transceiver is configured to exchange, with a terminal, positioning capability information that the terminal supports performing of positioning measurement according to a plurality of RATs; the processor is configured to determine a first RAT whose load is the lightest among the plurality of RATs; the transceiver is configured to send allocation information to a base station, where the allocation information is used to instruct the base station to transmit a PRS to the terminal in the first RAT, and receive a configuration of the PRS fed back by the base station; the transceiver is configured to notify the terminal of the configuration of the PRS; the transceiver is configured to receive an RSTD that is obtained by the terminal through measurement according to the configuration of the PRS; and the processor is configured to determine a location of the terminal according to the RSTD.

In another aspect, a terminal is provided and includes a transceiver and a processor. The transceiver is configured to exchange, with a positioning server, positioning capability information that the terminal supports performing of positioning measurement according to a plurality of RATs, so that the positioning server determines a first RAT whose load is the lightest among the plurality of RATs; the transceiver is configured to receive a configuration of a PRS notified by the positioning server, where in the configuration of the PRS, a base station transmits the PRS by using the first RAT; the processor is configured to obtain an RSTD through measurement according to the configuration of the PRS; and the transceiver is configured to send the RSTD to the positioning server.

In another aspect, a base station is provided and includes a transceiver and a processor. The processor is configured to determine configurations of PRSs of a first cell, a second cell and a third cell that are controlled by the base station, where a bandwidth of the base station is divided into a first frequency band, a second frequency band, a third frequency band and a fourth frequency band, the first cell uses the first frequency band and the second frequency band, the second cell uses the third frequency band and the fourth frequency band, and the third cell uses the second frequency band and the third frequency band, so that when any one of the first cell, the second cell and the third cell transmits a PRS, other cells do not transmit a PDSCH service signal on a frequency band overlapped with that of the one cell; and the transceiver is configured to transmit the PRS to a terminal on the one cell according to a configuration of the PRS.

In the embodiments of the present invention, a difference threshold of a reference signal measured value is set, thereby avoiding that a measured value difference of PRSs is excessively large, and reducing interference between the PRSs.

BRIEF DESCRIPTION OF DRAWINGS

To describe the technical solutions in the embodiments of the present invention more clearly, the accompanying drawings required for describing the embodiments are introduced briefly in the following. Apparently, the accompanying drawings in the following description show only some embodiments of the present invention, and a person of ordinary skill in the art can also derive other drawings from these accompanying drawings without creative efforts.

FIG. 13 is a schematic diagram of a scenario to which an embodiment of the present invention is applicable;

FIG. 14 is a flow chart of a positioning method according to another embodiment of the present invention;

DESCRIPTION OF EMBODIMENTS

The technical solutions in the embodiments of the present invention are clearly and completely described in the following with reference to the accompanying drawings in the embodiments of the present invention. Apparently, the embodiments to be described are only a part rather than all of the embodiments of the present invention. All other embodiments obtained by a person of ordinary skill in the art based on the embodiments of the present invention without creative efforts shall fall within the protection scope of the present invention.

Figure 1:
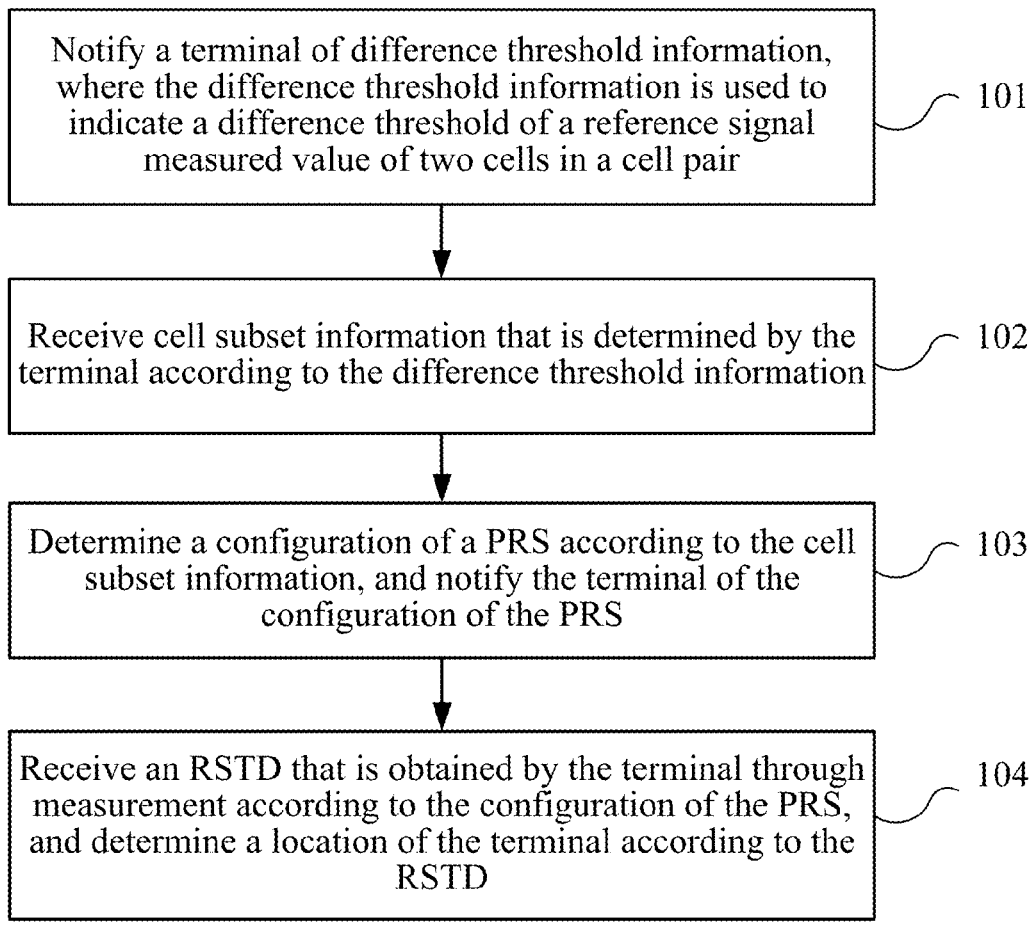
FIG. 1 is a flow chart of a positioning method according to an embodiment of the present invention.

FIG. 1 is a flow chart of a positioning method according to an embodiment of the present invention. The method shown in FIG. 1 is executed by a positioning server (such as an e-SMLC).

101: Notify a terminal of difference threshold information, where the difference threshold information is used to indicate a difference threshold of a reference signal measured value of two cells in a cell pair.

For example, a reference signal may be a CRS (cell-specific reference signal), a PRS or another proper reference signal. A measured value may be received power, such as CRS received power RSRP (reference signal receiving power) and PRP (PRS received power); and the measured value may also be a value of another type, such as SNR.

Optionally, as an embodiment, the difference threshold information may include at least one of the following: a threshold of an RSRP difference of the two cells, a threshold of a CRS SNR difference of the two cells, a threshold of a PRP difference of the two cells and a first mapping factor, and a threshold of a PRS SNR difference of the two cells and a second mapping factor. The first mapping factor $\alpha_1$ represents a mapping factor between an RSRP difference $\Delta P_{crs}$ and a PRP difference $\Delta P_{prs}$, and the second mapping factor $\alpha_2$ represents a mapping factor between a CRS SNR difference $\Delta S_{crs}$ and a PRS SNR difference $\Delta S_{prs}$.

A type of a mapping factor is not limited in the embodiment of the present invention. For example, the first mapping factor may be $\alpha_1=\Delta P_{prs}/\Delta P_{crs}$, or $\alpha_1=\Delta P_{crs}/\Delta P_{prs}$. The second mapping factor may be $\alpha_2=\Delta S_{prs}/\Delta S_{crs}$, or $\alpha_2=\Delta S_{crs}/\Delta S_{prs}$. The positioning server may determine a value of a mapping factor in advance, for example, determine a mapping factor according to a simulation manner, an experiment manner or other manners.

In step 101, the positioning server may notify the terminal of the difference threshold information in various manners, which is not limited in the embodiment of the present invention. Optionally, as an embodiment, the positioning server may carry the difference threshold information in a message for requesting the terminal to report a capability. Or, the positioning server may carry the difference threshold information in a message for requesting the terminal to perform positioning measurement. Or, the positioning server may carry the difference threshold information in assistance data that is sent to the terminal and used to help the terminal perform positioning measurement. Or, the positioning server may send the difference threshold information to a serving base station of the terminal, so that the serving base station sends the difference threshold information to the terminal through a broadcast message or an RRC (radio resource control) message.

102: Receive cell subset information that is determined by the terminal according to the difference threshold information. The cell subset information is used to indicate a cell pair whose reference signal measured value exceeds the difference threshold, or the cell subset information is used to indicate a cell pair whose reference signal measured value does not exceed the difference threshold.

A manner of receiving the cell subset information is not limited in the embodiment of the present invention. Optionally, as an embodiment, the positioning server may receive the cell subset information that is carried by the terminal in a message for reporting a capability. Or, the positioning server may receive the cell subset information that is carried by the terminal in a message for requesting assistance data.

A form of the cell subset information is not limited in the embodiment of the present invention. Optionally, as an embodiment, the cell subset information may include a cell pair list, namely, a list formed by cell identifiers of two cells in a cell pair. For example, the cell subset information may include a list of a cell pair whose reference signal measured value difference exceeds the difference threshold, or the cell subset information includes a list of a cell pair whose reference signal measured value difference does not exceed the difference threshold.

Optionally, as another embodiment, the cell subset information may include a cell list for a current investigated cell, namely, a list formed by an identifier of a cell, a reference signal measured value between which and the current investigated cell satisfies a certain condition. For example, the cell subset information may include a list of a cell, a reference signal measured value difference between which and the current investigated cell exceeds the difference threshold, or the cell subset information may include a list of a cell, a reference signal measured value difference between which and the current investigated cell does not exceed the difference threshold.

Specific forms of "cell identifiers" in the various lists are not limited in the embodiment of the present invention. For example, the cell identifier may be a PCI, CGI (cell global identity) or an ECGI (E-UTRAN cell global identity).

Optionally, as another embodiment, in addition to the foregoing cell list, the cell subset information may further include at least one of the following: difference information of the reference signal measured value, a cell frequency point, and a cell carrier number. For example, when the cell subset information indicates a cell pair whose reference signal measured value exceeds the difference threshold, if the terminal reports the difference information of the reference signal measured value at the same time, the positioning server may be assisted in more precisely adjusting a PRS configuration. The difference information of the reference signal measured value may be a difference itself, and may also be an index value corresponding to the difference, which is not limited in the embodiment of the present invention. Additionally, in a carrier aggregation scenario, the cell subset information may also carry a frequency point number or a carrier number of a cell so as to assist the positioning server in more precisely adjusting the PRS configuration.

103: Determine a configuration of a PRS according to the cell subset information, and notify the terminal of the configuration of the PRS.

Optionally, as an embodiment, the positioning server may determine, according to an instruction of the cell subset information, a cell (such as any one cell or two cells in a cell pair whose reference signal measured value difference is greater than the difference threshold, or the current investigated cell, or a cell, a reference signal measured value difference between which and the current investigated cell is greater than the difference threshold) in which the PRS configuration needs to be adjusted; send corresponding allocation information to a base station to instruct the base station to adjust the PRS configuration of the determined cell to reduce a reference signal measured value difference; and receive the adjusted PRS configuration fed back by the base station.

It should be noted that, "adjustment" in the embodiment of the present invention includes that the base station performs adjustment completely according to an instruction of the allocation information, performs adjustment partially according to an instruction of the allocation information, or does not perform adjustment (for example, the allocation information may instruct that the base station does not need to adjust the PRS configuration, or the base station may determine, according to another condition, that the PRS configuration does not need to be adjusted). These manners all fall within the scope of the embodiment of the present invention.

A manner of sending the allocation information is not limited in the embodiment of the present invention. For example, the positioning server may carry the allocation information in a message for requesting the base station to report the PRS configuration, or carry the allocation information in a dedicated message before a message for requesting the base station to report the PRS configuration.

A type of the allocation information is relevant to an adjustment manner. For example, if the reference signal measured value difference is reduced by adjusting PRS power, the positioning server may send, according to the cell subset information, power allocation information to a base station that needs to adjust PRS transmit power. The power allocation information is used to instruct the base station to adjust the PRS transmit power so as to reduce a PRS received power or SNR difference of two cells in a cell pair. Then, the positioning server receives, from the base station, a configuration of the PRS that is obtained by the base station after the base station performs adjustment based on the power allocation information. As the PRS received power or SNR difference of the two cells is reduced, interference between PRSs is also reduced.

Optionally, as another embodiment, in a CA (carrier aggregation) scenario, each cell has a plurality of available frequency points (or carriers). The positioning server may send, according to the cell subset information, frequency point allocation information to a base station that needs to adjust a PRS transmit frequency point. The frequency point allocation information is used to instruct the base station to adjust the PRS transmit frequency point so as to reduce a PRS received power or SNR difference of two cells in a cell pair, so that interference between PRSs can be reduced or avoided. The positioning server receives, from the base station, a configuration of the PRS that is obtained by the base station after the base station performs adjustment based on the frequency point allocation information. The PRS received power or SNR difference of the two cells can also be reduced by changing the PRS transmit frequency point, thereby reducing interference between PRSs.

Optionally, as another embodiment, in a CoMP (coordinated multi-point) scenario, a plurality of cells that can transmit a PRS exists in a CoMP set. The positioning server may send node configuration information to the base station according to the cell subset information. The node configuration information is used to instruct the base station to select an optimal coordinated node (CoMP node) that satisfies a PRS received power or SNR difference threshold, so as to transmit a PRS. The positioning server receives, from the base station, a configuration of the PRS that is obtained by the base station after the base station performs selection based on the node configuration information. The optimal coordinated node adopts PRS transmit power as far as possible in a situation of enabling the PRS received power or the SNR to be lower than or equal to the difference threshold, thereby avoiding that a PRS measured value difference is excessively large, and avoiding interference between PRSs.

Optionally, as another embodiment, a PRS received power or SNR difference threshold may be satisfied by adjusting beamforming of the base station. The positioning server may send beamforming configuration information to the base station according to the cell subset information. The beamforming configuration information is used to instruct the base station to select beamforming that satisfies the PRS received power or SNR difference threshold, so as to transmit a PRS. The positioning server receives, from the base station, a configuration of the PRS that is obtained by the base station after the base station performs selection based on the beamforming configuration information. A beamforming antenna may perform PRS space separation, and the PRS received power or SNR difference can be reduced as long as angle isolation is satisfied between major lobes of two cells, so as to avoid interference as far as possible.

Optionally, as another embodiment, the positioning server may also not change a PRS configuration of a cell. For example, the positioning server selects, according to the cell subset information, a cell that satisfies a PRS received power or SNR difference threshold from a neighboring cell list of a serving cell of the terminal, and then receives the PRS configuration from a base station of the selected cell. The neighboring cell list may include a current serving cell and its neighboring cell of the terminal. The cell selected in this way can satisfy the PRS received power or SNR difference threshold, thereby avoiding that a PRS measured value difference is excessively large, and reducing interference between PRSs.

A manner of notifying the terminal of the PRS configuration is not limited in the embodiment of the present invention. For example, a manner of delivering a PRS configuration through assistance data in the prior art may be adopted, which is no longer described herein.

104: Receive an RSTD that is obtained by the terminal through measurement according to the configuration of the PRS, and determine a location of the terminal according to the RSTD.

A process that the terminal obtains the RSTD through measurement according to the PRS configuration and a process that the positioning server determines the location of the terminal according to the RSTD are not limited in the embodiment of the present invention. For example, the same processing as that in the prior art may be adopted, which is no longer described herein.

Therefore, in the embodiment of the present invention, a difference threshold of a reference signal measured value is set, thereby avoiding that a measured value difference of PRSs is excessively large, and reducing interference between the PRSs.

Figure 2:
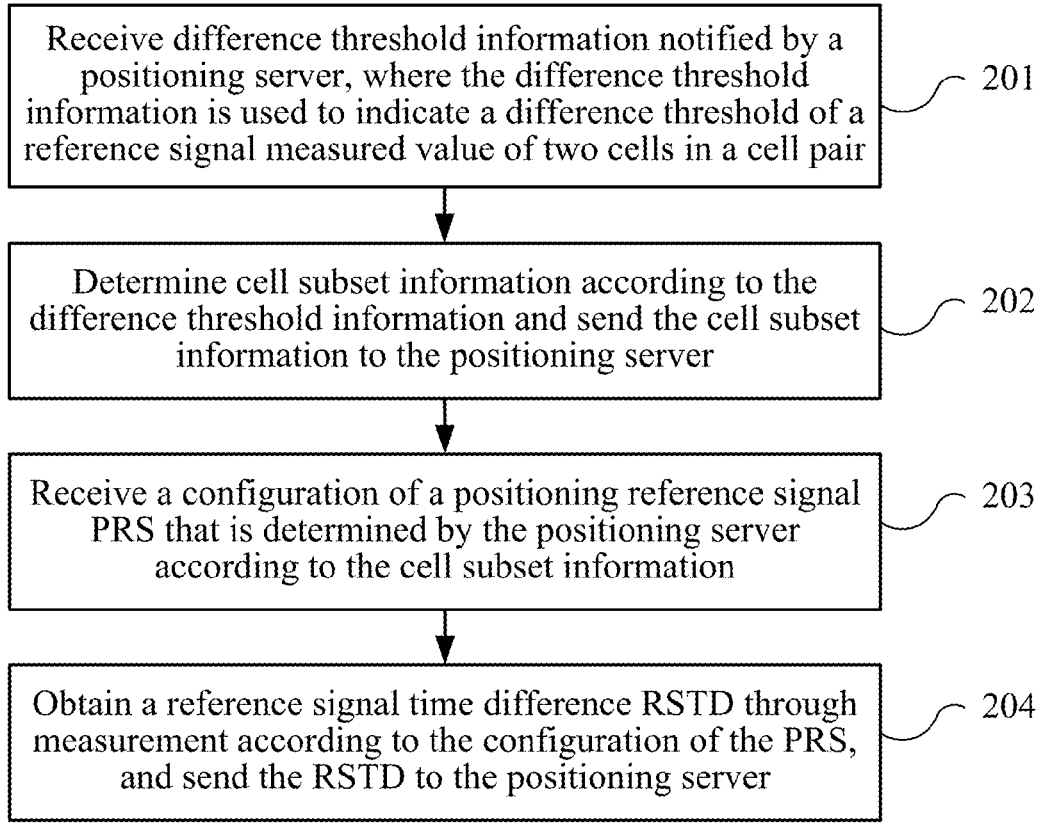
FIG. 2 is a flow chart of a positioning method according to another embodiment of the present invention.

FIG. 2 is a flow chart of a positioning method according to another embodiment of the present invention. The method shown in FIG. 2 is executed by a terminal (such as a UE), and is corresponding to the method shown in FIG. 1, and therefore repetitive description is omitted appropriately.

201: Receive difference threshold information notified by a positioning server, where the difference threshold information is used to indicate a difference threshold of a reference signal measured value of two cells in a cell pair.

For example, a reference signal may be a CRS (cell-specific reference signal), a PRS or another proper reference signal. A measured value may be received power, such as CRS received power RSRP (reference signal receiving power) and PRP (PRS received power); and the measured value may also be a value of another type, such as SNR.

Optionally, as an embodiment, the difference threshold information may include at least one of the following: a difference threshold of RSRP of the two cells, a difference threshold of SNRs of CRSs of the two cells, a difference threshold of PRP of the two cells and a first mapping factor, and a difference threshold of SNRs of PRSs of the two cells and a second mapping factor. The first mapping factor a1 represents a mapping factor between an RSRP difference $\Delta P_{er}$, and a PRP difference $\Delta P_{prs}$, and the second mapping factor $\alpha_2$ represents a mapping factor between a difference $\Delta S_{crs}$, of SNRs of CRSs and a difference $\Delta S_{prs}$ of SNRs of PRSs.

A type of a mapping factor is not limited in the embodiment of the present invention. For example, the first mapping factor may be $\alpha_1=\Delta P_{prs}/\Delta P_{crs}$, or $\alpha_1=\Delta P_{crs}/\Delta P_{prs}$. The second mapping factor may be $\alpha_2=\Delta S_{prs}/\Delta S_{crs}$, or $\alpha_2=\Delta S_{crs}/\Delta S_{prs}$. The positioning server may determine a value of a mapping factor in advance, for example, determine a mapping factor according to a simulation manner, an experiment manner or other manners.

In step 201, the terminal may receive, in various manners, the difference threshold information notified by the positioning server, which is not limited in the embodiment of the present invention. Optionally, as an embodiment, the terminal may receive the difference threshold information that is carried by the positioning server in a message for requesting the terminal to report a capability. Or, the terminal may receive the difference threshold information that is carried by the positioning server in a message for requesting the terminal to perform positioning measurement. Or, the terminal may receive the difference threshold information that is carried by the positioning server in assistance data that is sent to the terminal and used to help the terminal perform positioning measurement. Or, the terminal may receive the difference threshold information that is sent by a serving base station of the terminal through a broadcast message or an RRC message to the terminal, where the difference threshold information is received by the serving base station from the positioning server.

202: Determine cell subset information according to the difference threshold information and send the cell subset information to the positioning server, where the cell subset information is used to indicate a cell pair whose reference signal measured value difference exceeds the difference threshold, or the cell subset information is used to indicate a cell pair whose reference signal measured value difference does not exceed the difference threshold.

A manner of sending the cell subset information is not limited in the embodiment of the present invention. Optionally, as an embodiment, the terminal may carry the cell subset information in a message for reporting a capability to the positioning server. Or, the terminal may carry the cell subset information in a message for requesting assistance data from the positioning server.

A form of the cell subset information is not limited in the embodiment of the present invention. Optionally, as an embodiment, the cell subset information may include a cell pair list, namely, a list formed by cell identifiers of two cells in a cell pair. For example, the cell subset information may include a list of a cell pair whose reference signal measured value difference exceeds the difference threshold, or the cell subset information includes a list of a cell pair whose reference signal measured value difference does not exceed the difference threshold.

Optionally, as another embodiment, the cell subset information may include a cell list for a current investigated cell, namely, a list formed by an identifier of a cell, a reference signal measured value between which and the current investigated cell satisfies a certain condition. For example, the cell subset information may include a list of a cell, a reference signal measured value difference between which and the current investigated cell exceeds the difference threshold, or the cell subset information may include a list of a cell, a reference signal measured value difference between which and the current investigated cell does not exceed the difference threshold.

Specific forms of "cell identifiers" in the various lists are not limited in the embodiment of the present invention. For example, the cell identifier may be a PCI, CGI (cell global identity) or an ECGI (E-UTRAN cell global identity).

Optionally, as another embodiment, in addition to the foregoing cell list, the cell subset information may further include at least one of the following: difference information of the reference signal measured value, cell frequency point information (such as a frequency point number), and cell carrier information (such as a carrier number). For example, when the cell subset information indicates a cell pair whose reference signal measured value exceeds the difference threshold, if the terminal reports the difference information of the reference signal measured value at the same time, the positioning server may be assisted in more precisely adjusting a PRS configuration. The difference information of the reference signal measured value may be a difference itself, and may also be an index value corresponding to the difference, which is not limited in the embodiment of the present invention. Additionally, in a carrier aggregation scenario, the cell subset information may also carry a frequency point number or a carrier number of a cell so as to assist the positioning server in more precisely adjusting the PRS configuration.

203: Receive a configuration of a positioning reference signal PRS that is determined by the positioning server according to the cell subset information.

Optionally, as an embodiment, the terminal may receive a configuration of a PRS of a cell that is selected by the positioning server from a neighboring cell list and satisfies a PRS received power or SNR difference threshold. The neighboring cell list may include a current serving cell and its neighboring cell of the terminal.

A manner of receiving the PRS configuration from the positioning server is not limited in the embodiment of the present invention. For example, a manner of delivering a PRS configuration through assistance data in the prior art may be adopted, which is no longer described herein.

204: Obtain a reference signal time difference RSTD through measurement according to the configuration of the PRS, and send the RSTD to the positioning server.

A process that the terminal obtains the RSTD through measurement according to the PRS configuration and a process that the RSTD is sent to the positioning server are not limited in the embodiment of the present invention. For example, the same processing as that in the prior art may be adopted, which is no longer described herein.

Therefore, in the embodiment of the present invention, a difference threshold of a reference signal measured value is set, thereby avoiding that a measured value difference of PRSs is excessively large, and reducing interference between the PRSs.

Figure 3:
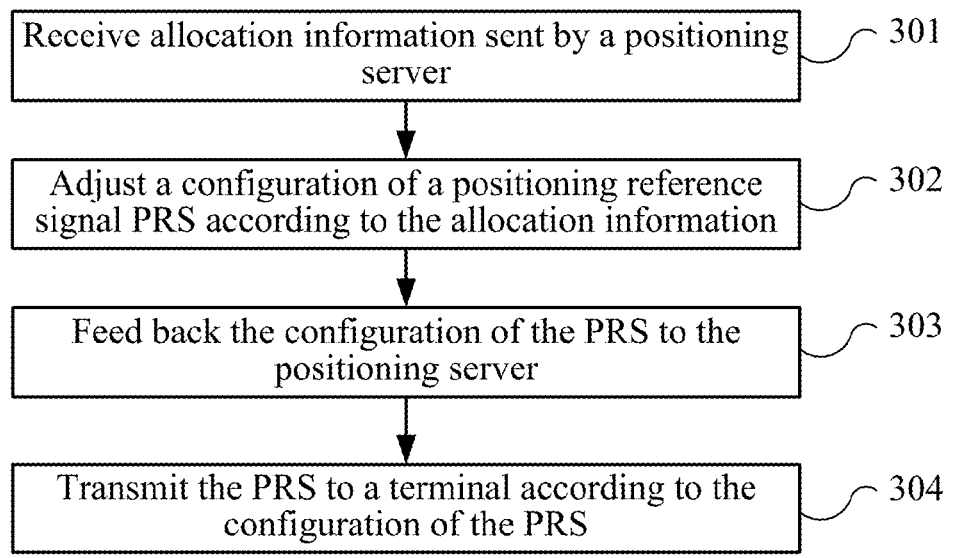
FIG. 3 is a flow chart of a positioning method according to another embodiment of the present invention.

FIG. 3 is a flow chart of a positioning method according to another embodiment of the present invention. The method shown in FIG. 3 is executed by a base station (such as an eNB).

301: Receive allocation information sent by a positioning server.

A manner of receiving/sending the allocation information is not limited in the embodiment of the present invention. Optionally, as an embodiment, a terminal may receive the allocation information that is carried by the positioning server in a message for requesting the base station to report a PRS configuration. Or, the terminal may receive the allocation information that is carried by the positioning server in a dedicated message before a message for requesting the base station to report a PRS configuration.

302: Adjust a configuration of a positioning reference signal PRS according to the allocation information.

Optionally, as an embodiment, the base station may execute any one of the following adjustment operations according to the allocation information: adjustment of PRS transmit power, adjustment of a PRS sending frequency point, selection of an optimal coordinated node that is used to transmit a PRS and satisfies a PRS received power or SNR difference threshold, selection of beamforming that is used to transmit a PRS and satisfies a PRS received power or SNR difference threshold, and transmission of a PRS by using a first RAT whose load is lightest among a plurality of RATs (radio access technique). However, the adjustment manner in the embodiment of the present invention is not limited to the foregoing specific example.

303: Feed back the adjusted configuration of the PRS to the positioning server.

A process that the base station feeds back the PRS configuration to the positioning server is not limited in the embodiment of the present invention. For example, information of the PRS configuration may be carried by reporting an OTDOA information response message of the PRS configuration to the positioning server in the prior art.

304: Transmit the PRS to a terminal according to the adjusted configuration of the PRS.

A process that the base station transmits the PRS to the terminal according to the configuration of the PRS is not limited in the embodiment of the present invention. For example, the same processing as that in the prior art may be adopted, which is no longer described herein.

Therefore, in the embodiment of the present invention, a difference threshold of a reference signal measured value is set, thereby avoiding that a measured value difference of PRSs is excessively large, and reducing interference between the PRSs.

Optionally, as another embodiment, if the base station executing the method shown in the FIG. 3 is a serving base station of the terminal, the base station may further receive difference threshold information from the positioning server and forward the difference threshold information to the terminal. The difference threshold information is used to indicate a difference threshold of a reference signal measured value of two cells in a cell pair.

Then the base station may receive, from the terminal, cell subset information that is determined by the terminal according to the difference threshold information, and forward the cell subset information to the positioning server. The cell subset information is used to indicate a cell pair whose reference signal measured value exceeds the difference threshold, or the cell subset information is used to indicate a cell pair whose reference signal measured value does not exceed the difference threshold. In this situation, the allocation information in the foregoing step 301 is sent by the positioning server according to the cell subset information.

Optionally, as another embodiment, in a process of forwarding the difference threshold information, the base station may receive the difference threshold information from the positioning server, and send the difference threshold information to the terminal through a broadcast message or an RRC message. Or, the base station may transparently transmit the difference threshold information from the positioning server to the terminal.

Additionally, if the base station transmits, according to the allocation information of the positioning server, a PRS by using a first RAT whose load is the lightest among a plurality of RATs, interference of a service signal with the PRS can also be reduced (which is described in detail with reference to embodiments shown in FIG. 10 to FIG. 12 in the following).

The embodiment of the present invention is described in further detail in the following with reference to a specific example.

Figure 4:
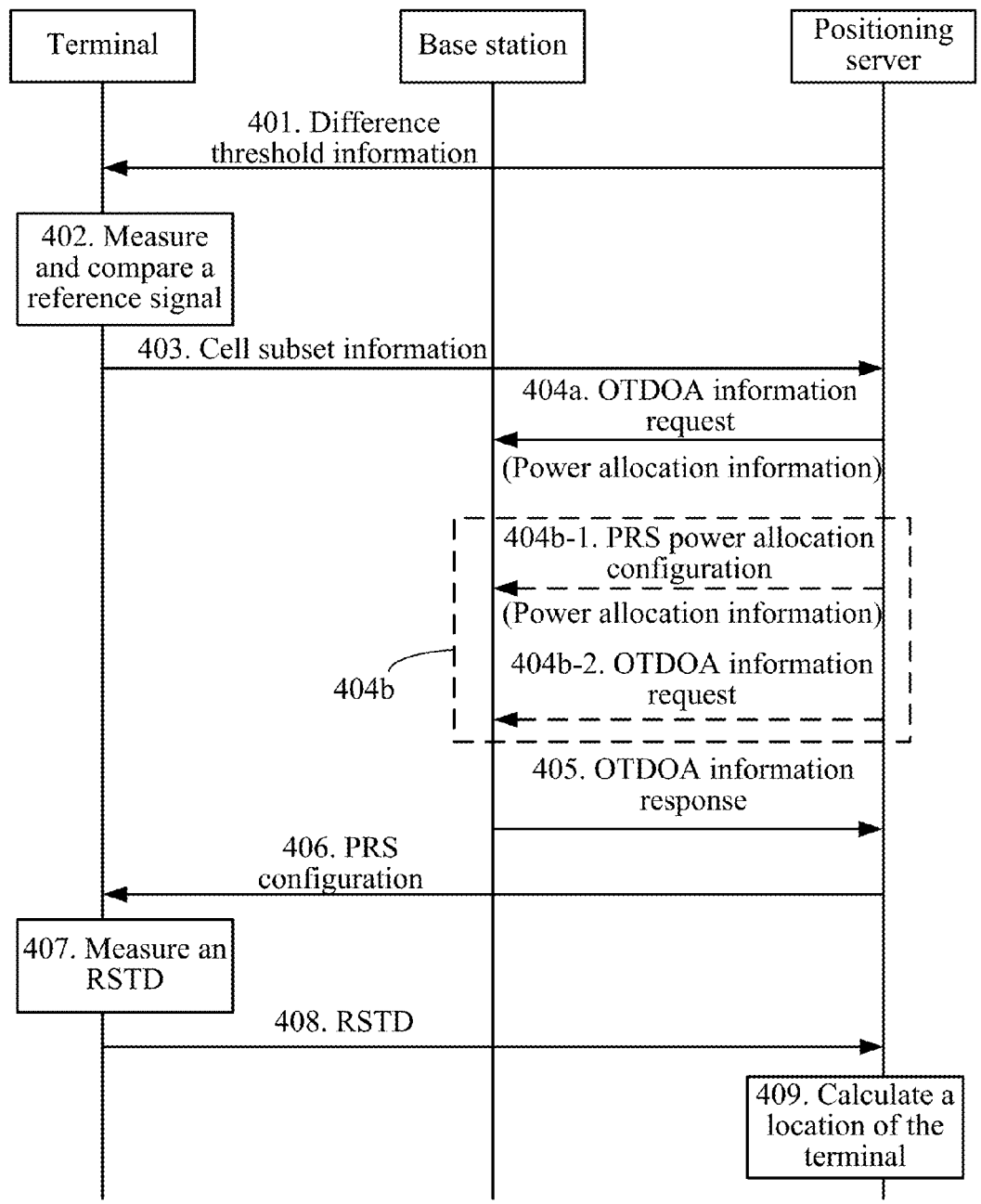
FIG. 4 is a schematic flow chart of a positioning process according to an embodiment of the present invention.

FIG. 4 is a schematic flow chart of a positioning process according to an embodiment of the present invention. In the embodiment shown in FIG. 4, an SNR difference problem is compensated by adopting a PRS power control manner, and a reference signal measured value difference is reduced by adjusting PRS power.

401: A positioning server sends allowable difference threshold information to a terminal. The difference threshold information may include an absolute value of a difference threshold, or may further include a relative mapping factor α (such as the first mapping factor α1 or the second mapping factor α2). The mapping factor α is determined by a network. For example, the network may notify the terminal of this mapping factor α, and during measurement of RSRP, the terminal autonomously estimates which RSRP does not satisfy a requirement. The network may also directly notify the terminal of an absolute threshold of an RSRP difference, so as to help the terminal perform screening.

In the following signaling example, a parameter naming manner imposes no limitation on the scope of the embodiment of the present invention. In an example adopting existing signaling, except a parameter newly added or modified in the embodiment of the present invention, for definitions of other parameters, reference may be made to a corresponding signaling protocol, which is no longer described herein. In step 401, the difference threshold information may be sent by adopting the following exemplary signaling.

401a: The positioning server may send the difference threshold information when exchanging a capability with the terminal.

LPP (LTE positioning protocol) information element OTDOA-RequestCapabilities is an information element that is sent by the positioning server to the terminal to request the terminal to report its own capability (reference is made to 3GPP TS36.355), and the italic part is a part which is the embodiment of the present invention adds.

```
-- ASN1START
OTDOA-RequestCapabilities::= SEQUENCE {
crs-PowerDifferenceThreshold    CRS-PowerDifferenceThreshold    OPTIONAL,
...
}
-- ASN1STOP
```

CRS-PowerDifferenceThreshold (CRS power difference threshold) is only a naming manner, which represents a meaning that the positioning server notifies the terminal of a difference threshold of CRS received power (RSRP). "OPTIONAL" represents that this is an optional information element.

It may also be written as:

```
-- ASN1START
OTDOA-RequestCapabilities::= SEQUENCE {
crs-SNRDifferenceThreshold    CRS-SNRDifferenceThreshold    OPTIONAL,
...
}
-- ASN1STOP
```

CRS-SNRDifferenceThreshold (CRS-SNR difference threshold) is only a naming manner, which represents a meaning that the positioning server notifies the terminal of a difference threshold of a CRS received signal to noise ratio (SNR).

It may also be written as:

```
-- ASN1START
OTDOA-RequestCapabilities::= SEQUENCE {
prs-PowerDifferenceFactor    PRS-PowerDifferenceFactor    OPTIONAL,
Prs-PowerDifferenceThreshold    PRS-PowerDifferenceThreshold    OPTIONAL,
...
}
-- ASN1STOP
```

PRS-PowerDifferenceFactor (PRS power difference factor) is only a naming manner, which represents a meaning that the positioning server notifies the terminal of a mapping factor between a CRS received power difference and a PRS received power difference (the first mapping factor). After receiving the mapping factor, the terminal performs mapping according to this mapping factor by using an RSRP measurement result, obtains an estimated PRS power difference, and then compares the estimated PRS power difference with PRS-PowerDifferenceThreshold (PRS power difference threshold, which represents a difference threshold of PRS received power).

It may also be written as:

```
-- ASN1START
OTDOA-RequestCapabilities::= SEQUENCE {
prs-SNRDifferenceFactor  PRS-SNRDifferenceFactor    OPTIONAL,
Prs-SNRDifferenceThreshold  PRS-SNRDifferenceThreshold    OPTIONAL,
...
}
-- ASN1STOP
```

PRS-SNRDifferenceFactor (PRS-SNR difference factor) is only a naming manner, which represents a meaning that the positioning server notifies the terminal of a mapping factor between a CRS received signal to noise ratio difference and a PRS received signal to noise ratio difference (the second mapping factor). After receiving the mapping factor, the terminal performs mapping according to this mapping factor by using a CRS SNR measurement result, obtains an estimated PRS SNR difference, and then compares the estimated PRS SNR difference with PRS-SNRDifferenceThreshold (PRS-SNR difference threshold, which represents a difference threshold of a PRS received signal to noise ratio).

401*b*: The positioning server may send the difference threshold information when requesting positioning measurement.

LPP information element OTDOA-RequestLocationInformation is an information element that is sent by the positioning server to the terminal to request the terminal to perform OTDOA positioning measurement (reference is made to 3GPP TS36.355), and the italic part is a part which is the embodiment of the present invention adds.

```
-- ASN1START
OTDOA-RequestLocationInformation::= SEQUENCE {
  assistanceAvailability      BOOLEAN,
  crs-PowerDifferenceThreshold    CRS-PowerDifferenceThreshold    OPTIONAL,
  ...
}
-- ASN1STOP
```

CRS-PowerDifferenceThreshold (CRS power difference threshold) is only a naming manner, which represents a meaning that the positioning server notifies the terminal of a difference threshold of CRS received power.

It may also be written as:

```
-- ASN1START
OTDOA-RequestLocationInformation::= SEQUENCE {
  assistanceAvailability      BOOLEAN,
  crs-SNRDifferenceThreshold      CRS-SNRDifferenceThreshold   OPTIONAL,
  ...
}
-- ASN1STOP
```

CRS-SNRDifferenceThreshold (CRS-SNR difference threshold) is only a naming manner, which represents a meaning that the positioning server notifies the terminal of a difference threshold of a CRS received signal to noise ratio.

It may also be written as:

```
-- ASN1START
OTDOA-RequestLocationInformation::= SEQUENCE {
  assistanceAvailability      BOOLEAN,
  prs-PowerDifferenceFactor       PRS-PowerDifferenceFactor    OPTIONAL,
  prs-PowerDifferenceThreshold    PRS-PowerDifferenceThreshold OPTIONAL,
  ...
}
-- ASN1STOP
```

PRS-PowerDifferenceFactor (PRS power difference factor) is only a naming manner, which represents a meaning that the positioning server notifies the terminal of a mapping factor between a CRS received power difference and a PRS received power difference (the first mapping factor). After receiving the mapping factor, the terminal performs mapping according to this mapping factor by using an RSRP measurement result, obtains an estimated PRS power difference, and then compares the estimated PRS power difference with PRS-PowerDifferenceThreshold (PRS power difference threshold, which represents a difference threshold of PRS received power).

It may also be written as:

```
-- ASN1START
OTDOA-RequestLocationInformation::= SEQUENCE {
  assistanceAvailability      BOOLEAN,
  prs-SNRDifferenceFactor PRS-SNRDifferenceFactor   OPTIONAL,
  prs-SNRDifferenceThreshold      PRS-SNRDifferenceThreshold   OPTIONAL,
  ...
}
-- ASN1STOP
```

PRS-SNRDifferenceFactor (PRS-SNR difference factor) is only a naming manner, which represents a meaning that the positioning server notifies the terminal of a mapping factor between a CRS received signal to noise ratio difference and a PRS received signal to noise ratio difference (the second mapping factor). After receiving the mapping factor, the terminal performs mapping according to this mapping factor by using a CRS SNR measurement result, obtains an estimated PRS SNR difference, and then compares the estimated PRS SNR difference with PRS-SNRDifferenceThreshold (PRS-SNR difference threshold, which represents a difference threshold of a PRS received signal to noise ratio).

401c: The positioning server may send the difference threshold information when sending assistance data.

LPP information element OTDOA-ProvideAssistance-Data is assistance data that is sent by the positioning server to the terminal, so as to help the terminal perform OTDOA positioning measurement (reference is made to 3GPP TS36.355), and the italic part is a part which is the embodiment of the present invention adds.

```
-- ASN1START
OTDOA-ProvideAssistanceData::= SEQUENCE {
  otdoa-ReferenceCellInfo       OTDOA-ReferenceCellInfo       OPTIONAL, -- Need ON
  otdoa-NeighbourCellInfo       OTDOA-NeighbourCellInfoList   OPTIONAL, -- Need ON
  crs-PowerDifferenceThreshold  CRS-PowerDifferenceThreshold  OPTIONAL,
  otdoa-Error                   OTDOA-Error                   OPTIONAL, -- Need ON
  ...
}
-- ASN1STOP
```

CRS-PowerDifferenceThreshold (CRS power difference threshold) is only a naming manner, which represents a meaning that the positioning server notifies the terminal of a difference threshold of CRS received power.

It may also be written as:

```
-- ASN1START
OTDOA-ProvideAssistanceData::= SEQUENCE {
  otdoa-ReferenceCellInfo       OTDOA-ReferenceCellInfo       OPTIONAL, -- Need ON
  otdoa-NeighbourCellInfo       OTDOA-NeighbourCellInfoList   OPTIONAL, -- Need ON
  crs-SNRDifferenceThreshold    CRS-SNRDifferenceThreshold    OPTIONAL,
  otdoa-Error                   OTDOA-Error                   OPTIONAL, -- Need ON
  ...
}
-- ASN1STOP
```

CRS-SNRDifferenceThreshold (CRS-SNR difference threshold) is only a naming manner, which represents a meaning that the positioning server notifies the terminal of a difference threshold of a CRS received signal to noise ratio.

It may also be written as:

```
-- ASN1START
OTDOA-ProvideAssistanceData::= SEQUENCE {
  otdoa-ReferenceCellInfo       OTDOA-ReferenceCellInfo       OPTIONAL, -- Need ON
  otdoa-NeighbourCellInfo       OTDOA-NeighbourCellInfoList   OPTIONAL, -- Need ON
  prs-PowerDifferenceFactor     PRS-PowerDifferenceFactor     OPTIONAL,
  prs-PowerDifferenceThreshold  PRS-PowerDifferenceThreshold  OPTIONAL,
  otdoa-Error                   OTDOA-Error                   OPTIONAL, -- Need ON
  ...
}
-- ASN1STOP
```

PRS-PowerDifferenceFactor (PRS power difference factor) is only a naming manner, which represents a meaning that the positioning server notifies the terminal of a mapping factor between a CRS received power difference and a PRS received power difference (the first mapping factor). After receiving the mapping factor, the terminal performs mapping according to this mapping factor by using an RSRP measurement result, obtains an estimated PRS power difference, and then compares the estimated PRS power difference with PRS-PowerDifferenceThreshold (PRS power difference threshold, which represents a difference threshold of PRS received power).

It may also be written as:

```
-- ASN1START
OTDOA-ProvideAssistanceData::= SEQUENCE {
  otdoa-ReferenceCellInfo       OTDOA-ReferenceCellInfo       OPTIONAL, -- Need ON
  otdoa-NeighbourCellInfo       OTDOA-NeighbourCellInfoList   OPTIONAL, -- Need ON
  prs-SNRDifferenceFactor       PRS-SNRDifferenceFactor       OPTIONAL,
  prs-SNRDifferenceThreshold    PRS-SNRDifferenceThreshold    OPTIONAL,
  otdoa-Error                   OTDOA-Error                   OPTIONAL, -- Need ON
  ...
}
-- ASN1STOP
```

PRS-SNRDifferenceFactor (PRS-SNR difference factor) is only a naming manner, which represents a meaning that the positioning server notifies the terminal of a mapping factor between a CRS received signal to noise ratio difference and a PRS received signal to noise ratio difference (the second mapping factor). After receiving the mapping factor, the terminal performs mapping according to this mapping factor by using a CRS SNR measurement result, obtains an estimated PRS SNR difference, and then compares the estimated PRS SNR difference with PRS-SNRDifferenceThreshold (PRS-SNR difference threshold, which represents a difference threshold of a PRS received signal to noise ratio).

401*d*: The difference threshold information may be sent by the positioning server to a base station through LPPa (LTE positioning protocol A) signaling, and then is sent by the base station to the terminal through broadcast information or RRC information.

For example, LPPa signaling OTDOA Power (or SNR) Difference Information (OTDOA power or SNR difference information) from the positioning server to the base station may be defined. The LPPa signaling is sent by the positioning server to the base station, and notifies the base station of difference threshold information defined by a network side, such as a CRS power difference threshold (or an SNR difference threshold); or may notify the base station of a PRS power difference threshold (or an SNR difference threshold) defined by a network side, and a mapping factor between CRS power (or an SNR) difference and PRS power (or an SNR) difference (such as the first mapping factor $\alpha1$ or the second mapping factor $\alpha2$).

Information carried in the LPPa signaling is exemplarily described according to situations in the following.

401*d*-1: If the positioning server delivers a CRS power difference threshold of a receiving end, the detailed signaling is exemplified as:

```
-- ***********************************************************
--
-- OTDOA POWER DIFFERENCE INFORMATION
--
-- ***********************************************************
    OTDOAPowerDifferenceInformation::= SEQUENCE {
        protocolIEs     ProtocolIE-Container
{{ OTDOAPowerDifferenceInformation-IEs}},
        ...
    }
    OTDOAPowerDifferenceInformation-IEs LPPA-PROTOCOL-IES::= {
        { ID CRSPowerDifferenceThreshold CRITICALITY reject TYPE INTEGER       PRESENCE
mandatory},
        ...
    }
```

CRSPowerDifferenceThreshold (CRS power difference threshold) is only a naming manner, which represents a meaning that the positioning server sends a CRS power difference threshold to the base station, and a value form of which may be an integer value (INTEGER).

401*d*-2: If the positioning server delivers a CRS SNR difference threshold of a receiving end, the detailed signaling is exemplified as:

```
-- ***********************************************************
--
-- OTDOA SNR DIFFERENCE INFORMATION
--
-- ***********************************************************
    OTDOASNRDifferenceInformation::= SEQUENCE {
        protocolIEs     ProtocolIE-Container
{{ OTDOASNRDifferenceInformation-IEs}},
        ...
    }
    OTDOASNRDifferenceInformation-IEs LPPA-PROTOCOL-IES::= {
        { ID CRSSNRDifferenceThreshold CRITICALITY reject TYPE INTEGER       PRESENCE
mandatory}
        ...
    }
```

CRSSNRDifferenceThreshold (CRS SNR difference threshold) is only a naming manner, which represents a meaning that the positioning server sends a CRS SNR difference threshold to the base station, and a value form of which may be an integer value.

401d-3: If the positioning server delivers a PRS power difference threshold and a mapping factor of a receiving end, the detailed signaling is exemplified as:

```
-- ***************************************************************
--
-- OTDOA POWER DIFFERENCE INFORMATION
--
-- ***************************************************************
    OTDOAPowerDifferenceInformation::= SEQUENCE {
      protocolIEs      ProtocolIE-Container
{{ OTDOAPowerDifferenceInformation-IEs}},
      ...
    }
    OTDOAPowerDifferenceInformation-IEs LPPA-PROTOCOL-IES::= {
      { ID PRSPowerDifferenceThreshold CRITICALITY reject TYPE INTEGER PRESENCE
mandatory},
      { ID PRS-CRSMappingFactor CRITICALITY reject TYPE INTEGER PRESENCE mandatory},
      ...
    }
```

PRSPowerDifferenceThreshold (PRS power difference threshold) is only a naming manner, which represents a meaning that the positioning server sends a PRS power difference threshold to the base station, and a value form of which may be an integer value. PRS-CRSMappingFactor (PRS-CRS mapping factor) is a mapping factor between a PRS power difference and a CRS power difference (the first mapping factor), and a type of this parameter is not limited in the present invention.

401d-4: If the positioning server delivers PRS SNR difference threshold of a receiving end and a PRS mapping factor of a receiving end, the detailed signaling is exemplified as:

```
-- ***************************************************************
--
-- OTDOA SNR DIFFERENCE INFORMATION
--
-- ***************************************************************
    OTDOASNRDifferenceInformation::= SEQUENCE {
      protocolIEs      ProtocolIE-Container
{{ OTDOASNRDifferenceInformation-IEs}},
      ...
    }
    OTDOASNRDifferenceInformation-IEs LPPA-PROTOCOL-IES::= {
      { ID PRSSNRDifferenceThreshold CRITICALITY reject TYPE INTEGER PRESENCE
mandatory},
      { ID PRS-CRSSNRMappingFactor CRITICALITY reject TYPE INTEGER PRESENCE mandatory},
      ...
    }
```

PRSSNRDifferenceThreshold (PRS SNR difference threshold) is only a naming manner, which represents a meaning that the positioning server sends a PRS SNR difference threshold of a receiving end to the base station, and a value form of which may be an integer value. PRS-CRSSNRMappingFactor (PRS-CRS SNR mapping factor) is a mapping factor between a PRS power difference and a CRS SNR difference (the second mapping factor), and a type of this parameter is not limited in the present invention.

The difference threshold information from the base station to the terminal may be sent through broadcast information or RRC information; and being similar to the foregoing example, a delivered content may be classified into four types: a CRS power difference of a receiving end, a CRS SNR difference of a receiving end, a PRS power difference and a mapping factor, and a PRS SNR difference and a mapping factor. 3GPP TS36.331 signaling is exemplified (the italic part is a part which the embodiment of the present invention newly adds).

If the base station delivers the difference threshold information through a broadcast channel, a system information block type 1 (SystemInformationBlockType1) may be adopted:

SystemInformationBlockType1 message

```
-- ASN1START
SystemInformationBlockType1::=        SEQUENCE {
    cellAccessRelatedInfo                 SEQUENCE {
        plmn-IdentityList                     PLMN-IdentityList,
        trackingAreaCode                      TrackingAreaCode,
        cellIdentity                          CellIdentity,
        cellBarred                            ENUMERATED {barred, notBarred},
        intraFreqReselection                  ENUMERATED {allowed, notAllowed},
        csg-Indication                        BOOLEAN,
        csg-Identity                          CSG-Identity            OPTIONAL -- Need OR
    },
    cellSelectionInfo                     SEQUENCE {
        q-RxLevMin                            Q-RxLevMin,
        q-RxLevMinOffset                      INTEGER (1..8)          OPTIONAL -- Need OP
    },
    p-Max                                 P-Max                       OPTIONAL, -- Need OP
    freqBandIndicator                     INTEGER (1..64),
    schedulingInfoList                    SchedulingInfoList,
    tdd-Config                            TDD-Config                  OPTIONAL, -- Cond TDD
    si-WindowLength                       ENUMERATED {
                                              ms1, ms2, ms5, ms10, ms15, ms20,
                                              ms40},
    systemInfoValueTag                    INTEGER (0..31),
    nonCriticalExtension                  SystemInformationBlockType1-v890-IEs    OPTIONAL
}
SystemInformationBlockType1-v890-IEs::= SEQUENCE {
    lateNonCriticalExtension              OCTET STRING   OPTIONAL, -- Need OP
    nonCriticalExtension                  SystemInformationBlockType1-v920-IEs    OPTIONAL
}
SystemInformationBlockType1-v920-IEs::= SEQUENCE {
    ims-EmergencySupport-r9               ENUMERATED {true}    OPTIONAL, -- Need OR
    cellSelectionInfo-v920                CellSelectionInfo-v920     OPTIONAL, -- Cond RSRQ
    nonCriticalExtension                  SystemInformationBlockType1-v1200-IEs OPTIONAL
}
SystemInformationBlockType1-v1200-IEs::= SEQUENCE {
    crs-PowerDifferenceThresholdforOTDOA         CRS-PowerDifferenceThresholdforOTDOA
    OPTIONAL,
    ...
}
PLMN-IdentityList::=                  SEQUENCE (SIZE (1..6)) OF PLMN-IdentityInfo
PLMN-IdentityInfo::=                  SEQUENCE {
    plmn-Identity                         PLMN-Identity,
    cellReservedForOperatorUse            ENUMERATED {reserved, notReserved}
}
SchedulingInfoList::= SEQUENCE (SIZE (1..maxSI-Message)) OF SchedulingInfo
SchedulingInfo::= SEQUENCE {
    si-Periodicity                        ENUMERATED {
                                              rf8, rf16, rf32, rf64, rf128, rf256, rf512},
    sib-MappingInfo                       SIB-MappingInfo
}
SIB-MappingInfo::= SEQUENCE (SIZE (0..maxSIB-1)) OF SIB-Type
SIB-Type::=           ENUMERATED {
                                              sibType3, sibType4, sibType5, sibType6,
                                              sibType7, sibType8, sibType9, sibType10,
                                              sibType11, sibType12-v920, sibType13-v920, spare5,
                                              spare4, spare3, spare2, spare1,...}
CellSelectionInfo-v920::=             SEQUENCE {
    q-QualMin-r9                          Q-QualMin-r9,
    q-QualMinOffset-r9                    INTEGER (1..8)              OPTIONAL --
Need OP
}
-- ASN1STOP
```

CRS-PowerDifferenceThresholdforOTDOA (CRS power difference threshold of OTDOA) is only a naming manner, which represents a meaning that an eNB notifies the terminal of a difference threshold of CRS received power.

It may also be written as:

SystemInformationBlockType1 message

```
-- ASN1START
SystemInformationBlockType1::=        SEQUENCE {
    cellAccessRelatedInfo                 SEQUENCE {
        plmn-IdentityList                     PLMN-IdentityList,
```

-continued

| SystemInformationBlockType1 message |
|---|

```
        trackingAreaCode              TrackingAreaCode,
        cellIdentity                  CellIdentity,
        cellBarred                    ENUMERATED {barred, notBarred},
        intraFreqReselection          ENUMERATED {allowed, notAllowed},
        csg-Indication                BOOLEAN,
        csg-Identity                  CSG-Identity        OPTIONAL       -- Need OR
    },
    cellSelectionInfo                 SEQUENCE {
        q-RxLevMin                    Q-RxLevMin,
        q-RxLevMinOffset              INTEGER (1..8)      OPTIONAL       -- Need OP
    },
    p-Max                             P-Max               OPTIONAL,      -- Need OP
    freqBandIndicator                 INTEGER (1..64),
    schedulingInfoList                SchedulingInfoList,
    tdd-Config                        TDD-Config          OPTIONAL,      -- Cond TDD
    si-WindowLength                   ENUMERATED {
                                        ms1, ms2, ms5, ms10, ms15, ms20,
                                        ms40},
    systemInfoValueTag                INTEGER (0..31),
    nonCriticalExtension              SystemInformationBlockType1-v890-IEs
    OPTIONAL
}
SystemInformationBlockType1-v890-IEs::= SEQUENCE {
    lateNonCriticalExtension          OCTET STRING    OPTIONAL, -- Need OP
    nonCriticalExtension              SystemInformationBlockType1-v920-IEs    OPTIONAL
}
SystemInformationBlockType1-v920-IEs::= SEQUENCE {
    ims-EmergencySupport-r9           ENUMERATED {true}   OPTIONAL,      -- Need OR
    cellSelectionInfo-v920            CellSelectionInfo-v920  OPTIONAL,  -- Cond RSRQ
    nonCriticalExtension              SystemInformationBlockType1-v1200-IEs   OPTIONAL
}
SystemInformationBlockType1-v1200-IEs::= SEQUENCE {
    crs-SNRDifferenceThresholdforOTDOA    CRS-SNRDifferenceThresholdforOTDOA  OPTIONAL,
...
}
PLMN-IdentityList ::=                 SEQUENCE (SIZE (1..6)) OF PLMN-IdentityInfo
PLMN-IdentityInfo::=                  SEQUENCE {
    plmn-Identity                     PLMN-Identity,
    cellReservedForOperatorUse        ENUMERATED {reserved, notReserved}
}
SchedulingInfoList::= SEQUENCE (SIZE (1..maxSI-Message)) OF SchedulingInfo
SchedulingInfo::= SEQUENCE {
    si-Periodicity                    ENUMERATED {
                                        rf8, rf16, rf32, rf64, rf128, rf256, rf512},
    sib-MappingInfo                   SIB-MappingInfo
}
SIB-MappingInfo::= SEQUENCE (SIZE (0..maxSIB-1)) OF SIB-Type
SIB-Type::=           ENUMERATED {
                                        sibType3, sibType4, sibType5, sibType6,
                                        sibType7, sibType8, sibType9, sibType10,
                                        sibType11, sibType12-v920, sibType13-v920, spare5,
                                        spare4, spare3, spare2, spare1,...}
CellSelectionInfo-v920::=             SEQUENCE {
    q-QualMin-r9                      Q-QualMin-r9,
    q-QualMinOffset-r9                INTEGER (1..8)      OPTIONAL       -- Need OP
}
-- ASN1STOP
```

CRS-SNRDifferenceThresholdforOTDOA (CRS SNR difference threshold of OTDOA) is only a naming manner, which represents a meaning that the eNB notifies the terminal of a difference threshold of a CRS received SNR.

It may also be written as:

| SystemInformationBlockType1 message |
|---|

```
-- ASN1START
SystemInformationBlockType1::=    SEQUENCE {
    cellAccessRelatedInfo         SEQUENCE {
        plmn-IdentityList             PLMN-IdentityList,
        trackingAreaCode              TrackingAreaCode,
        cellIdentity                  CellIdentity,
```

| SystemInformationBlockType1 message |
| --- |
| ```
        cellBarred                   ENUMERATED {barred, notBarred},
        intraFreqReselection         ENUMERATED {allowed, notAllowed},
        csg-Indication               BOOLEAN,
        csg-Identity                 CSG-Identity              OPTIONAL -- Need OR
    },
    cellSelectionInfo                SEQUENCE {
        q-RxLevMin                   Q-RxLevMin,
        q-RxLevMinOffset             INTEGER (1..8)            OPTIONAL -- Need OP
    },
    p-Max                            P-Max                     OPTIONAL, -- Need OP
    freqBandIndicator                INTEGER (1..64),
    schedulingInfoList               SchedulingInfoList,
    tdd-Config                       TDD-Config                OPTIONAL, -- Cond TDD
    si-WindowLength                  ENUMERATED {
                                        ms1, ms2, ms5, ms10, ms15, ms20,
                                        ms40},
    systemInfoValueTag               INTEGER (0..31),
    nonCriticalExtension             SystemInformationBlockType1-v890-IEs
                                     OPTIONAL
}
SystemInformationBlockType1-v890-IEs::= SEQUENCE {
    lateNonCriticalExtension         OCTET STRING    OPTIONAL, -- Need OP
    nonCriticalExtension             SystemInformationBlockType1-v920-IEs OPTIONAL
}
SystemInformationBlockType1-v920-IEs::= SEQUENCE {
    ims-EmergencySupport-r9          ENUMERATED {true}         OPTIONAL, -- Need OR
    cellSelectionInfo-v920           CellSelectionInfo-v920    OPTIONAL, -- Cond RSRQ
    nonCriticalExtension             SystemInformationBlockType1-v1200-IEs OPTIONAL
}
SystemInformationBlockType1-v1200-IEs::= SEQUENCE {
prs-PowerDifferenceFactor PRS-PowerDifferenceFactor OPTIONAL,
prs-PowerDifferenceThreshold PRS-PowerDifferenceThreshold     OPTIONAL,
...
}
PLMN-IdentityList::=              SEQUENCE (SIZE (1..6)) OF PLMN-IdentityInfo
PLMN-IdentityInfo::=              SEQUENCE {
    plmn-Identity                    PLMN-Identity,
    cellReservedForOperatorUse       ENUMERATED {reserved, notReserved}
}
SchedulingInfoList::= SEQUENCE (SIZE (1..maxSI-Message)) OF SchedulingInfo
SchedulingInfo::= SEQUENCE {
    si-Periodicity                   ENUMERATED {
                                        rf8, rf16, rf32, rf64, rf128, rf256, rf512},
    sib-MappingInfo                  SIB-MappingInfo
}
SIB-MappingInfo::= SEQUENCE (SIZE (0..maxSIB-1)) OF SIB-Type
SIB-Type::=          ENUMERATED {
                                        sibType3, sibType4, sibType5, sibType6,
                                        sibType7, sibType8, sibType9, sibType10,
                                        sibType11, sibType12-v920, sibType13-v920, spare5,
                                        spare4, spare3, spare2, spare1,...}
CellSelectionInfo-v920::=         SEQUENCE {
    q-QualMin-r9                     Q-QualMin-r9,
    q-QualMinOffset-r9               INTEGER (1..8)            OPTIONAL -- Need OP
}
-- ASN1STOP
``` |

PRS-PowerDifferenceFactor (PRS power difference factor) is only a naming manner, which represents a meaning that the eNB notifies the terminal of a mapping factor between a CRS received power difference and a PRS received power difference (the first mapping factor). After receiving the mapping factor, the terminal performs mapping according to this mapping factor by using an RSRP measurement result, obtains an estimated PRS received power difference, and then compares the estimated PRS received power difference with PRS-PowerDifferenceThreshold (PRS power difference threshold, which represents a difference threshold of PRS received power).

It may also be written as:

| SystemInformationBlockType1 message |
| --- |
| ```
-- ASN1START
SystemInformationBlockType1::=    SEQUENCE {
    cellAccessRelatedInfo            SEQUENCE {
        plmn-IdentityList            PLMN-IdentityList,
``` |

-continued

| SystemInformationBlockType1 message | | |
|---|---|---|
| trackingAreaCode | TrackingAreaCode, | |
| cellIdentity | CellIdentity, | |
| cellBarred | ENUMERATED {barred, notBarred}, | |
| intraFreqReselection | ENUMERATED {allowed, notAllowed}, | |
| csg-Indication | BOOLEAN, | |
| csg-Identity | CSG-Identity | OPTIONAL -- Need OR |
| }, | | |
| cellSelectionInfo | SEQUENCE { | |
|   q-RxLevMin |   Q-RxLevMin, | |
|   q-RxLevMinOffset |   INTEGER (1..8) | OPTIONAL -- Need OP |
| }, | | |
| p-Max | P-Max | OPTIONAL, -- Need OP |
| freqBandIndicator | INTEGER (1..64), | |
| schedulingInfoList | SchedulingInfoList, | |
| tdd-Config | TDD-Config | OPTIONAL, -- Cond TDD |
| si-WindowLength | ENUMERATED { | |
| |   ms1, ms2, ms5, ms10, ms15, ms20, | |
| |   ms40}, | |
| systemInfoValueTag | INTEGER (0..31), | |
| nonCriticalExtension | SystemInformationBlockType1-v890-IEs OPTIONAL | |
| } | | |
| SystemInformationBlockType1-v890-IEs::= SEQUENCE { | | |
| lateNonCriticalExtension | OCTET STRING OPTIONAL, -- Need OP | |
| nonCriticalExtension | SystemInformationBlockType1-v920-IEs OPTIONAL | |
| } | | |
| SystemInformationBlockType1-v920-IEs::= SEQUENCE { | | |
| ims-EmergencySupport-r9 | ENUMERATED {true} | OPTIONAL, -- Need OR |
| cellSelectionInfo-v920 | CellSelectionInfo-v920 | OPTIONAL, -- Cond RSRQ |
| nonCriticalExtension | SystemInformationBlockType1-v1200-IEs OPTIONAL | |
| } | | |
| SystemInformationBlockType1-v1200-IEs::= SEQUENCE { | | |
| prs-SNRDifferenceFactor PRS-SNRDifferenceFactor OPTIONAL, | | |
| prs-SNRDifferenceThreshold PRS-SNRDifferenceThreshold OPTIONAL, | | |
| ... | | |
| } | | |
| PLMN-IdentityList::= | SEQUENCE (SIZE (1..6)) OF PLMN-IdentityInfo | |
| PLMN-IdentityInfo::= | SEQUENCE { | |
|   plmn-Identity |   PLMN-Identity, | |
|   cellReservedForOperatorUse |   ENUMERATED {reserved, not-Reserved} | |
| } | | |
| SchedulingInfoList::= SEQUENCE (SIZE (1..maxSI-Message)) OF SchedulingInfo | | |
| SchedulingInfo::= SEQUENCE { | | |
|   si-Periodicity | ENUMERATED { | |
| |   rf8, rf16, rf32, rf64, rf128, rf256, rf512}, | |
|   sib-MappingInfo | SIB-MappingInfo | |
| } | | |
| SIB-MappingInfo::= SEQUENCE (SIZE (0..maxSIB-1)) OF SIB-Type | | |
| SIB-Type::= | ENUMERATED { | |
| |   sibType3, sibType4, sibType5, sibType6, | |
| |   sibType7, sibType8, sibType9, sibType10, | |
| |   sibType11, sibType12-v920, sibType13-v920, spare5, | |
| |   spare4, spare3, spare2, spare1,...} | |
| CellSelectionInfo-v920::= | SEQUENCE { | |
|   q-QualMin-r9 |   Q-QualMin-r9, | |
|   q-QualMinOffset-r9 |   INTEGER (1..8) | OPTIONAL -- Need OP |
| } | | |
| -- ASN1STOP | | |

PRS-SNRDifferenceFactor (PRS-SNR difference factor) is only a naming manner, which represents a meaning that the eNB notifies the terminal of a mapping factor between a CRS received signal to noise ratio difference and a PRS received signal to noise ratio difference (the second mapping factor). After receiving the mapping factor, the terminal performs mapping according to this mapping factor by using a CRS SNR measurement result, obtains an estimated PRS SNR difference, and then compares the estimated PRS SNR difference with PRS-SNRDifferenceThreshold (PRS-SNR difference threshold, which represents a difference threshold of a PRS received signal to noise ratio).

The eNB may also deliver the difference threshold information to each terminal through RRC signaling; and a signaling form is not limited in the embodiment of the present invention, existing RRC signaling may be used, or RRC signaling may be newly added.

402: The terminal measures a reference signal, compares RSRP or a CRS SNR of a neighboring cell with that of a current cell, where the RSRP or the CRS SNR is obtained through measurement; and compares an obtained difference with the difference threshold notified by the network side. This step 402 belongs to an internal implementation process of the terminal, and a corresponding comparison operation is executed according to a type of a reference signal measured value included in the difference threshold information.

For example, if the difference threshold information includes an RSRP difference threshold, the terminal may compare a measured RSRP difference with the difference threshold. If the difference threshold information includes a CRS SNR difference threshold, the terminal may compare a measured CRS SNR difference with the difference threshold.

Additionally, if the difference threshold information includes a PRP difference threshold and the first mapping factor, the terminal may map an RSRP difference measurement result according to the first mapping factor, obtain an estimated PRP difference, and then compare the PRP difference with the PRP difference threshold. Or, if the difference threshold information includes a PRS SNR difference threshold and the second mapping factor, the terminal may map a CRS SNR difference measurement result according to the second mapping factor, obtain an estimated PRS SNR difference, and then compare the PRS SNR difference with the PRS SNR difference threshold.

403: The terminal reports cell subset information to the positioning server, where the cell subset information indicates a cell pair whose reference signal measured value exceeds the difference threshold, or the cell subset information is used to indicate a cell pair whose reference signal measured value does not exceed the difference threshold, so Signaling form 4: The difference threshold information delivered in step 401 includes the PRP or PRS SNR difference threshold and the corresponding mapping factor, and the cell subset information reported in step 403 indicates a cell pair whose PRP or PRS SNR difference does not exceed the difference threshold.

The four signaling forms are separately exemplified in the following.

Signaling Form 1:

In step 401, the network side delivers a difference threshold of the CRS received power or CRS SNR, a content reported by the terminal is those cell pairs whose receiving end CRS power or CRS SNR exceeds the difference threshold, and LPP signaling is exemplified as:

(1) The terminal may send the cell subset information when exchanging a capability with the positioning server.

An LPP information element OTDOA-ProvideCapabilities (OTDOA providing capabilities) is an information element that is sent by the terminal to the positioning server to report its own capability (reference is made to 3GPP TS36.355), and the italic part is a part which the embodiment of the present invention adds. If a CRS received power (RSRP) difference is investigated,

```
-- ASN1START
OTDOA-ProvideCapabilities::= SEQUENCE {
    otdoa-Mode         BIT STRING {    ue-assisted (0) } (SIZE (1..8)),
    ...,
    supportedBandListEUTRA    SEQUENCE (SIZE (1..maxBands)) OF SupportedBandEUTRA
    crsPowerDiffCellPairList  SEQUENCE (SIZE (1..maxNum)) OF CRSPowerDiffCellPair
    OPTIONAL
}
maxBands INTEGER::= 64
maxNum INTEGER::= x
SupportedBandEUTRA::= SEQUENCE {
    bandEUTRA                             INTEGER (1..64)
}
CRSPowerDiffCellPair::= SEQUENCE {
    earfcn              ARFCN-ValueEUTRA      OPTIONAL,
    physCellIdAgr       INTEGER (0..503),
    cellGlobalIdAgr     ECGI                  OPTIONAL,   -- Need ON
    physCellIdVic       INTEGER (0..503),
    cellGlobalIdVic     ECGI                  OPTIONAL,   -- Need ON
    powerDifference     INTERGER (1..y),      OPTIONAL,
}
-- ASN1STOP
``` as to help the positioning server remove, through screening, a cell whose PRS receiving end power difference or SNR difference is relatively large.

Signaling forms involved in step 403 mainly include four types.

Signaling form 1: The difference threshold information delivered in step 401 includes the RSRP or CRS SNR difference threshold, and the cell subset information reported in step 403 indicates a cell pair whose RSRP or CRS SNR difference exceeds the difference threshold.

Signaling form 2: The difference threshold information delivered in step 401 includes the RSRP or CRS SNR difference threshold, and the cell subset information reported in step 403 indicates a cell pair whose RSRP or CRS SNR difference does not exceed the difference threshold.

Signaling form 3: The difference threshold information delivered in step 401 includes the PRP or PRS SNR difference threshold and the corresponding mapping factor, and the cell subset information reported in step 403 indicates a cell pair whose PRP or PRS SNR difference exceeds the difference threshold.

crsPowerDiffCellPairList (CRS power difference cell pair list) is only a naming manner, which represents a meaning indicating a list of a cell pair whose CRS received power difference reported by the terminal to the network side is excessively large. A value of the length maxNum=x of this list may be determined according to a terminal capability and a network requirement.

CRSPowerDiffCellPair (CRS power difference cell pair) is only a naming manner, which represents a meaning indicating a cell pair whose CRS received power difference reported by the terminal to the network side is excessively large. An inner composition of its IE (information element) includes that: physCellIdAgr is only a naming manner, which represents a meaning indicating a PCI of a cell whose CRS power is larger; and a cell with larger power generates PRS interference with a cell with smaller power (when a difference between the two is greater than a certain threshold), and therefore, the cell with larger power is also referred to as an interference source cell. cellGlobalIdAgr is only a naming manner, which represents a meaning indicating a CGI of the interference source cell. physCellIdVic is only a naming manner, which represents a meaning indicating a PCI of a cell whose CRS power is smaller; and a cell with smaller power receives PRS interference from a cell with larger power (when a difference between the two is greater than a certain threshold), and therefore, the cell with smaller power is also referred to as a victim cell. cellGlobalIdVic is other neighboring cells, and a cell, a difference between which and the investigated cell exceeds the difference threshold, is reported as a list, where all cells in this list are cells, a receiving end power or SNR difference between which and the current investigated cell exceeds the threshold. The signaling is exemplified as follows:

```
-- ASN1START
OTDOA-ProvideCapabilities::= SEQUENCE {
    otdoa-Mode          BIT STRING {    ue-assisted (0) } (SIZE (1..8)),
    ...,
    supportedBandListEUTRA      SEQUENCE (SIZE (1..maxBands)) OF SupportedBandEUTRA
    cRSPowerDiffCellList        SEQUENCE (SIZE (1..x)) OF CRSPowerDiffCell
    OPTIONAL
}
maxBands INTEGER::= 64
SupportedBandEUTRA::= SEQUENCE {
    bandEUTRA                           INTEGER (1..64)
}
CRSPowerDiffCell::= SEQUENCE {
    earfcn                  ARFCN-ValueEUTRA        OPTIONAL,
    physCellIdRef           INTEGER (0..503),
    cellGlobalIdRef         ECGI                    OPTIONAL,       -- Need ON
    failedThresCellList SEQUENCE (SIZE (1..y)) OF FailedThresCell
}
FailedThresCell::= SEQUENCE {
    physCellId              INTEGER (0..503),
    cellGlobalId            ECGI            OPTIONAL,       -- Need ON
    powerDifference         INTERGER (1..z), OPTIONAL,
}
-- ASN1STOP
``` only a naming manner, which represents a meaning indicating a CGI of the victim cell. powerDifference is only a naming manner, which represents a meaning indicating a CRS power difference that is received by the terminal and is between two cells (a victim cell and an interference source cell) involved in this IE: CRSPowerDiffCellPair. y is only a naming manner, which represents a meaning indicating a reporting range of a power difference.

earfcn is only a naming manner, which represents a meaning indicating an E-UTRAN absolute radio frequency channel number; and this IE may not be sent in a common-frequency network, but for a CA or multi-frequency point system, this IE that indicates the number of a frequency point or the number of a carrier whose received power or SNR difference between two common-frequency cells is excessively large is sent.

Herein, it should be noted that, if the network side delivers a CRS power difference threshold, this reported powerDifference is a CRS received power (RSRP) difference. If the network delivers a mapping factor between a PRS power difference and a CRS power difference, and a PRS power difference threshold, powerDifference may be a CRS received power (RSRP) difference, and may also be a PRS received power difference (one of which is determined according to the stipulation of a protocol). A meaning of OPTIONAL (optional) in the IE represents an option, namely, this IE may or may not be transmitted, which is decided by an IE sending end.

When a cell pair whose receiving end CRS power or CRS SNR exceeds the difference threshold is reported, its LPP signaling form may be reported one pair by one pair as described in the foregoing; or a certain cell may be taken as an investigated cell, and a cell, a difference between which and this investigated cell exceeds a threshold, is reported. Then its LPP signaling example may be as follows:

When the terminal performs reporting, an investigated cell is taken, then the investigated cell is compared with crsPowerDiffCellList (CRS power difference cell list) is only a naming manner, which represents a meaning indicating a list of a cell whose CRS received power difference reported by the terminal to the network side is excessively large. The length x of this list represents the number of investigated cells.

CRSPowerDiffCell (CRS power difference cell) is only a naming manner, which represents a meaning indicating information of a cell whose CRS received power difference reported by the terminal to the network side is excessively large. An inner composition of its IE includes that: physCellIdRef is only a naming manner, which represents a meaning indicating a PCI of an investigated cell. cellGlobalIdRef is only a naming manner, which represents a meaning indicating a CGI of the investigated cell. failedThresCellList is only a naming manner, which represents a meaning indicating a list of a cell that does not satisfy the difference threshold by being compared with this investigated cell. y is only a naming manner, which represents a meaning indicating the number of cells (the length of a cell list) that do not satisfy the difference threshold by being compared with the investigated cell. FailedThresCell is only a naming manner, which represents a meaning indicating information of a cell that does not satisfy the difference threshold by being compared with the investigated cell. physCellId is only a naming manner, which represents a meaning indicating a PCI of a cell, namely, a PCI of a cell that does not satisfy the difference threshold by being compared with the investigated cell in this signaling. Similarly, cellGlobalId is only a naming manner, which represents a meaning indicating a CGI of a cell, namely, a CGI of a cell that does not satisfy the difference threshold by being compared with the investigated cell in this signaling. powerDifference is only a naming manner, which represents a meaning indicating a power difference between a cell that does not satisfy the difference threshold by being compared with the investigated cell and the investigated cell, and this value may be positive or negative and the value ranges from 1 to z. z is only a naming manner, which represents a meaning indicating a reporting range of a power difference, which is an index value, ranges from 1 to z (all of which are greater than zero), and is mapped to a true value that is positive or negative.

earfcn is only a naming manner, which represents a meaning indicating an E-UTRAN absolute radio frequency channel number; and this IE may not be sent in a common-frequency network, but for a CA or multi-frequency point system, this IE that indicates the number of a frequency point or the number of a carrier whose received power or SNR difference between two common-frequency cells is excessively large is sent.

If an SNR difference is investigated, it may also be written as:

SNR receives PRS interference from a cell with a larger SNR (when a difference between the two is greater than a certain threshold), and therefore, the cell with a smaller SNR is also referred to as a victim cell. cellGlobalIdVic is only a naming manner, which represents a meaning indicating a CGI of the victim cell. snrDifference is only a naming manner, which represents a meaning indicating a receiving end CRS SNR difference between two cells (a victim cell and an interference source cell) involved in this IE: CRSS-NRDiffCellPair. y is only a naming manner, which represents a meaning indicating a reporting range of an SNR difference.

Herein, it should be noted that, if the network side delivers a CRS SNR difference threshold, this reported snrDifference is a CRS receiving end SNR difference. If the network delivers a mapping factor between a PRS SNR difference

```
-- ASN1START
OTDOA-ProvideCapabilities::= SEQUENCE {
  otdoa-Mode        BIT STRING {    ue-assisted (0) } (SIZE (1..8)),
  ...,
  supportedBandListEUTRA    SEQUENCE (SIZE (1..maxBands)) OF SupportedBandEUTRA
  crsSNRDiffCellPairList    SEQUENCE (SIZE (1..maxNum)) OF CRSSNRDiffCellPair
  OPTIONAL
}
maxBands INTEGER::= 64
maxNum INTEGER::= x
SupportedBandEUTRA::= SEQUENCE {
  bandEUTRA                 INTEGER (1..64)
}
CRSSNRDiffCellPair::= SEQUENCE {
  earfcn           ARFCN-ValueEUTRA    OPTIONAL,
  physCellIdAgr    INTEGER (0..503),
  cellGlobalIdAgr  ECGI                OPTIONAL,    -- Need ON
  physCellIdVic    INTEGER (0..503),
  cellGlobalIdVic  ECGI                OPTIONAL,    -- Need ON
  snrDifference    INTERGER (1..y),    OPTIONAL,
}
-- ASN1STOP
``` crsSNRDiffCellPairList (CRS SNR difference cell pair list) is only a naming manner, which represents a meaning indicating a list of a cell pair whose receiving end CRS SNR difference reported by the terminal to the network side is excessively large.

CRSSNRDiffCellPair (CRS SNR difference cell pair) is only a naming manner, which represents a meaning indicating a cell pair whose receiving end CRS SNR value reported by the terminal to the network side is excessively large. An inner composition of its IE includes that: physCellIdAgr is only a naming manner, which represents a meaning indicating a PCI of a cell whose receiving end CRS SNR is larger; and a cell with a larger SNR generates PRS interference with a cell with a smaller SNR (when a difference between the two is greater than a certain threshold), and therefore, the cell with a larger SNR is also referred to as an interference source cell. cellGlobalIdAgr is only a naming manner, which represents a meaning indicating a CGI of the interference source cell. physCellIdVic is only a naming manner, which represents a meaning indicating a PCI of a cell whose receiving end CRS SNR is smaller; and a cell with a smaller and a CRS SNR difference, and a PRS SNR difference threshold, snrDifference may be a CRS receiving end SNR difference, and may also be a PRS receiving end SNR difference (one of which is determined according to the stipulation of a protocol).

Likewise, when a cell pair whose receiving end CRS power or CRS SNR exceeds the difference threshold is reported, its LPP signaling form may be reported one pair by one pair as described in the foregoing; or a cell may be taken as an investigated cell, and a cell, a difference between which and this investigated cell exceeds a threshold, is reported. Then its LPP signaling example may be as follows.

When the terminal performs reporting, an investigated cell is taken, then the investigated cell is compared with other neighboring cells, and a cell, a difference between which and the investigated cell exceeds the difference threshold, is reported as a list, where all cells in this list are cells, a receiving end power or SNR difference between which and the current investigated cell exceeds the threshold. The signaling is exemplified as follows:

```
- ASN1START
OTDOA-ProvideCapabilities::= SEQUENCE {
  otdoa-Mode        BIT STRING {    ue-assisted (0) } (SIZE (1..8)),
  ...,
  supportedBandListEUTRA    SEQUENCE (SIZE (1..maxBands)) OF SupportedBandEUTRA
  cRSSNRDiffCellList        SEQUENCE (SIZE (1..x)) OF CRSSNRDiffCell
  OPTIONAL
```

```
}
maxBands INTEGER::= 64
SupportedBandEUTRA::= SEQUENCE {
  bandEUTRA                   INTEGER (1..64)
}
CRSSNRDiffCell::= SEQUENCE {
  earfcn                      ARFCN-ValueEUTRA        OPTIONAL,
  physCellIdRef               INTEGER (0..503),
  cellGlobalIdRef             ECGI                    OPTIONAL,       -- Need ON
  failedThresCellList SEQUENCE (SIZE (1..y)) OF FailedThresCell
}
FailedThresCell::= SEQUENCE {
  physCellId                  INTEGER (0..503),
  cellGlobalId                ECGI                    OPTIONAL,       -- Need ON
  sNRDifference               INTERGER (1..z),        OPTIONAL,
}
-- ASN1STOP
``` cRSSNRDiffCellList (CRS SNR difference cell list) is only a naming manner, which represents a meaning indicating a list of a cell whose CRS received SNR difference reported by the terminal to the network side is excessively large. The length x of this list represents the number of investigated cells.

CRSSNRDiffCell (CRS SNR difference cell) is only a naming manner, which represents a meaning indicating information of a cell whose receiving end CRS SNR difference reported by the terminal to the network side is excessively large. An inner composition of its IE includes that: physCellIdRef is only a naming manner, which represents a meaning indicating a PCI of an investigated cell. cellGlobalIdRef is only a naming manner, which represents a meaning indicating a CGI of the investigated cell. failedThresCellList is only a naming manner, which represents a meaning indicating a list of a cell that does not satisfy the difference threshold by being compared with this investigated cell. y is only a naming manner, which represents a meaning indicating the number of cells (the length of a cell list) that do not satisfy the difference threshold by being compared with the investigated cell. FailedThresCell is only a naming manner, which represents a meaning indicating information of a cell that does not satisfy the difference threshold by being compared with the investigated cell. physCellId is only a naming manner, which represents a meaning indicating a PCI of a cell, namely, a PCI of a cell that does not satisfy the difference threshold by being compared with the investigated cell in this signaling. Similarly, cellGlobalId is only a naming manner, which represents a meaning indicating a CGI of a cell, namely, a CGI of a cell that does not satisfy the difference threshold by being compared with the investigated cell in this signaling. sNR-Difference is only a naming manner, which represents a meaning indicating a receiving end SNR difference between a cell that does not satisfy the difference threshold by being compared with the investigated cell and the investigated cell, and this value may be positive or negative and the value ranges from 1 to z. z is only a naming manner, which represents a meaning indicating a reporting range of an SNR difference, which is an index value, ranges from 1 to z (all of which are greater than zero), and is mapped to a true value that is positive or negative.

(2) The terminal may send the cell subset information when requesting assistance information.

An LPP information element OTDOA-RequestAssistanceData (OTDOA-RequestAssistanceData) is an information element that is sent by the terminal to the positioning server to request assistance data (reference is made to 3GPP TS36.355), and the italic part is a part which the embodiment of the present invention adds. If a power difference is investigated, an example is made as follows:

```
-- ASN1START
OTDOA-RequestAssistanceData::= SEQUENCE {
  physCellId           INTEGER (0..503),
  crsPowerDiffCellPairList       SEQUENCE (SIZE (1..maxNum)) OF CRSPowerDiffCellPair
  ...
}
maxNum INTEGER::= x
CRSPowerDiffCellPair::= SEQUENCE {
  earfcn               ARFCN-ValueEUTRA        OPTIONAL,
  physCellIdAgr        INTEGER (0..503),
  cellGlobalIdAgr      ECGI                    OPTIONAL,       -- Need ON
  physCellIdVic        INTEGER (0..503),
  cellGlobalIdVic      ECGI                    OPTIONAL,       -- Need ON
  powerDifference      INTERGER (1..y),        OPTIONAL,
}
-- ASN1STOP
```

For a meaning of each parameter, reference is made to the description in (1) of the signaling form 1, which is no longer described herein.

When a cell pair whose receiving end CRS power or CRS SNR exceeds the difference threshold is reported, its LPP signaling form may be reported one pair by one pair as described in the foregoing; or a cell may be taken as an investigated cell, and a cell, a difference between which and this investigated cell exceeds a threshold, is reported. Then its the LPP signaling example may be as follows.

When the terminal performs reporting, an investigated cell is taken, then the investigated cell is compared with other neighboring cells, and a cell, a difference between which and the investigated cell exceeds the difference threshold, is reported as a list, where all cells in this list are cells, a receiving end power or SNR difference between which and the current investigated cell exceeds the threshold. The signaling is exemplified as follows:

```
-- ASN1START
OTDOA-RequestAssistanceData::= SEQUENCE {
  physCellId         INTEGER (0..503),
  cRSPowerDiffCellList    SEQUENCE (SIZE (1..x)) OF CRSPowerDiffCell
  ...
}
CRSPowerDiffCell::= SEQUENCE {
  earfcn             ARFCN-ValueEUTRA   OPTIONAL,
  physCellIdRef      INTEGER (0..503),
  cellGlobalIdRef    ECGI                OPTIONAL,      -- Need ON
  failedThresCellList SEQUENCE (SIZE (1..y)) OF FailedThresCell
}
FailedThresCell::= SEQUENCE {
  physCellId         INTEGER (0..503),
  cellGlobalId       ECGI                OPTIONAL,      -- Need ON
  powerDifference    INTERGER (1..z),    OPTIONAL,
}
-- ASN1STOP
```

For a meaning of each parameter, reference is made to the description in the part corresponding to (1) of the signaling form 1, which is no longer described herein.

If an SNR difference is investigated, it may also be written as:

```
-- ASN1START
OTDOA-RequestAssistanceData::= SEQUENCE {
  physCellId         INTEGER (0..503),
  crsSNRDiffCellPairList     SEQUENCE (SIZE (1..maxNum)) OF CRSSNRDiffCellPair
  ...
}
maxNum INTEGER::= x
CRSSNRDiffCellPair::= SEQUENCE {
  earfcn             ARFCN-ValueEUTRA  OPTIONAL,
  physCellIdAgr      INTEGER (0..503),
  cellGlobalIdAgr    ECGI                OPTIONAL,      -- Need ON
  physCellIdVic      INTEGER (0..503),
  cellGlobalIdVic    ECGI                OPTIONAL,      -- Need ON
  snrDifference      INTERGER (1..y),    OPTIONAL,
}
-- ASN1STOP
```

For a meaning of each parameter, reference is made to the description in (1) of the signaling form 1, which is no longer described herein.

Likewise, when a cell pair whose receiving end CRS power or CRS SNR exceeds the difference threshold is reported, its LPP signaling form may be reported one pair by one pair as described in the foregoing; or a cell may be taken as an investigated cell, and a cell, a difference between which and this investigated cell exceeds a threshold, is reported. Then its LPP signaling example may be as follows.

When the terminal performs reporting, an investigated cell is taken, then the investigated cell is compared with other neighboring cells, and a cell, a difference between which and the investigated cell exceeds the difference threshold, is reported as a list, where all cells in this list are cells, a receiving end power or SNR difference between which and the current investigated cell exceeds the threshold. The signaling is exemplified as follows:

```
-- ASN1START
OTDOA-RequestAssistanceData::= SEQUENCE {
  physCellId         INTEGER (0..503),
  cRSSNRDiffCellList    SEQUENCE (SIZE (1..x)) OF CRSSNRDiffCell
  ...
}
CRSSNRDiffCell::= SEQUENCE {
  earfcn             ARFCN-ValueEUTRA  OPTIONAL,
  physCellIdRef      INTEGER (0..503),
  cellGlobalIdRef    ECGI                OPTIONAL,      -- Need ON
  failedThresCellList SEQUENCE (SIZE (1..y)) OF FailedThresCell
}
FailedThresCell::= SEQUENCE {
  physCellId         INTEGER (0..503),
  cellGlobalId       ECGI                OPTIONAL,      -- Need ON
  sNRDifference      INTERGER (1..z),    OPTIONAL,
}
-- ASN1STOP
```

For a meaning of each parameter, reference is made to the description in the part corresponding to (1) of the signaling form 1, which is no longer described herein.

Signaling Form 2:

In step 401, the network side delivers the CRS received power or SNR difference threshold, a content reported by the terminal is those cell pairs whose receiving end CRS power or CRS SNR does not exceed the difference threshold, and LPP signaling is exemplified as:

(1) The terminal may send the cell subset information when exchanging a capability with the positioning server.

An LPP information element OTDOA-ProvideCapabilities (OTDOA providing capabilities) is an information element that is sent by the terminal to the positioning server to report its own capability (reference is made to 3GPP TS36.355), and the italic part is a part which the embodiment of the present invention adds. If a CRS received power (RSRP) difference is investigated, an example is made as follows:

indicating a CGI of the cell whose CRS power is smaller. powerDifference is only a naming manner, which represents a meaning indicating a CRS power difference that is received by the terminal and is between two cells involved in this IE: CRSPowerDiffCellPair. y is only a naming manner, which represents a meaning indicating a reporting range of a power difference.

earfcn is only a naming manner, which represents a meaning indicating an E-UTRAN absolute radio frequency channel number; and this IE may not be sent in a common-frequency network, but for a CA or multi-frequency point system, this IE that indicates the number of a frequency point or the number of a carrier whose received power or SNR difference between two common-frequency cells does not exceed the difference threshold is sent.

Herein, it should be noted that, if the network side delivers a CRS power difference threshold, this reported powerDifference is a CRS received power (RSRP) difference. If the network delivers a mapping factor between a PRS power

```
-- ASN1START
OTDOA-ProvideCapabilities::= SEQUENCE {
   otdoa-Mode          BIT STRING {    ue-assisted (0) } (SIZE (1..8)),
   ...,
   supportedBandListEUTRA    SEQUENCE (SIZE (1..maxBands)) OF SupportedBandEUTRA
   crsPowerDiffCellPairList  SEQUENCE (SIZE (1..maxNum)) OF CRSPowerDiffCellPair
   OPTIONAL
}
maxBands INTEGER::= 64
maxNum INTEGER::= x
SupportedBandEUTRA::= SEQUENCE {
   bandEUTRA                    INTEGER (1..64)
}
CRSPowerDiffCellPair::= SEQUENCE {
   earfcn            ARFCN-ValueEUTRA      OPTIONAL,
   physCellIdHigher       INTEGER (0..503),
   cellGlobalIdHigher      ECGI                   OPTIONAL,      -- Need ON
   physCellIdLower     INTEGER (0..503),
   cellGlobalIdLower       ECGI                   OPTIONAL,      -- Need ON
   powerDifference     INTERGER (1..y),   OPTIONAL,
}
-- ASN1STOP
``` crsPowerDiffCellPairList (CRS power difference cell pair list) is only a naming manner, which represents a meaning indicating a list of a cell pair whose CRS received power difference reported by the terminal to the network side does not exceed the difference threshold. A value of the length maxNum=x of this list may be determined according to a terminal capability and a network requirement.

CRSPowerDiffCellPair (CRS power difference cell pair) is only a naming manner, which represents a meaning indicating a cell pair whose CRS received power difference reported by the terminal to the network side does not exceed the difference threshold. An inner composition of its IE includes that: physCellIdHigher is only a naming manner, which represents a meaning indicating a PCI of a cell whose CRS power is larger. cellGlobalIdHigher is only a naming manner, which represents a meaning indicating a CGI of the cell whose CRS power is larger. physCellIdLower is only a naming manner, which represents a meaning indicating a PCI of a cell whose CRS power is smaller. cellGlobalIdLower is only a naming manner, which represents a meaning difference and a CRS power difference, and a PRS power difference threshold, powerDifference may be a CRS received power (RSRP) difference, and may also be a PRS received power difference (one of which is determined according to the stipulation of a protocol).

When a cell pair whose receiving end CRS power or CRS SNR does not exceed the difference threshold is reported, its LPP signaling form may be reported one pair by one pair as described in the foregoing; or a certain cell may be taken as an investigated cell, and a cell, a difference between which and this investigated cell does not exceed a threshold, is reported. Then its LPP signaling example may be as follows.

When the terminal performs reporting, an investigated cell is taken, then the investigated cell is compared with other neighboring cells, and a cell, a difference between which and the investigated cell does not exceed the difference threshold, is reported as a list, where all cells in this list are cells, a receiving end power or SNR difference between which and the current investigated cell does not exceed the threshold. The signaling is exemplified as follows:

```
-- ASN1START
OTDOA-ProvideCapabilities::= SEQUENCE {
   otdoa-Mode    BIT STRING {    ue-assisted (0) } (SIZE (1..8)),
   ...,
```

```
supportedBandListEUTRA    SEQUENCE (SIZE (1..maxBands)) OF SupportedBandEUTRA
cRSPowerDiffCellList      SEQUENCE (SIZE (1..x)) OF CRSPowerDiffCell
OPTIONAL
}
maxBands INTEGER::= 64
SupportedBandEUTRA::= SEQUENCE {
  bandEUTRA                    INTEGER (1..64)
}
CRSPowerDiffCell::= SEQUENCE {
  earfcn         ARFCN-ValueEUTRA  OPTIONAL,
  physCellIdRef  INTEGER (0..503),
  cellGlobalIdRef  ECGI                    OPTIONAL,         -- Need ON
  passedThresCellList SEQUENCE (SIZE (1..y)) OF PassedThresCell
}
PassedThresCell::= SEQUENCE {
  physCellId     INTEGER (0..503),
  cellGlobalId   ECGI           OPTIONAL,      -- Need ON
  powerDifference  INTERGER (1..z),  OPTIONAL,
}
-- ASN1STOP
``` crsPowerDiffCellList (CRS power difference cell list) is only a naming manner, which represents a meaning indicating a list of a cell whose CRS received power difference reported by the terminal to the network side does not exceed the threshold. The length x of this list represents the number of investigated cells.

CRSPowerDiffCell (CRS power difference cell) is only a naming manner, which represents a meaning indicating information of a cell whose CRS received power difference reported by the terminal to the network side does not exceed the threshold. An inner composition of its IE includes that: physCellIdRef is only a naming manner, which represents a meaning indicating a PCI of an investigated cell. cellGlobalIdRef is only a naming manner, which represents a meaning indicating a CGI of the investigated cell. passedThresCellList is only a naming manner, which represents a meaning indicating a list of a cell that does not exceed the difference threshold by being compared with this investigated cell. y is only a naming manner, which represents a meaning: indicating the number of cells (the length of a cell list) that do not exceed the difference threshold by being compared with the investigated cell. PassedThresCell is only a naming manner, which represents a meaning indicating information of a cell that does not exceed the difference threshold by being compared with the investigated cell. physCellId is only a naming manner, which represents a meaning indicating a PCI of a cell, namely, a PCI of a cell that does not exceed the difference threshold by being compared with the investigated cell in this signaling. Similarly, cellGlobalId is only a naming manner, which represents a meaning indicating a CGI of a cell, namely, a CGI of a cell that does not exceed the difference threshold by being compared with the investigated cell in this signaling. powerDifference is only a naming manner, which represents a meaning indicating a power difference between a cell that does not exceed the difference threshold compared with the investigated cell and the investigated cell, and this value may be positive or negative, and the value ranges from 1 to z. z is only a naming manner, which represents a meaning indicating a reporting range of a power difference, which is an index value, ranges from 1 to z (all of which are greater than zero), and is mapped to a true value that is positive or negative.

earfcn is only a naming manner, which represents a meaning indicating an E-UTRAN (absolute radio frequency channel number; and this IE may not be sent in a common-frequency network, but for a CA or multi-frequency point system, this IE that indicates the number of a frequency point or the number of a carrier whose received power or SNR difference between two common-frequency cells does not exceed the difference threshold is sent.

If an SNR difference is investigated, it may also be written as:

```
-- ASN1START
OTDOA-ProvideCapabilities::= SEQUENCE {
  otdoa-Mode  BIT STRING {   ue-assisted (0) } (SIZE (1..8)),
  ...,
  supportedBandListEUTRA    SEQUENCE (SIZE (1..maxBands)) OF SupportedBandEUTRA
  crsSNRDiffCellPairList    SEQUENCE (SIZE (1..maxNum)) OF CRSSNRDiffCellPair
  OPTIONAL
}
maxBands INTEGER::= 64
maxNum INTEGER::= x
SupportedBandEUTRA::= SEQUENCE {
  bandEUTRA                        INTEGER (1..64)
}
CRSSNRDiffCellPair::= SEQUENCE {
  earfcn             ARFCN-ValueEUTRA  OPTIONAL,
  physCellIdHigher   INTEGER (0..503),
  cellGlobalIdHigher ECGI                     OPTIONAL,     -- Need ON
  physCellIdLower    INTEGER (0..503),
```

```
cellGlobalIdLower      ECGI                    OPTIONAL,       -- Need ON
snrDifference          INTERGER (1..y),        OPTIONAL,
}
-- ASN1STOP
``` crsSNRDiffCellPairList (CRS SNR difference cell pair list) is only a naming manner, which represents a meaning indicating a list of a cell pair whose receiving end CRS SNR difference reported by the terminal to the network side does not exceed the difference threshold.

CRSSNRDiffCellPair (CRS SNR difference cell pair) is only a naming manner, which represents a meaning indicating a cell pair whose receiving end CRS SNR value reported by the terminal to the network side does not exceed the difference threshold. An inner composition of its IE includes that: physCellIdHigher is only a naming manner, which represents a meaning indicating a PCI of a cell whose receiving end CRS SNR is larger. cellGlobalIdHigher is only a naming manner, which represents a meaning indicating a CGI of the cell whose receiving end CRS SNR is larger. physCellIdLower is only a naming manner, which represents is reported, its LPP signaling form may be reported one pair by one pair as described in the foregoing; or a cell may be taken as an investigated cell, and a cell, a difference between which and this investigated cell does not exceed a threshold, is reported. Then its LPP signaling example may be as follows.

When the terminal performs reporting, an investigated cell is taken, then the investigated cell is compared with other neighboring cells, and a cell, a difference between which and the investigated cell does not exceed the difference threshold, is reported as a list, where all cells in this list are cells, a receiving end power or SNR difference between which and the current investigated cell does not exceed the threshold. The signaling is exemplified as follows:

```
-- ASN1START
OTDOA-ProvideCapabilities::= SEQUENCE {
  otdoa-Mode  BIT STRING {     ue-assisted (0) } (SIZE (1..8)),
  ...,
  supportedBandListEUTRA      SEQUENCE (SIZE (1..maxBands)) OF SupportedBandEUTRA
  cRSSNRDiffCellList  SEQUENCE (SIZE (1..x))OF CRSSNRDiffCell
  OPTIONAL
}
maxBands INTEGER::= 64
SupportedBandEUTRA::= SEQUENCE {
  bandEUTRA                              INTEGER (1..64)
}
CRSSNRDiffCell::= SEQUENCE {
  earfcn                  ARFCN-ValueEUTRA   OPTIONAL,
  physCellIdRef           INTEGER (0..503),
  cellGlobalIdRef         ECGI                OPTIONAL,     -- Need ON
  passedThresCellList SEQUENCE (SIZE (1..y)) OF PassedThresCell
}
PassedThresCell::= SEQUENCE {
  physCellId              INTEGER (0..503),
  cellGlobalId            ECGI                OPTIONAL,     -- Need ON
  sNRDifference           INTERGER (1..z),    OPTIONAL,
}
-- ASN1STOP
``` a meaning indicating a PCI of a cell whose receiving end CRS SNR is smaller. cellGlobalIdLower is only a naming manner, which represents a meaning indicating a CGI of the cell whose receiving end CRS SNR is smaller. snrDifference is only a naming manner, which represents a meaning indicating a receiving end CRS SNR difference between two cells involved in this IE: CRSSNRDiffCellPair. y is only a naming manner, which represents a meaning indicating a reporting range of an SNR difference.

Herein, it should be noted that, if the network side delivers a CRS SNR difference threshold, this reported snrDifference is a CRS receiving end SNR difference. If the network delivers a mapping factor between a PRS SNR difference and a CRS SNR difference, and a PRS SNR difference threshold, snrDifference may be a CRS receiving end SNR difference, and may also be a PRS receiving end SNR difference (one of which is determined according to the stipulation of a protocol).

Likewise, when a cell pair whose receiving end CRS power or CRS SNR does not exceed the difference threshold cRSSNRDiffCellList (CRS SNR difference cell list) is only a naming manner, which represents a meaning indicating a list of a cell whose CRS received SNR difference reported by the terminal to the network side does not exceed the threshold. The length x of this list represents the number of investigated cells.

CRSSNRDiffCell (CRS SNR difference cell) is only a naming manner, which represents a meaning indicating information of a cell whose receiving end CRS SNR difference reported by the terminal to the network side does not exceed the threshold. An inner composition of its IE includes that: physCellIdRef is only a naming manner, which represents a meaning indicating a PCI of an investigated cell. cellGlobalIdRef is only a naming manner, which represents a meaning indicating a CGI of the investigated cell. passedThresCellList is only a naming manner, which represents a meaning indicating a list of a cell that does not exceed the difference threshold by being compared with this investigated cell. y is only a naming manner, which represents a meaning indicating the number of cells (the length of a cell list) that do not exceed the difference threshold by being compared with the investigated cell. PassedThresCell is only a naming manner, which represents a meaning indicating information of a cell that does not exceed the difference threshold by being compared with the investigated cell. physCellId is only a naming manner, which represents a meaning indicating a PCI of a cell, namely, a PCI of a cell that does not exceed the difference threshold by being compared with the investigated cell in this signaling. Similarly, cellGlobalId is only a naming manner, which represents a meaning indicating a CGI of a cell, namely, a CGI of a cell that does not exceed the difference threshold by being compared with the investigated cell in this signaling. sNRDifference is only a naming manner, which represents a meaning indicating a receiving end SNR difference between a cell that does not exceed the difference threshold by being compared with the investigated cell and the investigated cell, and this value may be positive or negative, and the value ranges from 1 to z. z is only a naming manner, which represents a meaning indicating a reporting range of an SNR difference, which is an index value, ranges from 1 to z (all of which are greater than zero), and is mapped to a true value that is positive or negative.

(2) The terminal may send the cell subset information when requesting assistance information.

An LPP information element OTDOA-RequestAssistanceData (OTDOA-RequestAssistanceData) is an information element that is sent by the terminal to the positioning server to request assistance data (reference is made to 3GPP TS36.355), and the italic part is a part which the embodiment of the present invention adds. If a received power difference is investigated, an example is made as follows:

```
-- ASN1START
OTDOA-RequestAssistanceData::= SEQUENCE {
  physCellId            INTEGER (0..503),
  crsPowerDiffCellPairList          SEQUENCE (SIZE (1..maxNum)) OF CRSPowerDiffCellPair
  ...
}
maxNum INTEGER::= x
CRSPowerDiffCellPair::= SEQUENCE {
  earfcn              ARFCN-ValueEUTRA      OPTIONAL,
  physCellIdHigher              INTEGER (0..503),
  cellGlobalIdHigher            ECGI                  OPTIONAL,      -- Need ON
  physCellIdLower     INTEGER (0..503),
  cellGlobalIdLower             ECGI                  OPTIONAL,      -- Need ON
  powerDifference     INTERGER (1..y),                OPTIONAL,
}
-- ASN1STOP
```

For a meaning of each parameter, reference is made to the description in (1) of the signaling form 2, which is no longer described herein.

When a cell pair whose receiving end CRS power or CRS SNR does not exceed the difference threshold is reported, its LPP signaling form may be reported one pair by one pair as described in the foregoing; or a cell may be taken as an investigated cell, and a cell, a difference between which and this investigated cell does not exceed a threshold, is reported. Then its LPP signaling example may be as follows.

When the terminal performs reporting, an investigated cell is taken, then the investigated cell is compared with other neighboring cells, and a cell, a difference between which and the investigated cell does not exceed the difference threshold, is reported as a list, where all cells in this list are cells, a receiving end power or SNR difference between which and the current investigated cell does not exceed the threshold. The signaling is exemplified as follows:

```
-- ASN1START
OTDOA-RequestAssistanceData::= SEQUENCE {
  physCellId     INTEGER (0..503),
  cRSPowerDiffCellList     SEQUENCE (SIZE (1..x)) OF CRSPowerDiffCell
  ...
}
CRSPowerDiffCell::= SEQUENCE {
  earfcn              ARFCN-ValueEUTRA  OPTIONAL,
  physCellIdRef       INTEGER (0..503),
  cellGlobalIdRef     ECGI                       OPTIONAL,      -- Need ON
  passedThresCellList SEQUENCE (SIZE (1..y)) OF PassedThresCell
}
```

-continued

```
PassedThresCell::= SEQUENCE {
  physCellId        INTEGER (0..503),
  cellGlobalId      ECGI              OPTIONAL,      -- Need ON
  powerDifference   INTERGER (1..z),  OPTIONAL,
}
-- ASN1STOP
```

For a meaning of each parameter, reference is made to the description in the part corresponding to (1) of the signaling form 2, which is no longer described herein.

If an SNR difference is investigated, it may be written as:

```
-- ASN1START
OTDOA-RequestAssistanceData::= SEQUENCE {
  physCellId           INTEGER (0..503),
  crsSNRDiffCellPairList      SEQUENCE (SIZE (1..maxNum)) OF CRSSNRDiffCellPair
  ...
}
maxNum INTEGER::= x
CRSSNRDiffCellPair::= SEQUENCE {
  earfcn            ARFCN-ValueEUTRA    OPTIONAL,
  physCellIdHigher      INTEGER (0..503),
  cellGlobalIdHigher    ECGI                OPTIONAL,      -- Need ON
  physCellIdLower       INTEGER (0..503),
  cellGlobalIdLower     ECGI                OPTIONAL,      -- Need ON
  snrDifference         INTERGER (1..y),    OPTIONAL,
}
-- ASN1STOP
```

For a meaning of each parameter, reference is made to the description in (1) of the signaling form 2, which is no longer described herein.

Likewise, when a cell pair whose receiving end CRS power or CRS SNR does not exceed the difference threshold is reported, its LPP signaling form may be reported one pair by one pair as described in the foregoing; or a cell may be taken as an investigated cell, and a cell, a difference between which and this investigated cell does not exceed the threshold, is reported. Then its LPP signaling example may be as follows.

When the terminal performs reporting, an investigated cell is taken, then the investigated cell is compared with other neighboring cells, and a cell, a difference between which and the investigated cell does not exceed the difference threshold, is reported as a list, where all cells in this list are cells, a receiving end power or SNR difference between which and the current investigated cell does not exceed the threshold. The signaling is exemplified as follows:

For a meaning of each parameter, reference is made to the description in the part corresponding to (1) of the signaling form 2, which is no longer described herein.

Signaling Form 3:

In step 401, the network side delivers the PRS received power or SNR difference threshold and the mapping factor between the PRS power difference and the CRS power difference, a content reported by the terminal is those cell pairs whose receiving end PRS power or receiving end PRS SNR exceeds the difference threshold, and LPP signaling is exemplified as:

(1) The terminal may send the cell subset information when exchanging a capability with the positioning server.

An LPP information element OTDOA-ProvideCapabilities (OTDOA providing capabilities) is an information element that is sent by the terminal to the positioning server to report its own capability (reference is made to 3GPP TS36.355), and the italic part is a part which the embodiment of the present invention adds. If a CRS received power (RSRP) difference is investigated, an example is made as follows:

```
-- ASN1START
OTDOA-RequestAssistanceData::= SEQUENCE {
  physCellId  INTEGER (0..503),
  cRSSNRDiffCellList SEQUENCE (SIZE (1..x)) OF CRSSNRDiffCell
  ...
}
CRSSNRDiffCell::= SEQUENCE {
  earfcn            ARFCN-ValueEUTRA    OPTIONAL,
  physCellIdRef     INTEGER (0..503),
  cellGlobalIdRef   ECGI                OPTIONAL,   -- Need ON
  passedThresCellList SEQUENCE (SIZE (1..y)) OF PassedThresCell
}
PassedThresCell::= SEQUENCE {
  physCellId      INTEGER (0..503),
  cellGlobalId    ECGI                OPTIONAL,   -- Need ON
  sNRDifference   INTERGER (1..z), OPTIONAL,
}
-- ASN1STOP
```

```
-- ASN1START
OTDOA-ProvideCapabilities::= SEQUENCE {
  otdoa-Mode  BIT STRING {  ue-assisted (0) } (SIZE (1..8)),
  ...,
  supportedBandListEUTRA        SEQUENCE (SIZE (1..maxBands)) OF SupportedBandEUTRA
  prsPowerDiffCellPairList      SEQUENCE (SIZE (1..maxNum)) OF PRSPowerDiffCellPair
  OPTIONAL
}
maxBands INTEGER::= 64
maxNum INTEGER::= x
SupportedBandEUTRA::= SEQUENCE {
  bandEUTRA                     INTEGER (1..64)
}
PRSPowerDiffCellPair::= SEQUENCE {
  earfcn                  ARFCN-ValueEUTRA    OPTIONAL,
  physCellIdAgr           INTEGER (0..503),
  cellGlobalIdAgr         ECGI                            OPTIONAL,  -- Need ON
  physCellIdVic           INTEGER (0..503),
  cellGlobalIdVic         ECGI                            OPTIONAL,  -- Need ON
  powerDifference         INTERGER (1..y),                OPTIONAL,
}
-- ASN1STOP
``` prsPowerDiffCellPairList (PRS power difference cell pair list) is only a naming manner, which represents a meaning indicating a list of a cell pair whose PRS received power difference reported by the terminal to the network side is excessively large. A value of the length maxNum=x of this list may be determined according to a terminal capability and a network requirement.

PRSPowerDiffCellPair (PRS power difference cell pair) is only a naming manner, which represents a meaning indicating a cell pair whose PRS received power difference reported by the terminal to the network side is excessively large. An inner composition of its IE includes that: physCellIdAgr is only a naming manner, which represents a meaning indicating a PCI of a cell whose PRS power is larger; and a cell with larger power generates PRS interference with a cell with smaller power (when a difference between the two is greater than a certain threshold), and therefore, the cell with larger power is also referred to as an interference source cell. cellGlobalIdAgr is only a naming manner, which represents a meaning indicating a CGI of the interference source cell. physCellIdVic is only a naming manner, which represents a meaning indicating a PCI of a cell whose PRS power is smaller; and a cell with smaller power receives PRS interference from a cell with larger power (when a difference between the two is greater than a certain threshold), and therefore, the cell with smaller power is also referred to as a victim cell. cellGlobalIdVic is only a naming manner, which represents a meaning indicating a CGI of the victim cell. powerDifference is only a naming manner, which represents a meaning indicating a PRS power difference that is received by the terminal and is between two cells (a victim cell and an interference source cell) involved in this IE: PRSPowerDiffCellPair. y is only a naming manner, which represents a meaning indicating a reporting range of a power difference.

earfcn is only a naming manner, which represents a meaning indicating an E-UTRAN absolute radio frequency channel number; and this IE may not be sent in a common-frequency network, but for a CA or multi-frequency point system, this IE that indicates the number of a frequency point or the number of a carrier whose received power or SNR difference between two common-frequency cells is excessively large is sent.

Herein, it should be noted that, if the network side delivers a CRS power difference threshold, this reported powerDifference is a CRS received power (RSRP) difference. If the network delivers a mapping factor between a PRS power difference and a CRS power difference, and a PRS power difference threshold, powerDifference may be a CRS received power (RSRP) difference, and may also be a PRS received power difference (one of which is determined according to the stipulation of a protocol).

When a cell pair whose receiving end PRS power or PRS SNR exceeds the difference threshold is reported, its LPP signaling form may be reported one pair by one pair as described in the foregoing; or a certain cell may be taken as an investigated cell, and a cell, a difference between which and this investigated cell exceeds a threshold, is reported. Then its LPP signaling example may be as follows.

When the terminal performs reporting, an investigated cell is taken, then the investigated cell is compared with other neighboring cells, and a cell, a difference between which and the investigated cell exceeds the difference threshold, is reported as a list, where all cells in this list are cells, a receiving end power or SNR difference between which and the current investigated cell exceeds the threshold. The signaling is exemplified as follows:

```
-- ASN1START
OTDOA-ProvideCapabilities::= SEQUENCE {
  otdoa-Mode  BIT STRING {  ue-assisted (0) } (SIZE (1..8)),
  ...,
  supportedBandListEUTRA        SEQUENCE (SIZE (1..maxBands)) OF SupportedBandEUTRA
  pRSPowerDiffCellList          SEQUENCE (SIZE (1..x)) OF PRSPowerDiffCell
  OPTIONAL
}
maxBands INTEGER::= 64
SupportedBandEUTRA::= SEQUENCE {
```

```
bandEUTRA                          INTEGER (1..64)
}
PRSPowerDiffCell::= SEQUENCE {
  earfcn                 ARFCN-ValueEUTRA            OPTIONAL,
  physCellIdRef          INTEGER (0..503),
  cellGlobalIdRef        ECGI                        OPTIONAL, -- Need ON
  failedThresCellList SEQUENCE (SIZE (1..y)) OF FailedThresCell
}
FailedThresCell::= SEQUENCE {
  physCellId             INTEGER (0..503),
  cellGlobalId           ECGI                        OPTIONAL, -- Need ON
  powerDifference        INTERGER (1..z),            OPTIONAL,
}
-- ASN1STOP
``` prsPowerDiffCellList (PRS power difference cell list) is only a naming manner, which represents a meaning indicating a list of a cell whose PRS received power difference reported by the terminal to the network side is excessively large. The length x of this list represents the number of investigated cells.

PRSPowerDiffCell (PRS power difference cell) is only a naming manner, which represents a meaning indicating information of a cell whose PRS received power difference reported by the terminal to the network side is excessively large. An inner composition of its IE includes that: physCellIdRef is only a naming manner, which represents a meaning indicating a PCI of an investigated cell. cellGlobalIdRef is only a naming manner, which represents a meaning indicating a CGI of the investigated cell. failedThresCellList is only a naming manner, which represents a meaning indicating a list of a cell that does not satisfy the difference threshold by being compared with this investigated cell. y is only a naming manner, which represents a meaning indicating the number of cells (the length of a cell list) that do not satisfy the difference threshold by being compared with the investigated cell. FailedThresCell is only a naming manner, which represents a meaning indicating information of a cell that does not satisfy the difference threshold by being compared with the investigated cell. physCellId is only a naming manner, which represents a meaning indicating a PCI of a cell, namely, a PCI of a cell that does not satisfy the difference threshold by being compared with the investigated cell in this signaling. Similarly, cellGlobalId is only a naming manner, which represents a meaning indicating a CGI of a cell, namely, a CGI of a cell that does not satisfy the difference threshold by being compared with the investigated cell in this signaling. powerDifference is only a naming manner, which represents a meaning indicating a power difference between a cell that does not satisfy the difference threshold by being compared with the investigated cell and the investigated cell, and this value may be positive or negative, and the value ranges from 1 to z. z is only a naming manner, which represents a meaning indicating a reporting range of a power difference, which is an index value, ranges from 1 to z (all of which are greater than zero), and is mapped to a true value that is positive or negative.

earfcn is only a naming manner, which represents a meaning indicating an E-UTRAN absolute radio frequency channel number; and this IE may not be sent in a common-frequency network, but for a CA or multi-frequency point system, this IE that indicates a number of a frequency point or a number of a carrier whose received power or SNR difference between two common-frequency cells is excessively large is sent.

If an SNR difference is investigated, it may also be written as:

```
-- ASN1START
OTDOA-ProvideCapabilities::= SEQUENCE {
  otdoa-Mode  BIT STRING {  ue-assisted (0) } (SIZE (1..8)),
  ...,
  supportedBandListEUTRA      SEQUENCE (SIZE (1..maxBands)) OF SupportedBandEUTRA
  pRSSNRDiffCellPairList      SEQUENCE (SIZE (1..maxNum)) OF PRSSNRDiffCellPair
  OPTIONAL
}
maxBands INTEGER::= 64
maxNum INTEGER::= x
SupportedBandEUTRA::= SEQUENCE {
  bandEUTRA                          INTEGER (1..64)
}
PRSSNRDiffCellPair::= SEQUENCE {
  earfcn                 ARFCN-ValueEUTRA    OPTIONAL,
  physCellIdAgr          INTEGER (0..503),
  cellGlobalIdAgr        ECGI                        OPTIONAL, -- Need ON
  physCellIdVic          INTEGER (0..503),
  cellGlobalIdVic        ECGI                        OPTIONAL, -- Need ON
  snrDifference          INTERGER (1..y),            OPTIONAL,
}
-- ASN1STOP
``` pRSSNRDiffCellPairList (PRS SNR difference cell pair list) is only a naming manner, which represents a meaning indicating a list of a cell pair whose receiving end PRS SNR difference reported by the terminal to the network side is excessively large.

PRSSNRDiffCellPair (PRS SNR difference cell pair) is only a naming manner, which represents a meaning indicating a cell pair whose receiving end PRS SNR value reported by the terminal to the network side is excessively large. An inner composition of its IE includes that: physCellIdAgr is only a naming manner, which represents a meaning indicating a PCI of a cell whose receiving end PRS SNR is larger; and a cell with a larger SNR generates PRS interference with a cell with a smaller SNR (when a difference between the two is greater than a certain threshold), and therefore, the which and this investigated cell exceeds a threshold, is reported. Then its LPP signaling example may be as follows.

When the terminal performs reporting, an investigated cell is taken, then the investigated cell is compared with other neighboring cells, and a cell, a difference between which and the investigated cell exceeds the difference threshold, is reported as a list, where all cells in this list are cells, a receiving end power or SNR difference between which and the current investigated cell exceeds the threshold. The signaling is exemplified as follows:

```
-- ASN1START
OTDOA-ProvideCapabilities::= SEQUENCE {
   otdoa-Mode  BIT STRING { ue-assisted (0) } (SIZE (1..8)),
   ...;
   supportedBandListEUTRA         SEQUENCE (SIZE (1..maxBands)) OF SupportedBandEUTRA
   pRSSNRDiffCellList SEQUENCE (SIZE (1..x)) OF PRSSNRDiffCell
   OPTIONAL
}
maxBands INTEGER::= 64
SupportedBandEUTRA::= SEQUENCE {
   bandEUTRA                      INTEGER (1..64)
}
PRSSNRDiffCell::= SEQUENCE {
   earfcn                  ARFCN-ValueEUTRA            OPTIONAL,
   physCellIdRef           INTEGER (0..503),
   cellGlobalIdRef         ECGI                        OPTIONAL, -- Need ON
   failedThresCellList SEQUENCE (SIZE (1..y)) OF FailedThresCell
}
FailedThresCell::= SEQUENCE {
   physCellId              INTEGER (0..503),
   cellGlobalId            ECGI                        OPTIONAL, -- Need ON
   sNRDifference           INTERGER (1..z),  OPTIONAL,
}
-- ASN1STOP
``` cell with a larger SNR is also referred to as an interference source cell. cellGlobalIdAgr is only a naming manner, which represents a meaning indicating a CGI of the interference source cell. physCellIdVic is only a naming manner, which represents a meaning indicating a PCI of a cell whose receiving end PRS SNR is smaller; and a cell with a smaller SNR receives PRS interference from a cell with a larger SNR (when a difference between the two is greater than a certain threshold), and therefore, the cell with a smaller SNR is also referred to as a victim cell. cellGlobalIdVic is only a naming manner, which represents a meaning indicating a CGI of the victim cell. snrDifference is only a naming manner, which represents a meaning indicating a receiving end PRS SNR difference between two cells (a victim cell and an interference source cell) involved in this IE: PRSSNRDiffCellPair. y is only a naming manner, which represents a meaning indicating a reporting range of an SNR difference.

Herein, it should be noted that, if the network side delivers a CRS SNR difference threshold, this reported snrDifference is a CRS receiving end SNR difference. If the network delivers a mapping factor between a PRS SNR difference and a CRS SNR difference, and a PRS SNR difference threshold, snrDifference may be a CRS receiving end SNR difference, and may also be a PRS receiving end SNR difference (one of which is determined according to the stipulation of a protocol).

Likewise, when a cell pair whose receiving end PRS power or PRS SNR exceeds the difference threshold is reported, its LPP signaling form may be reported one pair by one pair as described in the foregoing; or a cell may be taken as an investigated cell, and a cell, a difference between pRSSNRDiffCellList (PRS SNR difference cell list) is only a naming manner, which represents a meaning indicating a list of a cell whose PRS received SNR difference reported by the terminal to the network side is excessively large. The length x of this list represents the number of investigated cells.

PRSSNRDiffCell (PRS SNR difference cell) is only a naming manner, which represents a meaning indicating information of a cell whose receiving end PRS SNR difference reported by the terminal to the network side is excessively large. An inner composition of its IE includes that: physCellIdRef is only a naming manner, which represents a meaning indicating a PCI of an investigated cell. cellGlobalIdRef is only a naming manner, which represents a meaning indicating a CGI of the investigated cell. failedThresCellList is only a naming manner, which represents a meaning indicating a list of a cell that does not satisfy the difference threshold by being compared with this investigated cell. y is only a naming manner, which represents a meaning indicating the number of cells (the length of a cell list) that do not satisfy the difference threshold by being compared with the investigated cell. FailedThresCell is only a naming manner, which represents a meaning indicating information of a cell that does not satisfy the difference threshold by being compared with the investigated cell. physCellId is only a naming manner, which represents a meaning indicating a PCI of a cell, namely, a PCI of a cell that does not satisfy the difference threshold by being compared with the investigated cell in this signaling. Similarly, cellGlobalId is only a naming manner, which represents a meaning indicating a CGI of a cell, namely, a CGI of a cell that does not satisfy the difference threshold by being compared with the investigated cell in this signaling. sNR- Difference is only a naming manner, which represents a meaning indicating a receiving end SNR difference between a cell that does not satisfy the difference threshold by being compared with the investigated cell and the investigated cell, and this value may be positive or negative, and the value ranges from 1 to z. z is only a naming manner, which represents a meaning indicating a reporting range of an SNR difference, which is an index value, ranges from 1 to z (all of which are greater than zero), and is mapped to a true value that is positive or negative.

(2) The terminal may send the cell subset information when requesting assistance information An LPP information element OTDOA-RequestAssistanceData (OTDOA-RequestAssistanceData) is an information element that is sent by the terminal to the positioning server to request assistance data (reference is made to 3GPP TS36.355), and the italic part is a part which the embodiment of the present invention adds. If a received power difference is investigated, an example is made as follows:

```
-- ASN1START
OTDOA-RequestAssistanceData::= SEQUENCE {
  physCellId          INTEGER (0..503),
  prsPowerDiffCellPairList    SEQUENCE (SIZE (1..maxNum)) OF PRSPowerDiffCellPair
  ...
}
maxNum INTEGER::= x
PRSPowerDiffCellPair::= SEQUENCE {
  earfcn              ARFCN-ValueEUTRA    OPTIONAL,
  physCellIdAgr       INTEGER (0..503),
  cellGlobalIdAgr     ECGI                            OPTIONAL,  -- Need ON
  physCellIdVic       INTEGER (0..503),
  cellGlobalIdVic     ECGI                            OPTIONAL,  -- Need ON
  powerDifference     INTERGER (1..y),                OPTIONAL,
}
-- ASN1STOP
```

For a meaning of each parameter, reference is made to the description in (1) of the signaling form 3, which is no longer described herein.

When a cell pair whose receiving end PRS power or PRS SNR exceeds the difference threshold is reported, its LPP signaling form may be reported one pair by one pair as described in the foregoing; or a cell may be taken as an investigated cell, and a cell, a difference between which and this investigated cell exceeds a threshold, is reported. Then its LPP signaling example may be as follows.

When the terminal performs reporting, an investigated cell is taken, then the investigated cell is compared with other neighboring cells, and a cell, a difference between which and the investigated cell exceeds the difference threshold, is reported as a list, where all cells in this list are cells, a receiving end power or SNR difference between which and the current investigated cell exceeds the threshold. The signaling is exemplified as follows:

```
-- ASN1START
OTDOA-RequestAssistanceData::= SEQUENCE {
  physCellId          INTEGER (0..503),
  pRSPowerDiffCellList    SEQUENCE (SIZE (1..x)) OF PRSPowerDiffCell
  ...
}
PRSPowerDiffCell::= SEQUENCE {
  earfcn              ARFCN-ValueEUTRA    OPTIONAL,
  physCellIdRef       INTEGER (0..503),
  cellGlobalIdRef     ECGI                            OPTIONAL,  -- Need ON
  failedThresCellList SEQUENCE (SIZE (1..y)) OF FailedThresCell
}
FailedThresCell::= SEQUENCE {
  physCellId          INTEGER (0..503),
  cellGlobalId        ECGI                            OPTIONAL,  -- Need ON
  powerDifference     INTERGER (1..z),                OPTIONAL,
}
-- ASN1STOP
```

For a meaning of each parameter, reference is made to the description in the part corresponding to (1) of the signaling form 3, which is no longer described herein.

If an SNR difference is investigated, it may be written as:

```
-- ASN1START
OTDOA-RequestAssistanceData::= SEQUENCE {
 physCellId   INTEGER (0..503),
 prsSNRDiffCellPairList    SEQUENCE (SIZE (1..maxNum)) OF PRSSNRDiffCellPair
 ...
}
maxNum INTEGER::= x
PRSSNRDiffCellPair::= SEQUENCE {
 earfcn          ARFCN-ValueEUTRA  OPTIONAL,
 physCellIdAgr      INTEGER (0..503),
 cellGlobalIdAgr    ECGI              OPTIONAL, -- Need ON
 physCellIdVic      INTEGER (0..503),
 cellGlobalIdVic    ECGI              OPTIONAL, -- Need ON
 snrDifference      INTERGER (1..y),  OPTIONAL,
}
-- ASN1STOP
```

For a meaning of each parameter, reference is made to the description in (1) of the signaling form 3, which is no longer described herein.

Likewise, when a cell pair whose receiving end PRS power or PRS SNR exceeds the difference threshold is reported, its LPP signaling form may be reported one pair by one pair as described in the foregoing; or a cell may be taken as an investigated cell, and a cell, a difference between which and this investigated cell exceeds a threshold, is reported. Then its LPP signaling example may be as follows.

When the terminal performs reporting, an investigated cell is taken, then the investigated cell is compared with other neighboring cells, and a cell, a difference between which and the investigated cell exceeds the difference threshold, is reported as a list, where all cells in this list are cells, a receiving end power or SNR difference between which and the current investigated cell exceeds the threshold. The signaling is exemplified as follows:

```
-- ASN1START
OTDOA-RequestAssistanceData::= SEQUENCE {
 physCellId   INTEGER (0..503),
 pRSSNRDiffCellList SEQUENCE (SIZE (1..x)) OF PRSSNRDiffCell
 ...
}
PRSSNRDiffCell::= SEQUENCE {
 earfcn           ARFCN-ValueEUTRA    OPTIONAL,
 physCellIdRef         INTEGER (0..503),
 cellGlobalIdRef       ECGI                OPTIONAL,  -- Need ON
 failedThresCellList SEQUENCE (SIZE (1..y)) OF FailedThresCell
}
FailedThresCell::= SEQUENCE {
 physCellId        INTEGER (0..503),
 cellGlobalId      ECGI                OPTIONAL, -- Need ON
 sNRDifference     INTERGER (1..z), OPTIONAL,
}
-- ASN1STOP
```

For a meaning of each parameter, reference is made to the description in the part corresponding to (1) of the signaling form 3, which is no longer described herein.

Signaling Form 4:

In step 401, the network side delivers the PRS received power or SNR difference threshold and the mapping factor between the PRS power difference and the CRS power difference, a content reported by the terminal is those cell pairs whose receiving end PRS power or receiving end PRS SNR does not exceed the difference threshold, and LPP signaling is exemplified as:

(1) The terminal may send the cell subset information when exchanging a capability with the positioning server.

An LPP information element OTDOA-ProvideCapabilities (OTDOA providing capabilities) is an information element that is sent by the terminal to the positioning server to report its own capability (reference is made to 3GPP TS36.355), and the italic part is a part which the embodiment of the present invention adds. If a CRS received power (RSRP) difference is investigated, an example is made as follows:

```
-- ASN1START
OTDOA-ProvideCapabilities::= SEQUENCE {
  otdoa-Mode  BIT STRING {  ue-assisted (0) } (SIZE (1..8)),
  ...,
  supportedBandListEUTRA      SEQUENCE (SIZE (1..maxBands)) OF SupportedBandEUTRA
  prsPowerDiffCellPairList    SEQUENCE (SIZE (1..maxNum)) OF PRSPowerDiffCellPair
  OPTIONAL
}
maxBands INTEGER::= 64
maxNum INTEGER::= x
SupportedBandEUTRA::= SEQUENCE {
  bandEUTRA                   INTEGER (1..64)
}
PRSPowerDiffCellPair::= SEQUENCE {
  earfcn                ARFCN-ValueEUTRA    OPTIONAL,
  physCellIdHigher      INTEGER (0..503),
  cellGlobalIdHigher    ECGI                              OPTIONAL,  -- Need ON
  physCellIdLower       INTEGER (0..503),
  cellGlobalIdLower     ECGI                              OPTIONAL,  -- Need ON
  powerDifference       INTERGER (1..y),                  OPTIONAL,
}
-- ASN1STOP
``` prsPowerDiffCellPairList (PRS power difference cell pair list) is only a naming manner, which represents a meaning indicating a list of a cell pair whose PRS received power difference reported by the terminal to the network side does not exceed the difference threshold. A value of the length maxNum=x of this list may be determined according to a terminal capability and a network requirement.

PRSPowerDiffCellPair (PRS power difference cell pair) is only a naming manner, which represents a meaning indicating a cell pair whose PRS received power difference reported by the terminal to the network side does not exceed the difference threshold. An inner composition of its IE includes that: physCellIdHigher is only a naming manner, which represents a meaning indicating a PCI of a cell whose PRS power is larger. cellGlobalIdHigher is only a naming manner, which represents a meaning indicating a CGI of the cell whose PRS power is larger. physCellIdLower is only a naming manner, which represents a meaning indicating a PCI of a cell whose PRS power is smaller. cellGlobalId-Lower is only a naming manner, which represents a meaning indicating a CGI of the cell whose PRS power is smaller. powerDifference is only a naming manner, which represents a meaning indicating a PRS power difference that is received by the terminal and is between two cells involved in this IE: PRSPowerDiffCellPair. y is only a naming manner, which represents a meaning indicating a reporting range of a power difference.

earfcn is only a naming manner, which represents a meaning indicating an E-UTRAN Absolute Radio Frequency Channel Number (absolute radio frequency channel number); and this IE may not be sent in a common-frequency network, but for a CA or multi-frequency point system, this IE that indicates the number of a frequency point or the number of a carrier whose received power or SNR difference between two common-frequency cells does not exceed the difference threshold is sent.

Herein, it should be noted that, if the network side delivers a CRS power difference threshold, this reported powerDifference is a CRS received power (RSRP) difference. If the network delivers a mapping factor between a PRS power difference and a CRS power difference, and a PRS power difference threshold, powerDifference may be a CRS received power (RSRP) difference, and may also be a PRS received power difference (one of which is determined according to the stipulation of a protocol).

When a cell pair whose receiving end PRS power or PRS SNR does not exceed the difference threshold is reported, its LPP signaling form may be reported one pair by one pair as described in the foregoing; or a certain cell may be taken as an investigated cell, and a cell, a difference between which and this investigated cell does not exceed a threshold, is reported. Then its LPP signaling example may be as follows.

When the terminal performs reporting, an investigated cell is taken, then the investigated cell is compared with other neighboring cells, and a cell, a difference between which and the investigated cell does not exceed the difference threshold, is reported as a list, where all cells in this list are cells, a receiving end power or SNR difference between which and the current investigated cell does not exceed the threshold. The signaling is exemplified as follows:

```
-- ASN1START
OTDOA-ProvideCapabilities::= SEQUENCE {
  otdoa-Mode  BIT STRING {  ue-assisted (0) } (SIZE (1..8)),
  ...,
  supportedBandListEUTRA      SEQUENCE (SIZE (1..maxBands)) OF SupportedBandEUTRA
  pRSPowerDiffCellList        SEQUENCE (SIZE (1..x)) OF PRSPowerDiffCell
  OPTIONAL
}
maxBands INTEGER::= 64
SupportedBandEUTRA::= SEQUENCE {
  bandEUTRA                   INTEGER (1..64)
}
PRSPowerDiffCell::= SEQUENCE {
  earfcn                ARFCN-ValueEUTRA       OPTIONAL,
  physCellIdRef         INTEGER (0..503),
  cellGlobalIdRef       ECGI                              OPTIONAL,  -- Need ON
```

```
passedThresCellList    SEQUENCE (SIZE (1..y)) OF PassedThresCell
}
PassedThresCell::= SEQUENCE {
  physCellId           INTEGER (0..503),
  cellGlobalId         ECGI                        OPTIONAL,  -- Need ON
  powerDifference      INTERGER (1..z),            OPTIONAL,
}
-- ASN1STOP
``` prsPowerDiffCellList (PRS power difference cell list) is only a naming manner, which represents a meaning indicating a list of a cell whose PRS received power difference reported by the terminal to the network side does not exceed the threshold. The length x of this list represents the number of investigated cells.

PRSPowerDiffCell (PRS power difference cell) is only a naming manner, which represents a meaning indicating information of a cell whose PRS received power difference reported by the terminal to the network side does not exceed the threshold. An inner composition of its IE includes that: physCellIdRef is only a naming manner, which represents a meaning indicating a PCI of an investigated cell. cellGlobalIdRef is only a naming manner, which represents a meaning indicating a CGI of the investigated cell. passedThresCellList is only a naming manner, which represents a meaning indicating a list of a cell that does not exceed the difference threshold by being compared with this investigated cell. y is only a naming manner, which represents a meaning indicating the number of cells (the length of a cell list) that do not exceed the difference threshold by being compared with the investigated cell. PassedThresCell is only a naming manner, which represents a meaning indicating information of a cell that does not exceed the difference threshold by being compared with the investigated cell. physCellId is only a naming manner, which represents a meaning indicating a PCI of a cell, namely, a PCI of a cell that does not exceed the difference threshold by being compared with the investigated cell in this signaling. Similarly, cellGlobalId is only a naming manner, which represents a meaning indicating a CGI of a cell, namely, a CGI of a cell that does not exceed the difference threshold by being compared with the investigated cell in this signaling. powerDifference is only a naming manner, which represents a meaning indicating a power difference between a cell that does not exceed the difference threshold by being compared with the investigated cell and the investigated cell, and this value may be positive or negative, and the value ranges from 1 to z. z is only a naming manner, which represents a meaning indicating a reporting range of a power difference, which is an index value, ranges from 1 to z (all of which are greater than zero), and is mapped to a true value that is positive or negative.

earfcn is only a naming manner, which represents a meaning indicating an E-UTRAN Absolute Radio Frequency Channel Number (absolute radio frequency channel number); and this IE may not be sent in a common-frequency network, but for a CA or multi-frequency point system, this IE that indicates the number of a frequency point or the number of a carrier whose received power or SNR difference between two common-frequency cells does not exceed the difference threshold is sent.

If an SNR difference is investigated, it may also be written as:

```
-- ASN1START
OTDOA-ProvideCapabilities::= SEQUENCE {
  otdoa-Mode  BIT STRING {  ue-assisted (0) } (SIZE (1..8)),
  ...,
  supportedBandListEUTRA      SEQUENCE (SIZE (1..maxBands)) OF SupportedBandEUTRA
  prsSNRDiffCellPairList      SEQUENCE (SIZE (1..maxNum)) OF PRSSNRDiffCellPair
  OPTIONAL
}
maxBands INTEGER::= 64
maxNum INTEGER::= x
SupportedBandEUTRA::= SEQUENCE {
  bandEUTRA                   INTEGER (1..64)
}
PRSSNRDiffCellPair::= SEQUENCE {
  earfcn                      ARFCN-ValueEUTRA           OPTIONAL,
  physCellIdHigher            INTEGER (0..503),
  cellGlobalIdHigher          ECGI                                OPTIONAL  -- Need ON
  physCellIdLower             INTEGER (0..503),
  cellGlobalIdLower           ECGI                                OPTIONAL, -- Need ON
  snrDifference               INTERGER (1..y),           OPTIONAL,
}
-- ASN1STOP
``` prsSNRDiffCellPairList (PRS SNR difference cell pair list) is only a naming manner, which represents a meaning indicating a list of a cell pair whose receiving end PRS SNR difference reported by the terminal to the network side does not exceed the difference threshold.

PRSSNRDiffCellPair (PRS SNR difference cell pair) is only a naming manner, which represents a meaning indicating a cell pair whose receiving end PRS SNR value reported by the terminal to the network side does not exceed the difference threshold. An inner composition of its IE includes that: physCellIdHigher is only a naming manner, which represents a meaning indicating a PCI of a cell whose receiving end PRS SNR is larger. cellGlobalIdHigher is only a naming manner, which represents a meaning indicating a CGI of the cell whose receiving end PRS SNR is larger. physCellIdLower is only a naming manner, which represents a meaning indicating a PCI of a cell whose receiving end PRS SNR is smaller. cellGlobalIdLower is only a naming manner, which represents a meaning indicating a CGI of the cell whose receiving end PRS SNR is smaller. snrDifference is only a naming manner, which represents a meaning indicating a receiving end PRS SNR difference between two cells involved in this IE: PRSSNRDiffCellPair. y is only a naming manner, which represents a meaning indicating a reporting range of an SNR difference.

Herein, it should be noted that, if the network side delivers a CRS SNR difference threshold, this reported snrDifference is a CRS receiving end SNR difference. If the network delivers a mapping factor between a PRS SNR difference and a CRS SNR difference, and a PRS SNR difference threshold, snrDifference may be a CRS receiving end SNR difference, and may also be a PRS receiving end SNR difference (one of which is determined according to the stipulation of a protocol).

Likewise, when a cell pair whose receiving end PRS power or PRS SNR does not exceed the difference threshold is reported, its LPP signaling form may be reported one pair by one pair as described in the foregoing; or a cell may be taken as an investigated cell, and a cell, a difference between which and this investigated cell does not exceed a threshold, is reported. Then its LPP signaling example may be as follows.

When the terminal performs reporting, an investigated cell is taken, then the investigated cell is compared with other neighboring cells, and a cell, a difference between which and the investigated cell does not exceed the difference threshold, is reported as a list, where all cells in this list are cells, a receiving end power or SNR difference between which and the current investigated cell does not exceed the threshold. The signaling is exemplified as follows:

information of a cell whose receiving end PRS SNR difference reported by the terminal to the network side does not exceed the threshold. An inner composition of its IE includes that: physCellIdRef is only a naming manner, which represents a meaning indicating a PCI of an investigated cell. cellGlobalIdRef is only a naming manner, which represents a meaning indicating a CGI of the investigated cell. passedThresCellList is only a naming manner, which represents a meaning indicating a list of a cell that does not exceed the difference threshold by being compared with this investigated cell. y is only a naming manner, which represents a meaning indicating the number of cells (the length of a cell list) that do not exceed the difference threshold by being compared with the investigated cell. PassedThresCell is only a naming manner, which represents a meaning indicating information of a cell that does not exceed the difference threshold by being compared with the investigated cell. physCellId is only a naming manner, which represents a meaning indicating a PCI of a cell, namely, a PCI of a cell that does not exceed the difference threshold by being compared with the investigated cell in this signaling. Similarly, cellGlobalId is only a naming manner, which represents a meaning indicating a CGI of a cell, namely, a CGI of a cell that does not exceed the difference threshold by being compared with the investigated cell in this signaling. sNRDifference is only a naming manner, which represents a meaning indicating a receiving end SNR difference between a cell that does not exceed the difference threshold by being compared with the investigated cell and the investigated cell, and this value may be positive or negative, and the value ranges from 1 to z. z is only a naming manner, which represents a meaning indicating a reporting range of an SNR difference, which is an index value, ranges from 1 to z (all of which are greater than zero), and is mapped to a true value that is positive or negative.

(2) The terminal may send the cell subset information when requesting assistance information

```
-- ASN1START
OTDOA-ProvideCapabilities::= SEQUENCE {
  otdoa-Mode  BIT STRING {  ue-assisted (0)  } (SIZE (1..8)),
  ...,
  supportedBandListEUTRA         SEQUENCE (SIZE (1..maxBands)) OF SupportedBandEUTRA
  pRSSNRDiffCellList          SEQUENCE (SIZE (1..x)) OF PRSSNRDiffCell
  OPTIONAL
}
maxBands INTEGER::= 64
SupportedBandEUTRA::= SEQUENCE {
  bandEUTRA                          INTEGER (1..64)
}
PRSSNRDiffCell::= SEQUENCE {
  earfcn                  ARFCN-ValueEUTRA            OPTIONAL,
  physCellIdRef             INTEGER (0..503),
  cellGlobalIdRef           ECGI                              OPTIONAL,  -- Need ON
  passedThresCellList SEQUENCE (SIZE (1..y)) OF PassedThresCell
}
PassedThresCell::= SEQUENCE {
  physCellId                INTEGER (0..503),
  cellGlobalId              ECGI                              OPTIONAL,  -- Need ON
  sNRDifference             INTERGER (1..z),   OPTIONAL,
}
-- ASN1STOP
``` pRSSNRDiffCellList (PRS SNR difference cell list) is only a naming manner, which represents a meaning indicating a list of a cell whose PRS received SNR difference reported by the terminal to the network side does not exceed the threshold. The length x of this list represents the number of investigated cells.

PRSSNRDiffCell (PRS SNR difference cell) is only a naming manner, which represents a meaning indicating An LPP information element OTDOA-RequestAssistanceData (OTDOA-RequestAssistanceData) is an information element that is sent by the terminal to the positioning server to request assistance data (reference is made to 3GPP TS36.355), and the italic part is a part which the embodiment of the present invention adds. If a received power difference is investigated, an example is made as follows:

```
-- ASN1START
OTDOA-RequestAssistanceData::= SEQUENCE {
 physCellId   INTEGER (0..503),
 prsSNRDiffCellPairList      SEQUENCE (SIZE (1..maxNum)) OF PRSSNRDiffCellPair
 ...
}
maxNum INTEGER::= x
PRSPowerDiffCellPair::= SEQUENCE {
 earfcn              ARFCN-ValueEUTRA   OPTIONAL,
 physCellIdHigher             INTEGER (0..503),
 cellGlobalIdHigher            ECGI                   OPTIONAL,  -- Need ON
 physCellIdLower      INTEGER (0..503),
 cellGlobalIdLower             ECGI                   OPTIONAL,  -- Need ON
 powerDifference      INTERGER (1..y),          OPTIONAL,
}
-- ASN1STOP
```

For a meaning of each parameter, reference is made to the description in (1) of the signaling form 4, which is no longer described herein.

When a cell pair whose receiving end PRS power or PRS SNR does not exceed the difference threshold is reported, its LPP signaling form may be reported one pair by one pair as described in the foregoing; or a cell may be taken as an investigated cell, and a cell, a difference between which and this investigated cell does not exceed a threshold, is reported. Then its LPP signaling example may be as follows.

When the terminal performs reporting, an investigated cell is taken, then the investigated cell is compared with other neighboring cells, and a cell, a difference between which and the investigated cell does not exceed the difference threshold, is reported as a list, where all cells in this list are cells, a receiving end power or SNR difference between which and the current investigated cell does not exceed the threshold. The signaling is exemplified as follows:

```
-- ASN1START
OTDOA-RequestAssistanceData::= SEQUENCE {
 physCellId   INTEGER (0..503),
 pRSPowerDiffCellList       SEQUENCE (SIZE (1..x)) OF PRSPowerDiffCell
 ...
}
PRSPowerDiffCell::= SEQUENCE {
 earfcn              ARFCN-ValueEUTRA        OPTIONAL,
 physCellIdRef             INTEGER (0..503),
 cellGlobalIdRef            ECGI                   OPTIONAL,  -- Need ON
 passedThresCellList SEQUENCE (SIZE (1..y)) OF PassedThresCell
}
PassedThresCell::= SEQUENCE {
 physCellId             INTEGER (0..503),
 cellGlobalId             ECGI                   OPTIONAL,  -- Need ON
 powerDifference         INTERGER (1..z),          OPTIONAL,
}
-- ASN1STOP
```

For a meaning of each parameter, reference is made to the description in the part corresponding to (1) of the signaling form 4, which is no longer described herein.

If an SNR difference is investigated, it may also be written as:

```
-- ASN1START
OTDOA-RequestAssistanceData::= SEQUENCE {
 physCellId   INTEGER (0..503),
 prsSNRDiffCellPairList   SEQUENCE (SIZE (1..maxNum)) OF PRSSNRDiffCellPair
 ...
}
maxNum INTEGER::= x
PRSSNRDiffCellPair::= SEQUENCE {
 earfcn              ARFCN-ValueEUTRA   OPTIONAL,
 physCellIdHigher             INTEGER (0..503),
 cellGlobalIdHigher            ECGI                   OPTIONAL,  -- Need ON
 physCellIdLower      INTEGER (0..503),
 cellGlobalIdLower             ECGI                   OPTIONAL,  -- Need ON
 snrDifference      INTERGER (1..y),          OPTIONAL,
}
-- ASN1STOP
```

For a meaning of each parameter, reference is made to the description in (1) of the signaling form 4, which is no longer described herein.

Likewise, when a cell pair whose receiving end PRS power or PRS SNR does not exceed the difference threshold is reported, its LPP signaling form may be reported one pair by one pair as described in the foregoing; or a cell may be taken as an investigated cell, and a cell, a difference between which and this investigated cell does not exceed the threshold, is reported. Then its LPP signaling example may be as follows.

When the terminal performs reporting, an investigated cell is taken, then the investigated cell is compared with other neighboring cells, and a cell, a difference between which and the investigated cell does not exceed the difference threshold, is reported as a list, where all cells in this list are cells, a receiving end power or SNR difference between which and the current investigated cell does not exceed the threshold. The signaling is exemplified as follows:

```
-- ASN1START
OTDOA-RequestAssistanceData::= SEQUENCE {
  physCellId    INTEGER (0..503),
  pRSSNRDiffCellList SEQUENCE (SIZE (1..x)) OF PRSSNRDiffCell
  ...
}
PRSSNRDiffCell::= SEQUENCE {
  earfcn             ARFCN-ValueEUTRA   OPTIONAL,
  physCellIdRef      INTEGER (0..503),
  cellGlobalIdRef    ECGI       OPTIONAL,    -- Need ON
  passedThresCellList SEQUENCE (SIZE (1..y)) OF PassedThresCell
}
PassedThresCell::= SEQUENCE {
```

-continued

```
  physCellId      INTEGER (0..503),
  cellGlobalId    ECGI           OPTIONAL,      -- Need ON
  sNRDifference   INTERGER (1..z), OPTIONAL,
}
-- ASN1START
```

For a meaning of each parameter, reference is made to the description in the part corresponding to (1) of the signaling form 4, which is no longer described herein.

404: The positioning server interacts with a corresponding base station through LPPa signaling according to the cell subset information reported by the terminal, and sends power allocation information to the base station. The power allocation information is used to instruct the base station to adjust PRS transmit power so as to reduce a PRS received power or SNR difference of two cells in a cell pair. Specific implementation manners of the power allocation information may include a plurality of types, which are not limited in the embodiment of the present invention.

As shown in FIG. 4, step 404 may be executed according to one of two manners (step 404*a* or step 404*b*).

In step 404*a*, the positioning server carries the power allocation information in a message for requesting the base station to report a PRS configuration. An OTDOA information request (OTDOA INFORMATION REQUEST) message is signaling stipulated in TS36.455, and is used for a message for the positioning server to request the base station to report the PRS configuration. In the embodiment of the present invention, the power allocation information is added in the message, and an example is made as follows, where the italic part is a part which the embodiment of the present invention adds:

```
-- ***************************************************
--
-- OTDOA INFORMATION REQUEST
--
-- ***************************************************
  OTDOAInformationRequest::= SEQUENCE {
    protocolIEs          ProtocolIE-Container    {{OTDOAInformationRequest-IEs}},
    ...
  }
  OTDOAInformationRequest-IEs LPPA-PROTOCOL-IES::= {
    { ID id-OTDOA-Information-Type-Group    CRITICALITY reject TYPE
  OTDOA-Information-Type              PRESENCE mandatory},
    { ID id-PRS-Power-Allocation-Configuration CRITICALITY reject TYPE
  PRS-Power-Allocation-Configuration
          PRESENCE OPTIONAL},
    ...
  }
  OTDOA-Information-Type::= SEQUENCE (SIZE(1..maxnoOTDOAtypes)) OF ProtocolIE-Single-Container
{ { OTDOA-Information-TypeIEs} }
    OTDOA-Information-TypeIEs      LPPA-PROTOCOL-IES::= {
    { ID id-OTDOA-Information-Type-Item CRITICALITY reject TYPE OTDOA-Information-Type-Item
    PRESENCE mandatory },
    ...
  }
    OTDOA-Information-Type-Item::= SEQUENCE {
      oTDOA-Information-Type-Item OTDOA-Information-Item,
      iE-Extensions              ProtocolExtensionContainer { {
  OTDOA-Information-Type-ItemExtIEs} } OPTIONAL,
    ...
  }
    OTDOA-Information-Type-ItemExtIEs LPPA-PROTOCOL-EXTENSION::= {
    ...
  }
```

PRS-Power-Allocation-Configuration (PRS power allocation configuration) is only a naming manner of the power allocation information, which represents a meaning indicating PRS power allocation information sent by the positioning server to the base station, whose content form is not limited, and whose main purpose is to be used to instruct the base station to adjust PRS transmit power, so as to reduce a PRS received power or SNR difference between two cells in a cell pair and ensure as far as possible that a PRS received power or SNR difference received by a terminal side from the two cells is within a corresponding threshold requirement. PRS-Power-Allocation-Configuration is an option, and if the positioning server does not send PRS-Power-Allocation-Configuration to the base station, the base station may execute PRS power allocation according to its original power allocation manner.

Alternatively, step 404b may also be used to send the power allocation information to the base station. Step 404b includes a newly added dedicated message 404b-1 of the positioning server and the base station and an existing OTDOA information request (OTDOA INFORMATION REQUEST) message 404b-2.

A signaling form in step 404b-1 is not limited, and the signaling is sent by the positioning server to the base station, to notify the base station of PRS power control information. The signaling is exemplified as follows:

```
-- ****************************************************************
--
-- PRS POWER ALLOCATION CONFIGURATION
--
-- ****************************************************************
   PRSPowerAllocationConfiguration::= SEQUENCE {
      protocolIEs         ProtocolIE-Container
{{PRSPowerAllocationConfiguration-IEs}},
      ...
   }
   PRSPowerAllocationConfiguration-IEs LPPA-PROTOCOL-IES::= {
   { ID id-PRS-Power-Allocation-Configuration CRITICALITY reject TYPE
PRS-Power-Allocation-Configuration
         PRESENCE OPTIONAL},
      ...
   }
```

PRSPowerAllocationConfiguration (PRS power allocation configuration) is only a naming manner of the power allocation information, which represents a meaning indicating PRS power allocation information sent by the positioning server to the base station, whose content form is not limited, and whose main purpose is to be used to instruct the base station to adjust PRS transmit power, so as to reduce a PRS received power or SNR difference between two cells in a cell pair and ensure as far as possible that a PRS received power or SNR difference received by a terminal side from the two cells is within a corresponding threshold requirement.

In step 404b-2, the existing OTDOA information request message is adopted and is not changed. If a manner of 404b is adopted, step 404b-1 may be performed before step 404b-2, and the positioning server requires, through step 404b-1, some base stations to adjust PRS transmit power; and then the positioning server requests, through step 404b-2, the base stations to report their own final PRS configuration information.

405: The base station feeds back its own final PRS configuration to the positioning server. In step 405, an existing OTDOA information response (OTDOAInformationResponse) message may be used, which is no longer described herein.

406: The positioning server sends the PRS configuration information to the terminal through assistance data.

407: The terminal performs PRS detection according to the PRS configuration information in the assistance data, and estimates an RSTD.

408: The terminal reports the RSTD to the positioning server.

409: The positioning server calculates a geographic location of the terminal according to the RSTD reported by the terminal.

In the foregoing step 406 to step 409, a corresponding processing process in the prior art may be used, which is no longer described herein.

In the embodiment of the present invention, a difference threshold of a reference signal measured value is set, thereby avoiding that a measured value difference of PRSs is excessively large, and reducing interference between the PRSs.

Figure 5:
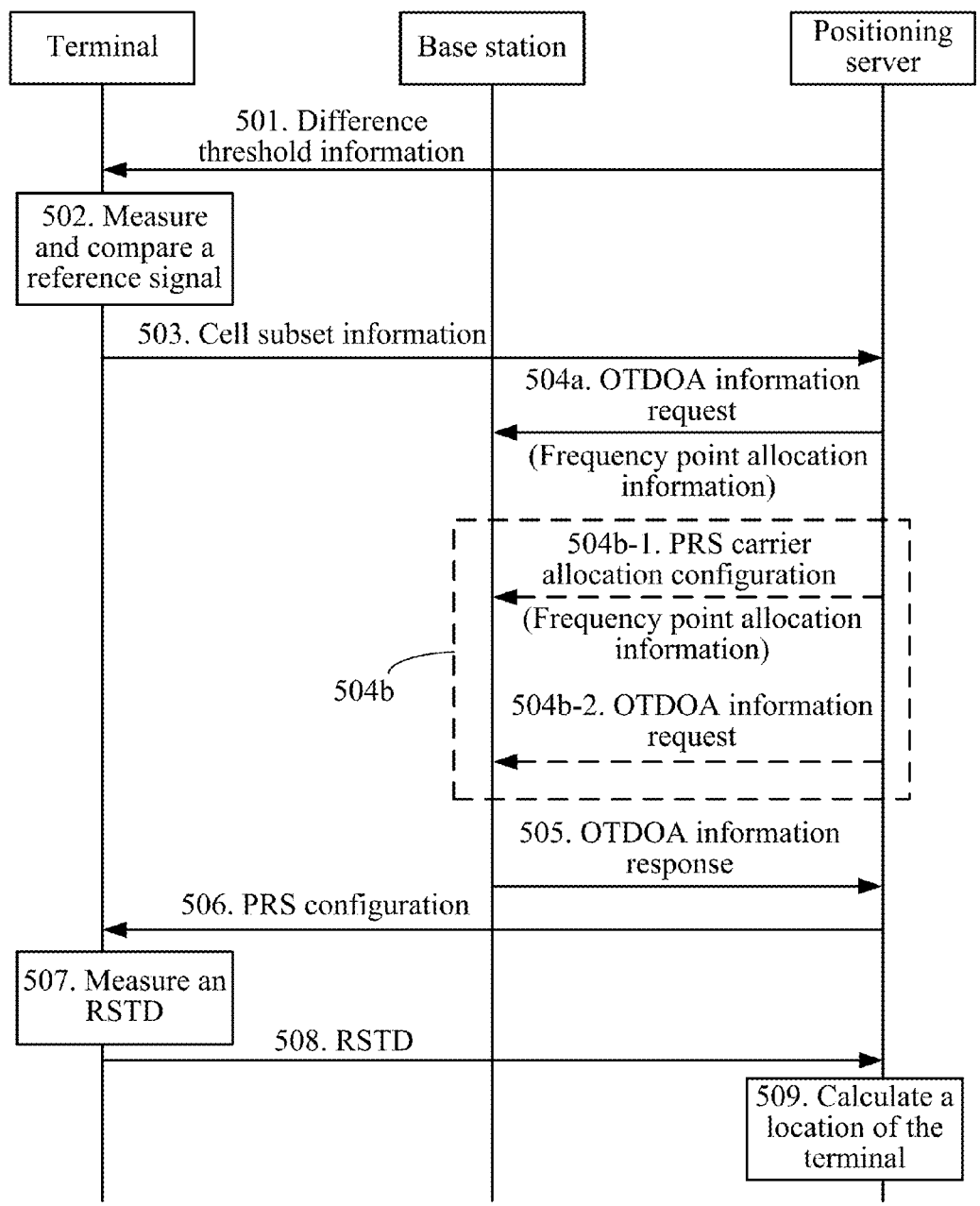
FIG. 5 is a schematic flow chart of a positioning process according to another embodiment of the present invention.

FIG. 5 is a schematic flow chart of a positioning process according to another embodiment of the present invention. The embodiment shown in FIG. 5 is applied to a CA scenario, where a reference signal measured value difference is reduced by configuring a PRS transmit frequency point. In the CA scenario, for different cells, each cell has a plurality of available frequency points (carriers), and a terminal also supports reception of a plurality of frequency points (carriers).

501: A positioning server sends allowable difference threshold information to a terminal. Step 501 may be the same as step 401 in FIG. 4, which is no longer described herein.

502: The terminal measures a reference signal, compares RSRP or a CRS SNR of a neighboring cell with that of a current cell, where the RSRP or the CRS SNR is obtained through measurement; and compares an obtained difference with a difference threshold notified by a network side. Step 502 may be the same as step 402 in FIG. 4, which is no longer described herein.

503: The terminal reports cell subset information to the positioning server, where the cell subset information indicates a cell pair whose reference signal measured value exceeds the difference threshold, or the cell subset information is used to indicate a cell pair whose reference signal measured value does not exceed the difference threshold, so as to help the positioning server remove, through screening, a cell whose PRS receiving end power difference or SNR difference is relatively large. Step 503 may be the same as step 403 in FIG. 4, which is no longer described herein.

504: The positioning server interacts with a corresponding base station through LPPa signaling according to the cell subset information reported by the terminal, and sends frequency point allocation information to the base station. The frequency point allocation information is used to instruct the base station to adjust a PRS transmit frequency point so as to reduce a PRS received power or SNR difference of two cells in a cell pair. Specific implementation manners of the frequency point allocation information may include a plurality of types, which are not limited in the embodiment of the present invention.

As shown in FIG. 5, step 504 may be executed according to one of two manners (step 504*a* or step 504*b*).

In step 504*a*, the positioning server carries the frequency point allocation information in a message for requesting the base station to report a PRS configuration. An OTDOA information request message is signaling stipulated in TS36.455, and is used for a message for the positioning server to request the base station to report the PRS configuration. In the embodiment of the present invention, the frequency point allocation information is added in the message, and an example is made as follows, where the italic part is a part which the embodiment of the present invention adds:

```
-- ***************************************************
--
-- OTDOA INFORMATION REQUEST
--
-- ***************************************************
  OTDOAInformationRequest::= SEQUENCE {
    protocolIEs                    ProtocolIE-Container   {{OTDOAInformationRequest-IEs}},
    ...
  }
  OTDOAInformationRequest-IEs LPPA-PROTOCOL-IES::= {
    { ID id-OTDOA-Information-Type-Group   CRITICALITY reject TYPE
  OTDOA-Information-Type              PRESENCE mandatory},
    { ID id-PRS-Carrier-Allocation-Configuration   CRITICALITY reject TYPE
  PRS-Carrier-Allocation-Configuration
        PRESENCE OPTIONAL},
    ...
  }
  OTDOA-Information-Type::= SEQUENCE (SIZE(1..maxnoOTDOAtypes)) OF ProtocolIE-Single-Container
{ { OTDOA-Information-TypeIEs} }
    OTDOA-Information-TypeIEs       LPPA-PROTOCOL-IES::= {
    { ID id-OTDOA-Information-Type-Item CRITICALITY reject TYPE OTDOA-Information-Type-Item
      PRESENCE mandatory },
    ...
  }
  OTDOA-Information-Type-Item::= SEQUENCE {
    oTDOA-Information-Type-Item OTDOA-Information-Item,
    iE-Extensions                  ProtocolExtensionContainer { {
  OTDOA-Information-Type-ItemExtIEs} } OPTIONAL,
    ...
  }
  OTDOA-Information-Type-ItemExtIEs LPPA-PROTOCOL-EXTENSION::= {
    ...
  }
```

PRS-Carrier-Allocation-Configuration (PRS carrier allocation configuration) is only a naming manner of the frequency point allocation information, which represents a meaning indicating PRS carrier allocation information sent by the positioning server to the base station, whose content form is not limited, and whose main purpose is to be used to instruct the base station to adjust a PRS transmit frequency point (carrier), so as to reduce a PRS received power or SNR difference between two cells in a cell pair and avoid generation of interference between PRSs of the two cells as far as possible. PRS-Carrier-Allocation-Configuration is an option, and if the positioning server does not send PRS-Carrier-Allocation-Configuration to the base station, the base station may execute PRS sending according to its original carrier allocation manner.

Alternatively, step 504*b* may also be used to send the frequency point allocation information to the base station. Step 504*b* includes a newly added dedicated message 504*b*-1 of the positioning server and the base station and an existing OTDOA information request message 504*b*-2.

A signaling form in step 504*b*-1 is not limited, and the signaling is sent by the positioning server to the base station, to notify the base station of PRS frequency band (carrier) information. The signaling is exemplified as follows:

```
--  ********************************************************
--
-- PRS CARRIER ALLOCATION CONFIGURATION
--
--  ********************************************************
    PRSCarrierAllocationConfiguration::= SEQUENCE {
        protocolIEs          ProtocolIE-Container
{{PRSCarrierAllocationConfiguration-IEs}},
        ...
    }
    PRSCarrierAllocationConfiguration-IEs LPPA-PROTOCOL-IES::= {
        { ID id-PRS-Carrier-Allocation-Configuration   CRITICALITY reject TYPE
PRS-Carrier-Allocation-Configuration
            PRESENCE OPTIONAL},
        ...
    }
```

PRSCarrierAllocationConfiguration (PRS carrier allocation configuration) is only a naming manner of the frequency point allocation information, which represents a meaning indicating PRS frequency point (carrier) allocation information sent by the positioning server to the base station, whose content form is not limited, and whose main purpose is to be used to instruct the base station to adjust a PRS transmit frequency point (carrier), so as to reduce a PRS received power or SNR difference between two cells in a cell pair and avoid generation of interference between PRSs of the two cells as far as possible.

In step 504b-2, the existing OTDOA information request message is adopted and is not changed. If a manner of 504b is adopted, step 504b-1 may be performed before step 504b-2, and the positioning server requires, through step 504b-1, some base stations to adjust a PRS transmit frequency point; and then the positioning server requests, through step 504b-2, the base stations to report their own final PRS configuration information.

505: The base station feeds back its own final PRS configuration to the positioning server. In step 505, an existing OTDOA information response (OTDOAInformationResponse) message may be used, which is no longer described herein.

506: The positioning server sends the PRS configuration information to the terminal through assistance data.

507: The terminal performs PRS detection according to the PRS configuration information in the assistance data, and estimates an RSTD.

508: The terminal reports the RSTD to the positioning server.

509: The positioning server calculates a geographic location of the terminal according to the RSTD reported by the terminal.

In the foregoing step 506 to step 509, a corresponding processing process in the prior art may be used, which is no longer described herein.

In the embodiment of the present invention, a difference threshold of a reference signal measured value is set, thereby avoiding that a measured value difference of PRSs is excessively large, and reducing interference between the PRSs.

Figure 6:
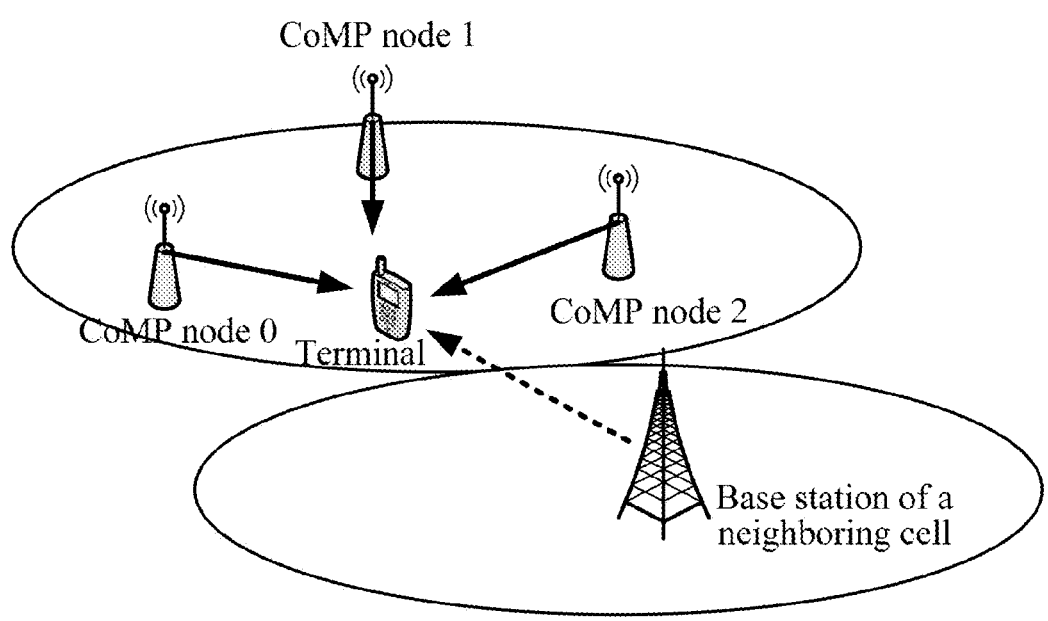
FIG. 6 is a schematic diagram of an example of a CoMP scenario.

FIG. 6 is a schematic diagram of an example of a CoMP scenario. CoMP nodes (coordinated nodes) in FIG. 6 belong to the same cell ID, and therefore, their PRS patterns are the same (which are obtained according to the same cell ID). In an existing solution, a path of a strongest one of three CoMP nodes is generally selected to perform PRS transmission. For example, if the quality of a signal arriving at a terminal from a CoMP node 0 is the best, the quality of the signal arriving at the terminal from a CoMP node 1 takes the second place, and the quality of the signal arriving at the terminal from a CoMP node 2 is the worst, the CoMP node 0 is selected to transmit a PRS for the terminal. However, if an optimal CoMP node is selected according to the existing solution, it may cause that a received power or SNR difference that is at a terminal side and is between a PRS sent by the optimal CoMP node and a PRS sent by a base station of a neighboring cell is excessively large, thereby causing interference with reception of the PRS of the neighboring cell. Therefore, in the embodiment of the present invention, when a CoMP node is selected to send a PRS, a PRS received power difference further needs to be considered, so as to select a most proper CoMP node. In the embodiment of the present invention, a rule for selecting a CoMP node is a CoMP node with the optimal PRS quality under the premise of satisfying a PRS power or SNR difference threshold.

Figure 7:
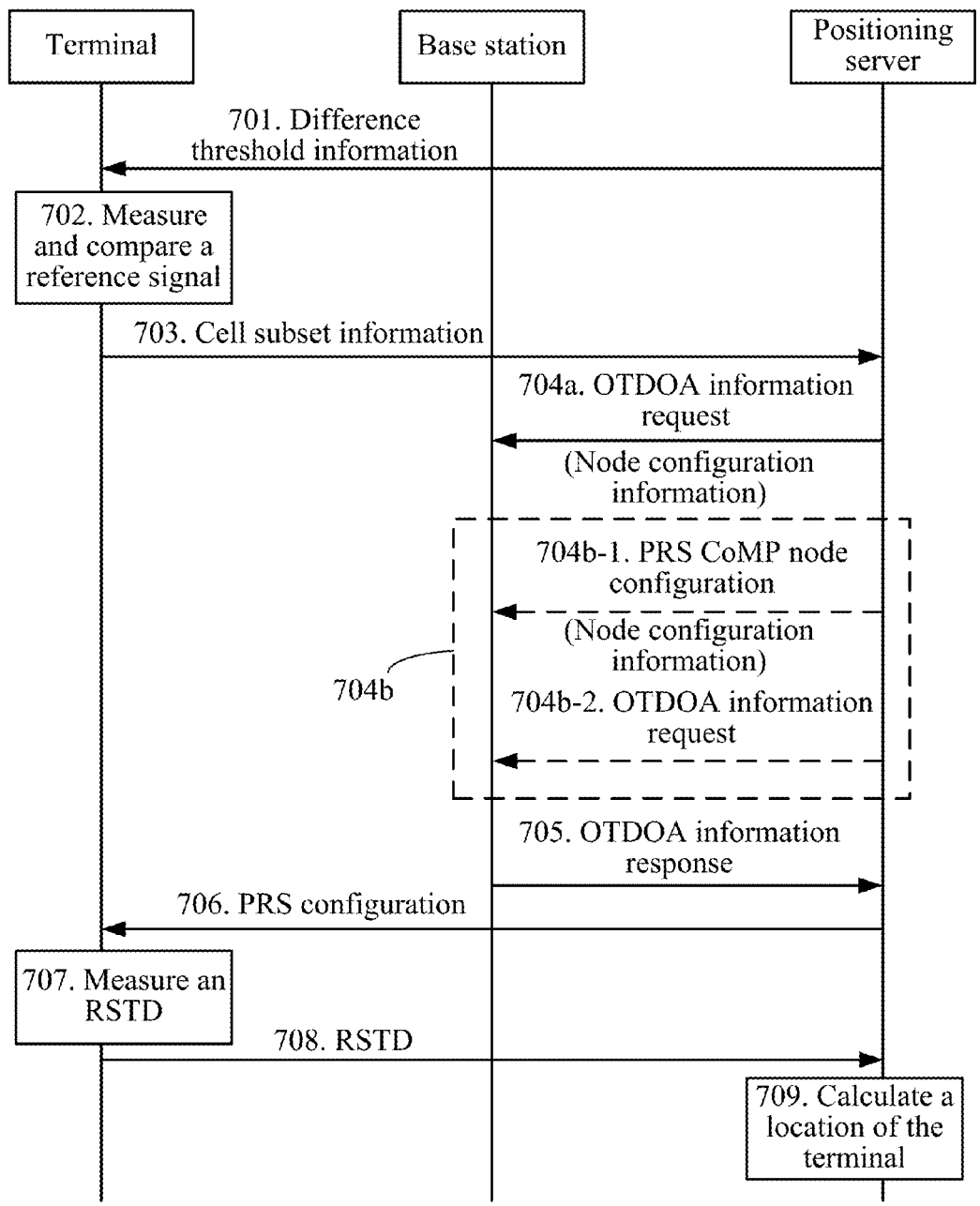
FIG. 7 is a schematic flow chart of a positioning process according to another embodiment of the present invention.

FIG. 7 is a schematic flow chart of a positioning process according to another embodiment of the present invention. The embodiment shown in FIG. 7 is applied to, for example, the CoMP scenario shown in FIG. 6, where a PRS is transmitted by selecting an optimal cell that satisfies a difference threshold of a reference signal measured value, so as to reduce a reference signal measured value difference.

701: A positioning server sends allowable difference threshold information to a terminal. Step 701 may be the same as step 401 in FIG. 4, which is no longer described herein.

702: The terminal measures a reference signal, compares RSRP or a CRS SNR of a neighboring cell with that of a current cell, where the RSRP or the CRS SNR is obtained through measurement; and compares an obtained difference with a difference threshold notified by a network side. Step 702 may be the same as step 402 in FIG. 4, which is no longer described herein.

703: The terminal reports cell subset information to the positioning server, where the cell subset information indicates a cell pair whose reference signal measured value exceeds the difference threshold, or the cell subset information is used to indicate a cell pair whose reference signal measured value does not exceed the difference threshold, so as to help the positioning server remove, through screening, a cell whose PRS receiving end power difference or SNR difference is relatively large. Step 703 may be the same as step 403 in FIG. 4, which is no longer described herein.

704: The positioning server interacts with a corresponding base station through LPPa signaling according to the cell subset information reported by the terminal, and sends node configuration information to the base station. The node configuration information is used to instruct the base station to select an optimal coordinated node that satisfies a PRS received power or SNR difference threshold, so as to transmit a PRS. Specific implementation manners of the node configuration information may include a plurality of types, which are not limited in the embodiment of the present invention.

As shown in FIG. 7, step 704 may be executed according to one of two manners (step 704a or step 704b).

In step 704a, the positioning server carries the node configuration information in a message for requesting the base station to report a PRS configuration. An OTDOA information request message is signaling stipulated in TS36.455, and is used for a message for the positioning server to request the base station to report the PRS configuration. In the embodiment of the present invention, the node configuration information is added in the message, and an example is made as follows, where the italic part is a part which the embodiment of the present invention adds:

content form is not limited, and whose main purpose is to be used to instruct the base station to select a proper CoMP node to transmit a PRS, so as to reduce a PRS received power or SNR difference between two cells in a cell pair and avoid generation of interference between PRSs of the two cells as far as possible. PRS-CoMP-Node-Configuration is an option, and if the positioning server does not send PRS-CoMP-Node-Configuration to the base station, the base station may execute PRS transmission according to its original CoMP node configuration manner.

Alternatively, step 704b may also be used to send the node configuration information to the base station. Step 704b includes a newly added dedicated message 704b-1 of the positioning server and the base station and an existing OTDOA information request message 704b-2.

```
-- **************************************************************
--
-- OTDOA INFORMATION REQUEST
--
-- **************************************************************
    OTDOAInformationRequest::= SEQUENCE {
        protocolIEs                 ProtocolIE-Container   {{OTDOAInformationRequest-IEs}},
        ...
    }
    OTDOAInformationRequest-IEs LPPA-PROTOCOL-IES::= {
        { ID id-OTDOA-Information-Type-Group     CRITICALITY reject TYPE
    OTDOA-Information-Type            PRESENCE mandatory},
        { ID id-PRS-CoMP-Node-Configuration CRITICALITY reject TYPE PRS-CoMP-Node-Configuration
            PRESENCE OPTIONAL},
        ...
    }
    OTDOA-Information-Type::= SEQUENCE (SIZE(1..maxnoOTDOAtypes)) OF ProtocolIE-Single-Container
{ { OTDOA-Information-TypeIEs} }
    OTDOA-Information-TypeIEs        LPPA-PROTOCOL-IES::= {
        { ID id-OTDOA-Information-Type-Item CRITICALITY reject TYPE OTDOA-Information-Type-Item
        PRESENCE mandatory },
        ...
    }
    OTDOA-Information-Type-Item::= SEQUENCE {
        oTDOA-Information-Type-Item OTDOA-Information-Item,
        iE-Extensions                ProtocolExtensionContainer { {
    OTDOA-Information-Type-ItemExtIEs} } OPTIONAL,
        ...
    }
    OTDOA-Information-Type-ItemExtIEs LPPA-PROTOCOL-EXTENSION::= {
        ...
    }
```

PRS-CoMP-Node-Configuration (PRS CoMP node configuration) is only a naming manner of the node configuration information, which represents a meaning indicating CoMP node (coordinated node) configuration information sent by the positioning server to the base station, whose A signaling form in step 704b-1 is not limited, and the signaling is sent by the positioning server to the base station, to notify the base station of CoMP node configuration information for transmitting a PRS. The signaling is exemplified as follows:

```
-- **************************************************************
--
-- PRS COMP NODE CONFIGURATION
--
-- **************************************************************
    PRSCoMPNodeConfiguration::= SEQUENCE {
        protocolIEs       ProtocolIE-Container       {{PRSCoMPNodeConfiguration-IEs}},
        ...
    }
    PRSCoMPNodeConfiguration-IEs LPPA-PROTOCOL-IES::= {
        { ID id-PRS-CoMP-Node-Configuration CRITICALITY reject TYPE PRS-CoMP-Node-Configuration
            PRESENCE OPTIONAL},
        ...
    }
```

PRSCoMPNodeConfiguration (PRS CoMP node configuration) is only a naming manner of the node configuration information, which represents a meaning indicating CoMP node (coordinated node) configuration information sent by the positioning server to the base station, whose content form is not limited, and whose main purpose is to be used to instruct the base station to select a proper CoMP node to transmit a PRS, so as to reduce a PRS received power or SNR difference between two cells in a cell pair and avoid generation of interference between PRSs of the two cells as far as possible.

In step 704b-2, the existing OTDOA information request message is adopted and is not changed. If a manner of 704b is adopted, step 704b-1 may be performed before step 704b-2, and the positioning server requires, through step 704b-1, some base stations to select an optimal CoMP node used to transmit a PRS; and then the positioning server requests, through step 704b-2, the base stations to report their own final PRS configuration information.

705: The base station feeds back its own final PRS configuration to the positioning server. In step 705, an existing OTDOA information response (OTDOAInformationResponse) message may be used, which is no longer described herein.

706: The positioning server sends the PRS configuration information to the terminal through assistance data.

707: The terminal performs PRS detection according to the PRS configuration information in the assistance data, and estimates an RSTD.

708: The terminal reports the RSTD to the positioning server.

709: The positioning server calculates a geographic location of the terminal according to the RSTD reported by the terminal.

In the foregoing step 706 to step 709, a corresponding processing process in the prior art may be used, which is no longer described herein.

In the embodiment of the present invention, a difference threshold of a reference signal measured value is set, thereby avoiding that a measured value difference of PRSs is excessively large, and reducing interference between the PRSs.

Figure 8:
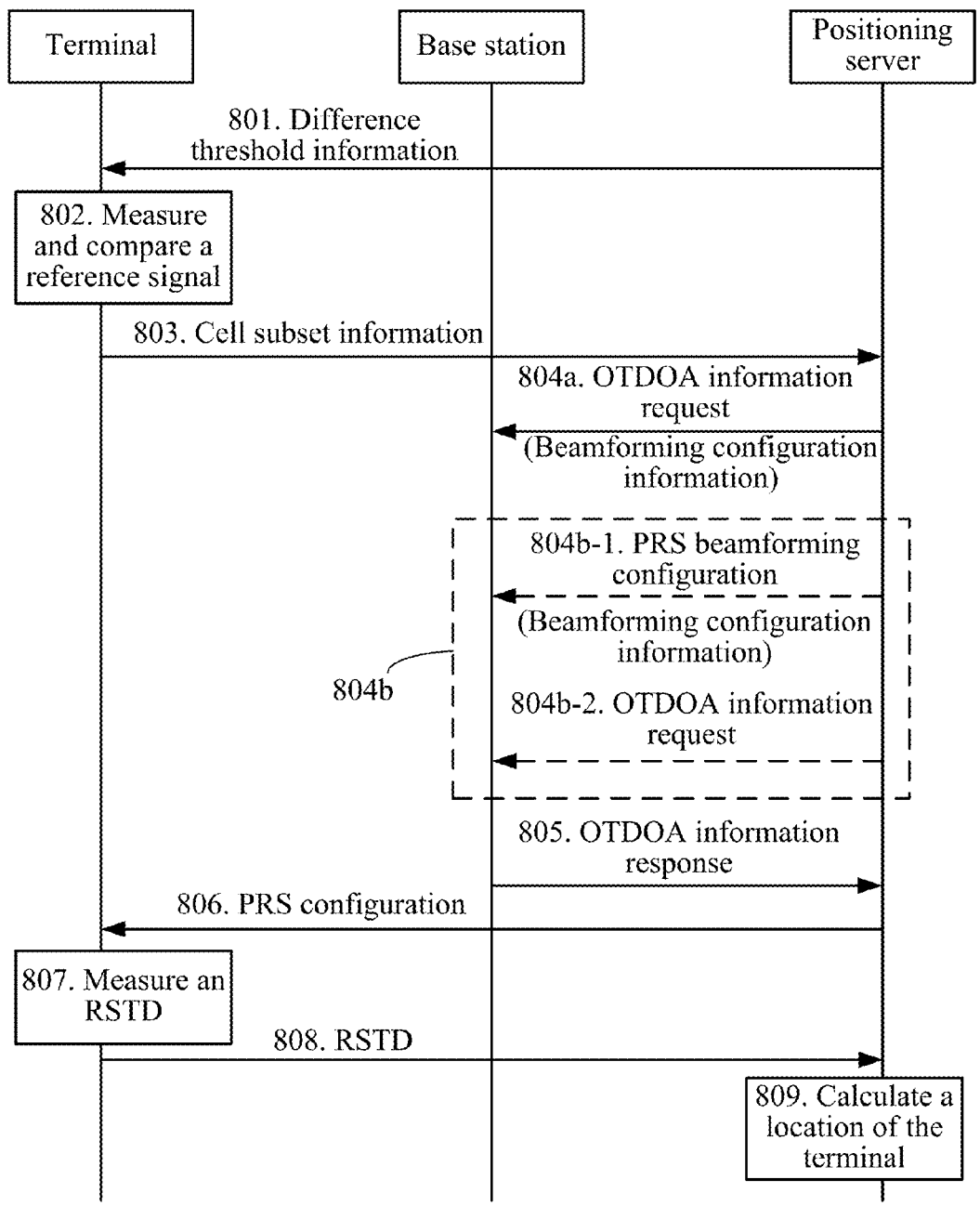
FIG. 8 is a schematic flow chart of a positioning process according to another embodiment of the present invention.

FIG. 8 is a schematic flow chart of a positioning process according to another embodiment of the present invention. In the embodiment shown in FIG. 8, a PRS received power or SNR difference threshold is satisfied by adjusting beamforming of a base station. PRS space separation may be performed through a beamforming antenna; and when a terminal reports PRS difference information, a network side may configure a major lobe direction for sending a PRS, and a PRS received power or SNR difference can be reduced as long as angle isolation is satisfied between major lobes of two cells, so as to avoid interference between PRSs as far as possible. A type of the beamforming antenna is not limited in the embodiment of the present invention, which may be a two-dimensional beamforming antenna, and may also be a three-dimensional space beamforming antenna.

801: A positioning server sends allowable difference threshold information to a terminal. Step 801 may be the same as step 401 in FIG. 4, which is no longer described herein.

802: The terminal measures a reference signal, compares RSRP or a CRS SNR of a neighboring cell with that of a current cell, where the RSRP or the CRS SNR is obtained through measurement; and compares an obtained difference with a difference threshold notified by a network side. Step 802 may be the same as step 402 in FIG. 4, which is no longer described herein.

803: The terminal reports cell subset information to the positioning server, where the cell subset information indicates a cell pair whose reference signal measured value exceeds the difference threshold, or the cell subset information is used to indicate a cell pair whose reference signal measured value does not exceed the difference threshold, so as to help the positioning server remove, through screening, a cell whose PRS receiving end power difference or SNR difference is relatively large. Step 803 may be the same as step 403 in FIG. 4, which is no longer described herein.

804: The positioning server interacts with a corresponding base station through LPPa signaling according to the cell subset information reported by the terminal, and sends beamforming configuration information to the base station. The beamforming configuration information is used to instruct the base station to select beamforming that satisfies a PRS received power or SNR difference threshold, so as to transmit a PRS. Specific implementation manners of the beamforming configuration information may include a plurality of types, which are not limited in the embodiment of the present invention.

As shown in FIG. 8, step 804 may be executed according to one of two manners (step 804a or step 804b).

In step 804a, the positioning server carries the beamforming configuration information in a message for requesting the base station to report a PRS configuration. An OTDOA information request message is signaling stipulated in TS36.455, and is used for a message for the positioning server to request the base station to report the PRS configuration. In the embodiment of the present invention, the beamforming configuration information is added in the message, and an example is made as follows, where the italic part is a part which the embodiment of the present invention adds:

```
-- ******************************************
--
-- OTDOA INFORMATION REQUEST
--
-- ******************************************
OTDOAInformationRequest::= SEQUENCE {
  protocolIEs                ProtocolIE-Container  {{OTDOAInformationRequest-IEs}},
  ...
}
OTDOAInformationRequest-IEs LPPA-PROTOCOL-IES::= {
  { ID id-OTDOA-Information-Type-Group   CRITICALITY reject TYPE
OTDOA-Information-Type           PRESENCE mandatory},
  { ID id-PRS-Beamforming-Configuration CRITICALITY reject TYPE
PRS-Beamforming-Configuration
      PRESENCE OPTIONAL},
  ...
```

```
}
    OTDOA-Information-Type::= SEQUENCE (SIZE(1..maxnoOTDOAtypes)) OF ProtocolIE-Single-Container
{ { OTDOA-Information-TypeIEs} }
    OTDOA-Information-TypeIEs        LPPA-PROTOCOL-IES::= {
    { ID id-OTDOA-Information-Type-Item CRITICALITY reject TYPE OTDOA-Information-Type-Item
    PRESENCE mandatory },
    ...
    }
    OTDOA-Information-Type-Item::= SEQUENCE {
      oTDOA-Information-Type-Item OTDOA-Information-Item,
      iE-Extensions                      ProtocolExtensionContainer { {
OTDOA-Information-Type-ItemExtIEs} } OPTIONAL,
    ...
    }
    OTDOA-Information-Type-ItemExtIEs LPPA-PROTOCOL-EXTENSION::= {
    ...
    }
```

PRS-Beamforming-Configuration (PRS beamforming configuration) is only a naming manner of the beamforming configuration information, which represents a meaning indicating a PRS beamforming configuration (which is used to configure a PRS beam direction of the base station) sent by the positioning server to the base station, whose content form is not limited, and whose main purpose is to be used to instruct the base station to adjust a PRS beamforming manner, so as to reduce a PRS received power or SNR difference between two cells in a cell pair and avoid generation of interference between PRSs of the two cells as far as possible. PRS-Beamforming-Configuration is an option, and if the positioning server does not send PRS-Beamforming-Configuration to the base station, the base station may execute PRS transmission according to its original beamforming manner.

Alternatively, step 804*b* may also be used to send the beamforming configuration information to the base station. Step 804*b* includes a newly added dedicated message 804*b*-1 of the positioning server and the base station and an existing OTDOA information request (OTDOA INFORMATION REQUEST) message 804*b*-2.

A signaling form in step 804*b*-1 is not limited, and the signaling is sent by the positioning server to the base station, to notify the base station of beamforming configuration information for transmitting a PRS. The signaling is exemplified as follows:

form is not limited, and whose main purpose is to be used to instruct the base station to adjust PRS beamforming, so as to reduce a PRS received power or SNR difference between two cells in a cell pair and avoid generation of interference between PRSs of the two cells as far as possible.

In step 804*b*-2, the existing OTDOA information request message is adopted and is not changed. If a manner of 804*b* is adopted, step 804*b*-1 may be performed before step 804*b*-2, and the positioning server requires, through step 804*b*-1, some base stations to select beamforming used to transmit a PRS; and then the positioning server requests, through step 804*b*-2, the base stations to report their own final PRS configuration information.

It should be noted that, an expression form of internal signaling of the beamforming configuration information is not limited in the embodiment of the present invention. For example, a main content of the beamforming configuration information may include angle information indicating a beam direction, which may be a horizontal direction, may also be a vertical direction, and may also be angle information of a horizontal direction plus a vertical direction. Or, a main content of the beamforming configuration information may include a PMI (Precoding Matrix Indicator, precoding matrix indicator) of a beamforming antenna (multi-antenna system). The PMI mainly indicates a configuration of a precoding matrix of a multi-antenna system, and a beam

```
-- ****************************************************************
--
-- PRS BEAMFORMING CONFIGURATION
--
-- ****************************************************************
PRSBeamformingConfiguration::= SEQUENCE {
  protocolIEs       ProtocolIE-Container       {{PRSBeamformingConfiguration-IEs}},
  ...
}
PRSBeamformingConfiguration-IEs LPPA-PROTOCOL-IES::= {
  { ID id-PRS-Beamforming-Configuration CRITICALITY reject TYPE
PRS-Beamforming-Configuration
        PRESENCE OPTIONAL},
  ...
}
```

PRSBeamformingConfiguration (PRS beamforming configuration) is only a naming manner of the beamforming configuration information, which represents a meaning indicating a PRS beamforming configuration (which is used to configure a PRS beam direction of the base station) sent by the positioning server to the base station, whose content direction of an entire antenna array can be changed through a different configuration of each antenna. Therefore, no matter whether the positioning server directly delivers the angle information or delivers the PMI, the positioning server can configure a beam direction in which the base station transmits a PRS.

805: The base station feeds back its own final PRS configuration to the positioning server. In step 805, an existing OTDOA information response (OTDOAInformationResponse) message may be used, which is no longer described herein.

806: The positioning server sends the PRS configuration information to the terminal through assistance data.

807: The terminal performs PRS detection according to the PRS configuration information in the assistance data, and estimates an RSTD.

808: The terminal reports the RSTD to the positioning server.

809: The positioning server calculates a geographic location of the terminal according to the RSTD reported by the terminal.

In the foregoing step 806 to step 809, a corresponding processing process in the prior art may be used, which is no longer described herein.

In the embodiment of the present invention, a difference threshold of a reference signal measured value is set, thereby avoiding that a measured value difference of PRSs is excessively large, and reducing interference between the PRSs.

Figure 9:
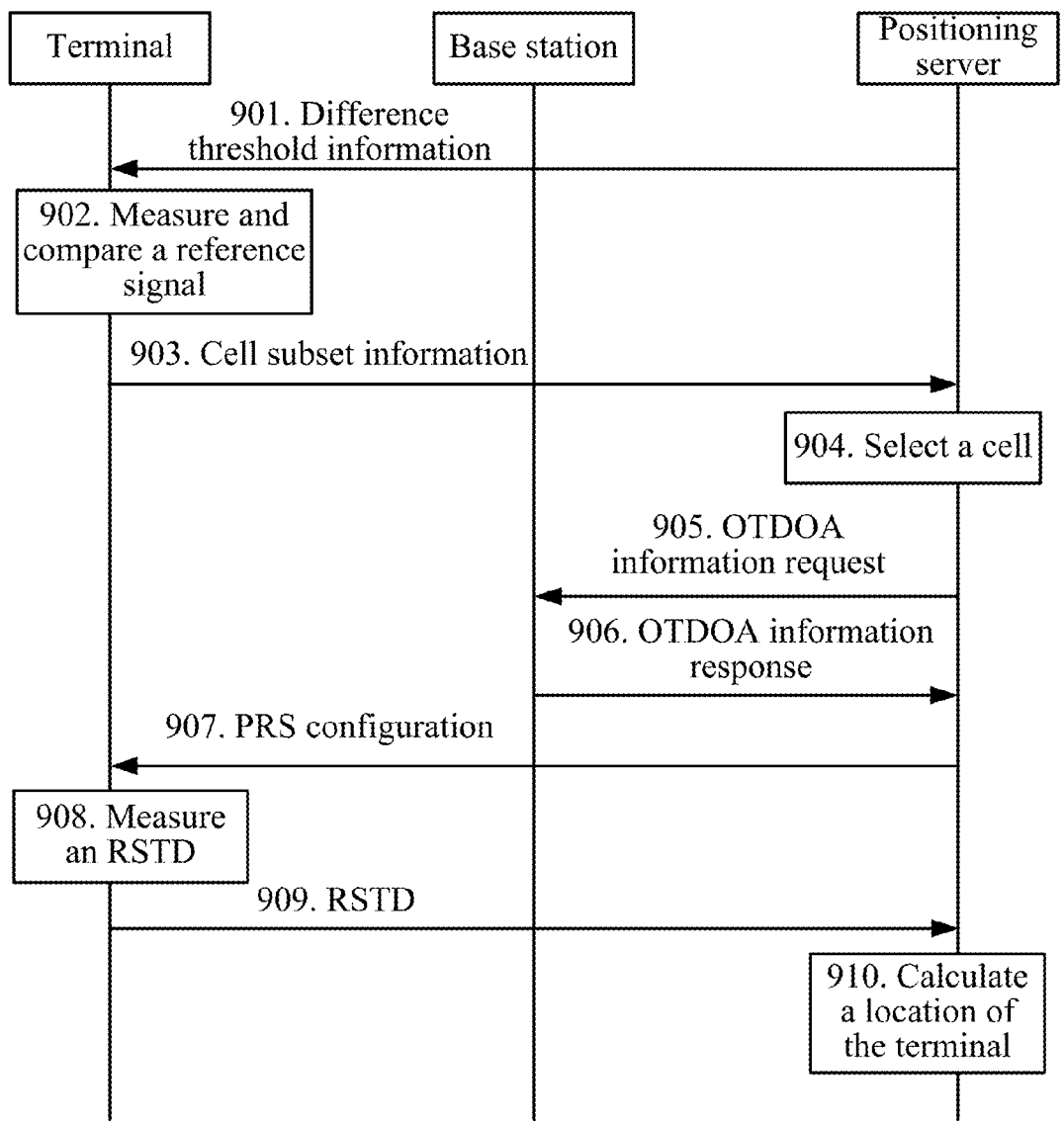
FIG. 9 is a schematic flow chart of a positioning process according to another embodiment of the present invention.

FIG. 9 is a schematic flow chart of a positioning process according to another embodiment of the present invention. In the embodiment shown in FIG. 9, a positioning server does not change a PRS configuration of a cell. The positioning server reduces a PRS received power or SNR difference by selecting a cell that satisfies a PRS received power or SNR difference threshold from a neighboring cell list of a serving cell of a terminal, so as to avoid interference between PRSs as far as possible.

901: A positioning server sends allowable difference threshold information to a terminal. Step 901 may be the same as step 401 in FIG. 4, which is no longer described herein.

902: The terminal measures a reference signal, compares RSRP or a CRS SNR of a neighboring cell with that of a current cell, where the RSRP or the CRS SNR is obtained through measurement; and compares an obtained difference with a difference threshold notified by a network side. Step 902 may be the same as step 402 in FIG. 4, which is no longer described herein.

903: The terminal reports cell subset information to the positioning server, where the cell subset information indicates a cell pair whose reference signal measured value exceeds the difference threshold, or the cell subset information is used to indicate a cell pair whose reference signal measured value does not exceed the difference threshold, so as to help the positioning server remove, through screening, a cell whose PRS receiving end power difference or SNR difference is relatively large. Step 903 may be the same as step 403 in FIG. 4, which is no longer described herein.

904: The positioning server selects, according to the cell subset information, a cell that satisfies a PRS received power or SNR difference threshold from a neighboring cell list of a serving cell of the terminal. The neighboring cell list may include a current serving cell and its neighboring cell of the terminal. The cell selected in this way can satisfy the PRS received power or SNR difference threshold, thereby avoiding that a PRS measured value difference is excessively large, and reducing interference between PRSs. A specific manner of selecting a cell is not limited in the embodiment of the present invention. For example, a cell whose geographic location is the closest to a serving cell where the terminal is located and which satisfies the difference threshold can be selected.

905: The positioning server sends an OTDOA information request (OTDOA INFORMATION REQUEST) message to a base station of the cell selected in step 904, so as to request the base station to report a PRS configuration message. In step 905, an existing OTDOA information request message may be adopted.

906: The base station feeds back its own final PRS configuration to the positioning server. In step 906, an existing OTDOA information response (OTDOAInformationResponse) message may be used, which is no longer described herein.

907: The positioning server sends PRS configuration information to the terminal through assistance data.

908: The terminal performs PRS detection according to the PRS configuration information in the assistance data, and estimates an RSTD.

909: The terminal reports the RSTD to the positioning server.

910: The positioning server calculates a geographic location of the terminal according to the RSTD reported by the terminal.

In the foregoing step 907 to step 910, a corresponding processing process in the prior art may be used, which is no longer described herein.

In the embodiment of the present invention, a difference threshold of a reference signal measured value is set, thereby avoiding that a measured value difference of PRSs is excessively large, and reducing interference between the PRSs.

In a situation that the terminal supports a plurality of modes (a plurality of RATs) and supports performing of positioning measurement in a plurality of RATs, an influence brought by a RAT load on positioning measurement is not considered in the prior art. If a PRS is transmitted in a RAT whose load is high, a resource corresponding to the RAT whose load is high is occupied, service performance and a throughput of the RAT whose load is high are influenced, and a service signal sent in the RAT whose load is high causes interference with the PRS.

Figure 10:
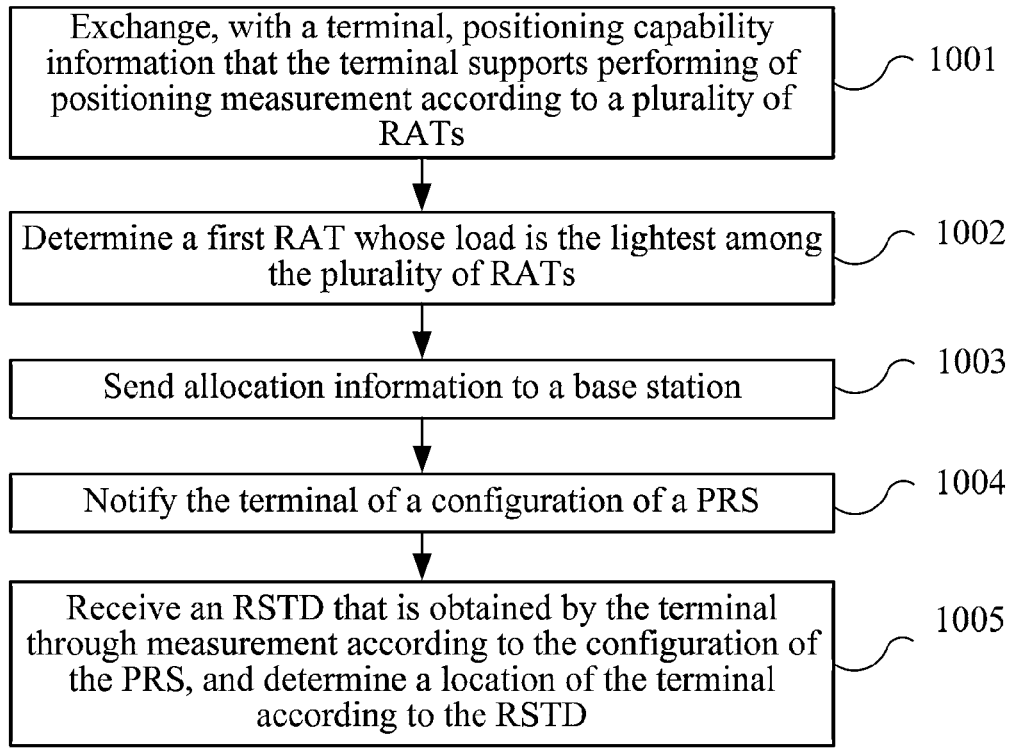
FIG. 10 is a flow chart of a positioning method according to another embodiment of the present invention.

FIG. 10 is a flow chart of a positioning method according to another embodiment of the present invention. The method shown in FIG. 10 is executed by a positioning server (such as an e-SMLC). The embodiment shown in FIG. 10 is applied to a scenario that a terminal supports performing of positioning measurement in a plurality of RATs.

1001: Exchange, with a terminal, positioning capability information that the terminal supports performing of positioning measurement according to a plurality of RATs.

A manner in which the positioning server and the terminal exchange the positioning capability information is not limited in the embodiment of the present invention. Optionally, as an embodiment, the positioning server may carry RAT request information in a message for requesting the terminal to report a capability, where the RAT request information is used to request the terminal to report the positioning capability information. The positioning server receives the positioning capability information that is carried by the terminal in reported capability information.

1002: Determine a first RAT whose load is the lightest among the plurality of RATs.

The positioning server may interact with a centralized control node (such as a mobility management entity) of a network side, or separately interact with each base station, so as to obtain load information of the plurality of RATs to determine the first RAT whose load is the lightest.

1003: Send allocation information to a base station, where the allocation information is used to instruct the base station to transmit a positioning reference signal PRS to the terminal in the first RAT, and receive a configuration of the PRS fed back by the base station.

A manner in which the positioning server sends the allocation information to the base station is not limited in the embodiment of the present invention. Optionally, as an embodiment, the positioning server may carry the allocation information in a message for requesting the base station to report a PRS configuration (such as the foregoing OTDOA information request message) or in a dedicated message before the message for requesting the base station to report the PRS configuration.

1004: Notify the terminal of the configuration of the PRS.

A manner in which the positioning server notifies the terminal of the PRS configuration may use corresponding processing in the prior art, for example, delivers the PRS configuration through assistance data, which is no longer described herein.

1005: Receive an RSTD that is obtained by the terminal through measurement according to the configuration of the PRS, and determine a location of the terminal according to the RSTD.

A process that the terminal obtains the RSTD through measurement according to the PRS configuration and a process that the positioning server determines the location of the terminal according to the RSTD are not limited in the embodiment of the present invention. For example, the same processing as that in the prior art may be adopted, which is no longer described herein.

In the embodiment of the present invention, a RAT whose load is the lightest is selected, thereby reducing interference caused by a service signal with a PRS. Additionally, in the embodiment of the present invention, a PRS is transmitted in the RAT whose load is the lightest, so that service performance and a throughput in a RAT whose load is high can be maintained.

Figure 11:
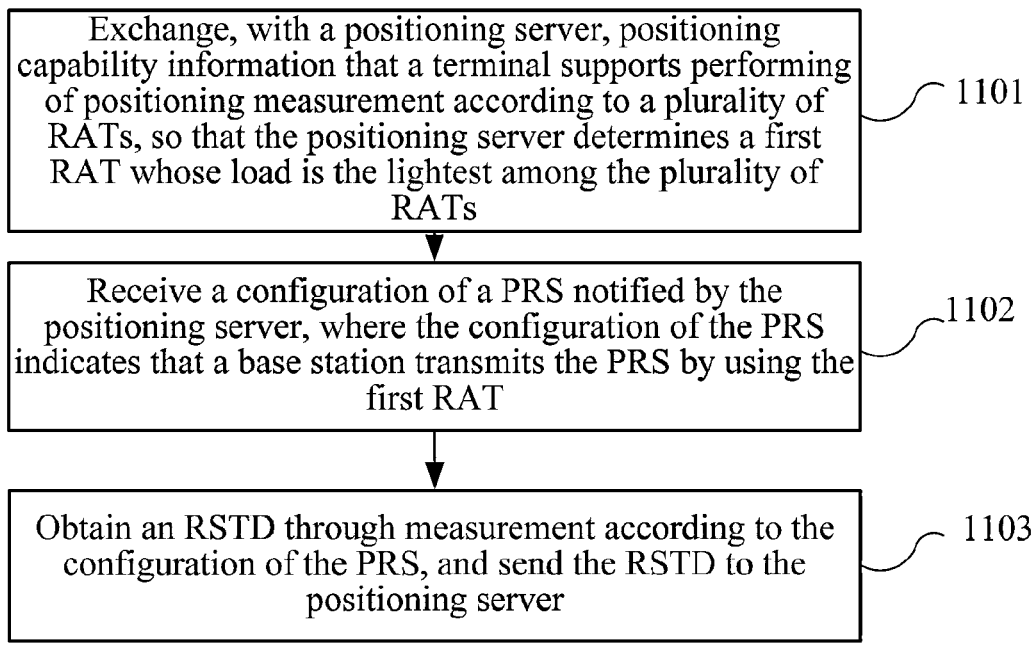
FIG. 11 is a flow chart of a positioning method according to another embodiment of the present invention.

FIG. 11 is a flow chart of a positioning method according to another embodiment of the present invention. The method shown in FIG. 11 is executed by a terminal (such as a UE), and is corresponding to the method shown in FIG. 10, and therefore, repetitive description is omitted appropriately.

1101: Exchange, with a positioning server, positioning capability information that the terminal supports performing of positioning measurement according to a plurality of RATs, so that the positioning server determines a first RAT whose load is the lightest among the plurality of RATs.

A manner in which the positioning server and the terminal exchange the positioning capability information is not limited in the embodiment of the present invention. Optionally, as an embodiment, the terminal may receive RAT request information that is carried by the positioning server in a message for requesting the terminal to report a capability, where the RAT request information is used to request the terminal to report the positioning capability information. The terminal may carry the positioning capability information in capability information that is sent to the positioning server.

1102: Receive a configuration of a PRS notified by the positioning server, where the configuration of the PRS indicates a base station transmits the PRS by using the first RAT.

A manner in which the terminal receives the PRS configuration notified by the positioning server may use corresponding processing in the prior art, for example, receives the PRS configuration delivered through assistance data, which is no longer described herein.

1103: Obtain an RSTD through measurement according to the configuration of the PRS, and send the RSTD to the positioning server.

A process that the terminal obtains the RSTD through measurement according to the PRS configuration and a process that the RSTD is sent to the positioning server are not limited in the embodiment of the present invention. For example, the same processing as that in the prior art may be adopted, which is no longer described herein.

In the embodiment of the present invention, a RAT whose load is the lightest is selected, thereby reducing interference caused by a service signal with a PRS. Additionally, in the embodiment of the present invention, a PRS is transmitted in the RAT whose load is the lightest, so that service performance and a throughput in a RAT whose load is high can be maintained.

Figure 12:
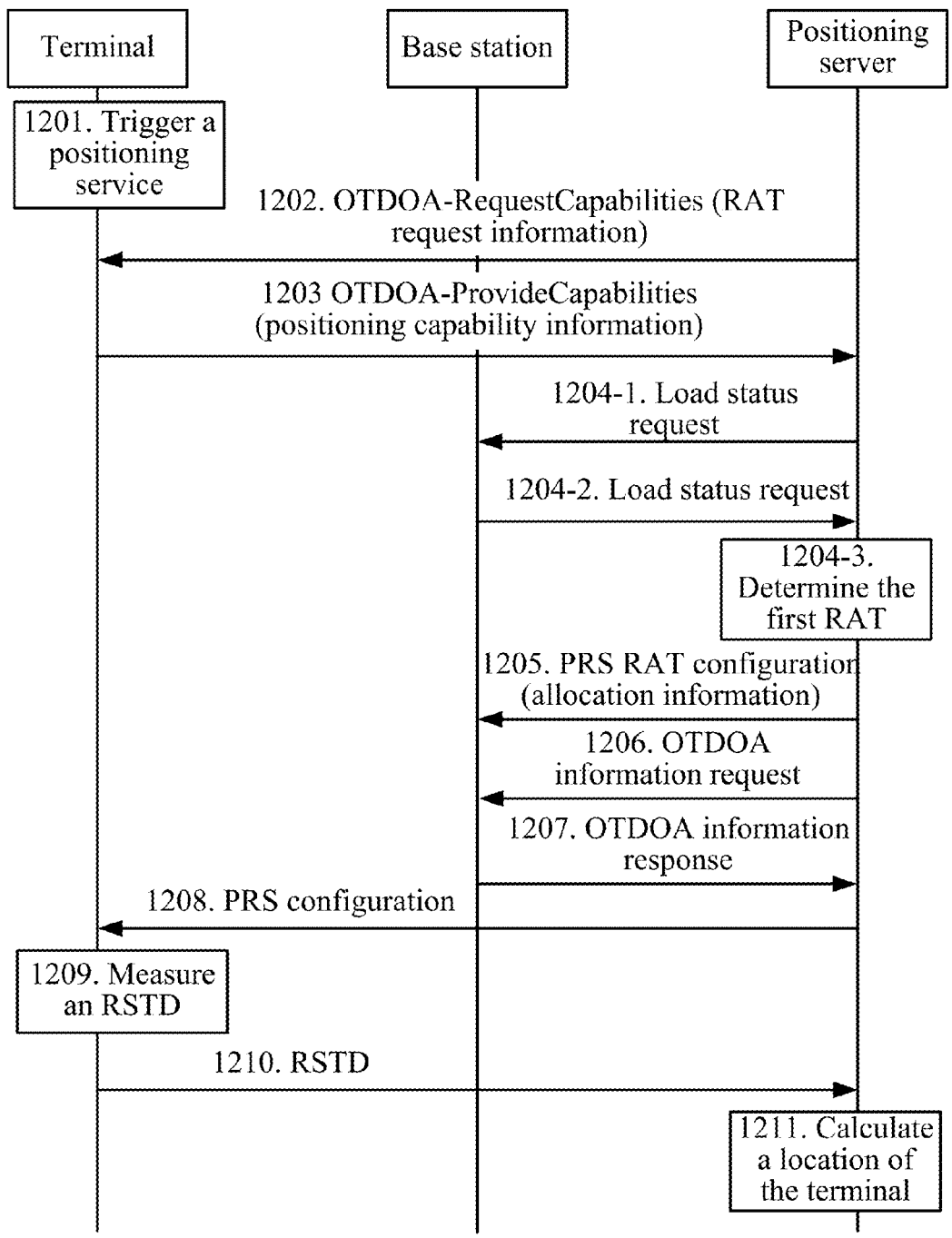
FIG. 12 is a schematic flow chart of a positioning process according to another embodiment of the present invention.

FIG. 12 is a schematic flow chart of a positioning process according to another embodiment of the present invention. The embodiment shown in FIG. 12 is applied to a scenario that a terminal supports performing of OTDOA measurement in a plurality of RATs. For a multi-mode terminal, a network side may select a RAT whose load is the lightest to transmit a positioning reference signal, and in this way, interference caused by a service signal of, for example, a PDSCH (Physical Downlink Shared Channel, physical downlink shared channel) with a PRS may also be avoided.

1201: Trigger a positioning service of a terminal, and the terminal needs to be positioned. An entity triggering this service may be the terminal itself, may be an MME (Mobility Management Entity, mobility management entity), may be a positioning server (e-SMLC), and may also be a third party entity of a network side, which is not limited in the present invention.

1202: A positioning server sends, to the terminal, RAT request information for requesting positioning capability information. The RAT request information may be carried by using a message for the positioning server to request the terminal to report a capability.

An LPP information element OTDOA-RequestCapabilities (OTDOA-RequestCapabilities) is an information element that is sent by the positioning server to the terminal to request the terminal to report its own capability (reference is made to 3GPP TS36.355), an example is made as follows, and the italic part is a part which the embodiment of the present invention adds.

```
-- ASN1START
OTDOA-RequestCapabilities::= SEQUENCE {
    otdoa-MultiRATSupport    OTDOA-MultiRATSupport    OPTIONAL,
    ...
}
-- ASN1STOP
```

OTDOA-MultiRATSupport (OTDOA-MultiRATSupport) is only a naming manner of the RAT request information, which represents a meaning indicating multi-RAT positioning supporting situation information which the positioning server requests the terminal to report.

1203: After receiving the request sent in step 1202, the terminal feeds back its own capability information to the positioning server. If the terminal supports multi-mode positioning, the terminal may notify the positioning server of positioning capability information.

An LPP information element OTDOA-ProvideCapabilities (OTDOA providing capabilities) is an information element that is sent by the terminal to the positioning server to report its own capability (reference is made to 3GPP TS36.355), in which a content of the positioning capability information may be added. An example is made as follows, and the italic part is a part which the embodiment of the present invention adds.

```
-- ASN1START
OTDOA-ProvideCapabilities::= SEQUENCE {
  otdoa-Mode        BIT STRING { ue-assisted (0) } (SIZE (1..8)),
  ...,
  supportedBandListEUTRA    SEQUENCE (SIZE (1..maxBands)) OF SupportedBandEUTRA
  OPTIONAL
  supportedRATList   SEQUENCE (SIZE (1..maxRAT)) OF SupportedRATList OPTIONAL
}
maxBands INTEGER::= 64
maxRAT INTEGER    ::= n
SupportedBandEUTRA::= SEQUENCE {
  bandEUTRA                           INTEGER (1..64)
}
SupportedRATList::= SEQUENCE {
  supportGSM                          BOOLEAN,
  supportGERAN                        BOOLEAN,
  supportUTRANFDD                     BOOLEAN,
  supportUTRANTDD                     BOOLEAN,
  supportCDMA20001xRTT                BOOLEAN,
  supportHRPD                         BOOLEAN,
  supportEUTRAN                       BOOLEAN,
  ...
}
-- ASN1STOP
``` supportedRATList (supportedRATList) is only a naming manner of the positioning capability information, which represents a meaning indicating an OTDOA RAT list supported by the terminal. maxRAT is only a naming manner, which represents a meaning indicating the number of RATs, this number is generally a fixed value, and is determined according to RATs in which the OTDOA is supported, which is not limited in the present invention. Herein, each member IE in SupportedRATList is provided with an exemplary naming manner, whose meaning indicates whether to support a corresponding RAT, for example, supportGSM indicates whether to support the GSM, and is a Boolean variable, '1' indicates that the GSM is supported, and '0' indicates that the GSM is not supported.

1204: The positioning server determines, according to a traffic volume of each RAT in a serving area, a RAT whose load is the lightest (a first RAT).

In a manner of determining the size of a load, the positioning server may interact with a centralized control node of a network side, or may interact with each base station, so as to obtain load information. Interaction between the positioning server and the base station relates to an IE of 3GPP TS36.455, and includes two steps: a requesting step 1204-1 and a feedback step 1204-2. The signaling is exemplified as follows:

1204-1: The positioning server send a load status request (LOAD STATUS REQUEST) to the base station, so as to request the base station to feed back load statuses of a plurality of RATs.

```
-- ****************************************************************
--
-- LOAD STATUS REQUEST
--
-- ****************************************************************
LoadStatusRequest::= SEQUENCE {
  protocolIEs           ProtocolIE-Container  {{LoadStatusRequest-IEs}},
  ...
}
LoadStatusRequest-IEs LPPA-PROTOCOL-IES::= {
  { ID id-Load-Status-Type-Group   CRITICALITY reject TYPE Load-Status-Type
  PRESENCE mandatory},
  ...
}
Load-Status-Type::= SEQUENCE (SIZE(1..maxnoLItypes)) OF ProtocolIE-Single-Container { {
Load-Status-TypeIEs} }
    Load-Status-TypeIEs LPPA-PROTOCOL-IES::= {
    { ID id-Load-Status-Type-Item CRITICALITY reject TYPE Load-Status-Type-Item PRESENCE
mandatory },
    ...
    }
    Load-Status-Type-Item::= SEQUENCE {
      load-Status-Type-Item   Load-Status-Item,
      iE-Extensions              ProtocolExtensionContainer { { Load-Status-Type-ItemExtIEs}
} OPTIONAL,
    ...
    }
    Load-Status-Type-ItemExtIEs LPPA-PROTOCOL-EXTENSION::= {
      ...
    }
```

Load-Status-Item (load status item) is only a naming manner, which represents a meaning that a load situation of the base station in this RAT is requested. A content and a form of this IE are not limited in the embodiment of the present invention.

1204-2: When receiving a load situation request of the positioning server, the base station may return a load status response (LOAD STATUS RESPONSE) message, so as to feed back load statuses of a plurality of RATs. Corresponding feedback signaling is exemplified as follows:

```
-- ****************************************************************
--
-- LOAD STATUS RESPONSE
--
-- ****************************************************************
LoadStatusResponse::= SEQUENCE {
  protocolIEs         ProtocolIE-Container        {{LoadStatusResponse-IEs}},
  ...
}
LoadStatusResponse-IEs LPPA-PROTOCOL-IES::= {
  { ID id-OTDOACells        CRITICALITY ignore TYPE OTDOACells RESENCE mandatory}|
  { ID id-CriticalityDiagnostics CRITICALITY ignore TYPE CriticalityDiagnostics
    PRESENCE optional },
  ...
}
```

Load Status (load status) is only a naming manner, which represents a meaning indicating a situation of a load of this base station in this RAT. A content and a form of this IE are not limited in the embodiment of the present invention.

1204-3: The positioning server determines, according to a load status fed back by the base station, the RAT whose load is the lightest (namely, the first RAT).

1205: The positioning server sends allocation information to the base station, so as to configure the base station to send a positioning signal in the first RAT.

A signaling form of the allocation information is not limited in the embodiment of the present invention. The allocation information is sent by the positioning server to the base station, to instruct the base station to transmit a PRS in the first RAT. The signaling is exemplified as follows:

```
-- ****************************************************************
--
-- PRS RAT CONFIGURATION
--
-- ****************************************************************
PRSRATConfiguration::= SEQUENCE {
  protocolIEs         ProtocolIE-Container        {{PRSRATConfiguration-IEs}},
  ...
}
PRSRATConfiguration-IEs LPPA-PROTOCOL-IES::= {
  { ID id-PRS-RAT-Configuration CRITICALITY reject TYPE PRS-RAT-Configuration
    PRESENCE OPTIONAL},
  ...
}
```

PRSRATConfiguration (PRS RAT configuration) is only a naming manner of the allocation information, which represents a meaning indicating the allocation information sent by the positioning server to the base station, which is used to indicate a PRS RAT configuration to the base station, whose content form is not limited, and whose main purpose is to be used to instruct the base station to select a proper RAT (the first RAT), so as to avoid interference generated between PRSs.

1206: The positioning server sends an OTDOA information request (OTDOA INFORMATION REQUEST) message to the base station of the cell selected in step 904, so as to request the base station to report a PRS configuration message. In step 1206, an existing OTDOA information request message may be adopted.

Alternatively, as another embodiment, being similar to step 404a in FIG. 4, the allocation information in step 1205 may also be combined into the OTDOA information request message.

1207: The base station feeds back its own final PRS configuration to the positioning server. In step 1207, an existing OTDOA information response (OTDOAInformationResponse) message may be used, which is no longer described herein.

1208: The positioning server sends PRS configuration information to the terminal through assistance data.

1209: The terminal performs PRS detection according to the PRS configuration information in the assistance data, and estimates an RSTD.

1210: The terminal reports the RSTD to the positioning server.

1211: The positioning server calculates a geographic location of the terminal according to the RSTD reported by the terminal.

In the foregoing step 1208 to step 1211, a corresponding processing process in the prior art may be used, which is no longer described herein.

In the embodiment of the present invention, a RAT whose load is the lightest is selected, thereby reducing interference caused by a service signal with a PRS. Additionally, in the embodiment of the present invention, a PRS is transmitted in the RAT whose load is the lightest, so that service performance and a throughput in a RAT whose load is high can be maintained.

FIG. 13 is a schematic diagram of a scenario to which an embodiment of the present invention is applicable. As shown in an upper half part of FIG. 13, a base station 131 controls three cells S1, S2 and S3. A lower half part of FIG. 13 is a schematic diagram of bandwidth division of the three cells. A bandwidth of the base station is divided into a first frequency band B1, a second frequency band B2, a third frequency band B3 and a fourth frequency band B4. The first cell S1 uses the first frequency band B1 and the second frequency band B2, the second cell S2 uses the third frequency band B3 and the fourth frequency band B4, and the third cell S3 uses the second frequency band B2 and the third frequency band B3. For example, if the bandwidth of the base station is 40 MHz, and the four frequency bands B1 to B4 are averagely allocated, a bandwidth of each frequency band is 10 MHz, and each of the cells S1 to S3 occupies 20 MHz. The cell S1 and the cell S3 have a MHz of bandwidth overlapped (the second frequency band B2), and the cell S2 and the cell S3 have a 10 MHz of bandwidth overlapped (the third frequency band B3).

For an inter-frequency scenario of the Rel-9, one of two frequency points may be allowed to send a PRS, and the other may be allowed to send a service signal (such as a PDSCH of data). In this situation, frequencies are completely orthogonal, and therefore, no mutual interference is generated. However, in the scenario in FIG. 13, a system bandwidth of different cells is overlapped, and interference is also generated even if it is in the inter-frequency scenario. For OTDOA, RSTDs of PRSs of different cells need to be estimated, that is, estimation on PRS time of arrival needs to be used, and therefore, the OTDOA is very sensitive to interference. A problem of PRS interference in this inter-frequency scenario needs to be solved.

FIG. 14 is a flow chart of a positioning method according to another embodiment of the present invention. The method shown in FIG. 14 is executed by a base station (such as an eNB). The method shown in FIG. 14 is described with reference to the scenario in FIG. 13.

1401: Determine configurations of PRSs of a first cell, a second cell and a third cell that are controlled by a base station, where a bandwidth of the base station is divided into a first frequency band, a second frequency band, a third frequency band and a fourth frequency band, the first cell uses the first frequency band and the second frequency band, the second cell uses the third frequency band and the fourth frequency band, and the third cell uses the second frequency band and the third frequency band, so that when any one of the first cell, the second cell and the third cell transmits a PRS, other cells do not transmit a service signal on a frequency band overlapped with that of the one cell.

1402: Transmit the PRS to a terminal on the one cell according to a configuration of the PRS.

In the embodiment of the present invention, a service signal is not transmitted on a frequency band overlapped with that of a cell that transmits a PRS, thereby avoiding interference of the service signal with the PRS.

Optionally, as an embodiment, when a PRS is configured in step 1401, simultaneous transmission of the PRSs of the first cell, the second cell and the third cell, that is, the PRSs are sent at the same moment, may be limited. Because the three cells belong to the same base station, sending synchronization of PRS signals can be ensured. A PRS subframe is an LIS (low interference subframe, low interference subframe), and therefore, PRS subframes sent by the three cells simultaneously do not include any content of a service signal (such as a PDSCH), and interference of service signals with each other can be avoided.

In this situation, a PRS subframe offset (prs-SubframeOffset) information element stipulated in TS36.355 may be configured, so as to implement simultaneous transmission of the PRSs of the three cells. For example, a PRS subframe offset in a configuration of a PRS is configured to 0 or no PRS subframe offset is configured.

prs-SubframeOffset=0 or no configuration is performed (no configuration means 0 by default)

Optionally, as another embodiment, each cell may be separately configured, and no service signal is transmitted on an overlapped frequency band, but a PRS or other public signals or other control signals can be transmitted.

Specifically, when it is configured that the first cell S1 transmits a PRS, the third cell S3 does not transmit a service signal on the second frequency band B2. Power allocation and resource allocation of the third cell S3 on the third frequency band B3 and power allocation and resource allocation of the second cell S2 on the third frequency band B3 and the fourth frequency band B4 are not limited in the embodiment of the present invention. Optionally, the third cell S3 can transmit a PRS or other public signals or other control signals on the second frequency band B2.

In another aspect, when it is configured that the second cell S2 transmits a PRS, the third cell S3 does not transmit a service signal on the third frequency band B3. Power allocation and resource allocation of the third cell S3 on the second frequency band B2 and power allocation and resource allocation of the first cell S1 on the first frequency band B1 and the second frequency band B2 are not limited in the embodiment of the present invention. Optionally, the third cell S3 can transmit a PRS or other public signals or other control signals on the third frequency band B3.

Additionally, when it is configured that the third cell S3 transmits a PRS, the first cell S1 does not transmit a service signal on the second frequency band B2 and the second cell S2 does not transmit a service signal on the third frequency band B3. Power allocation and resource allocation of the first cell S1 on the first frequency band B1 and power allocation and resource allocation of the second cell S2 on the fourth frequency band B4 are not limited in the embodiment of the present invention. Optionally, the first cell S1 can transmit a PRS or other public signals or other control signals on the second frequency band B2 and the second cell S2 can transmit a PRS or other public signals or other control signals on the third frequency band B3.

In this way, in the embodiment of the present invention, interference of a service signal with a PRS in the scenario in the FIG. 13 can be avoided.

Figure 15:
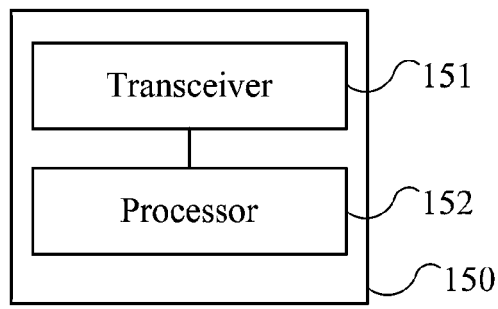
FIG. 15 is a block diagram of a positioning server according to an embodiment of the present invention.

FIG. 15 is a block diagram of a positioning server according to an embodiment of the present invention. An example of a positioning server 150 in FIG. 15 is an e-SMLC, including a transceiver 151 and a processor 152.

The transceiver 151 may notify a terminal of difference threshold information. The difference threshold information is used to indicate a difference threshold of a reference signal measured value of two cells in a cell pair.

The transceiver 151 may further receive cell subset information that is determined by the terminal according to the difference threshold information, where the cell subset information is used to indicate a cell pair whose reference signal measured value exceeds the difference threshold, or the cell subset information is used to indicate a cell pair whose reference signal measured value does not exceed the difference threshold.

The processor 152 determines a configuration of a positioning reference signal PRS according to the cell subset information. The transceiver 151 notifies the terminal of the configuration of the PRS.

The transceiver 151 receives an RSTD that is obtained by the terminal through measurement according to the configuration of the PRS. The processor 152 determines a location of the terminal according to the RSTD.

In the embodiment of the present invention, a difference threshold of a reference signal measured value is set, thereby avoiding that a measured value difference of PRSs is excessively large, and reducing interference between the PRSs.

The positioning server 150 can implement each step related to the positioning server in the methods in FIG. 1 to FIG. 9, which is no longer described in detail in order to avoid repetition.

Optionally, as an embodiment, the difference threshold information may include at least one of the following: a difference threshold of RSRP of the two cells, a difference threshold of CRS SNRs of the two cells, a difference threshold of PRS received power PRP of the two cells and a first mapping factor, and a difference threshold of PRS SNRs of the two cells and a second mapping factor, where the first mapping factor represents a mapping factor between an RSRP difference and a PRP difference, and the second mapping factor represents a mapping factor between a CRS SNR difference and a PRS SNR difference.

Optionally, as another embodiment, the transceiver 151 may carry the difference threshold information in a message for requesting the terminal to report a capability; or carry the difference threshold information in a message for requesting the terminal to perform positioning measurement; or carry the difference threshold information in assistance data that is sent to the terminal and used to help the terminal perform positioning measurement; or send the difference threshold information to a serving base station of the terminal, so that the serving base station sends the difference threshold information to the terminal through a broadcast message or a radio resource control message.

Optionally, as another embodiment, the transceiver 151 may receive the cell subset information that is carried by the terminal in a message for reporting a capability; or receive the cell subset information that is carried by the terminal in a message for requesting assistance data.

Optionally, as another embodiment, the processor 152 may send, through the transceiver 151 according to the cell subset information, power allocation information to a base station that needs to adjust PRS transmit power. The power allocation information is used to instruct the base station to adjust the PRS transmit power so as to reduce a PRS received power or SNR difference of two cells in a cell pair. The transceiver 151 may receive, from the base station, a configuration of the PRS that is obtained by the base station after the base station performs adjustment based on the power allocation information.

Optionally, as another embodiment, the processor 152 may send, through the transceiver 151 according to the cell subset information, frequency point allocation information to a base station that needs to adjust a PRS sending frequency point. The frequency point allocation information is used to instruct the base station to adjust the PRS sending frequency point so as to reduce a PRS received power or SNR difference of two cells in a cell pair. The transceiver 151 may receive, from the base station, a configuration of the PRS that is obtained by the base station after the base station performs adjustment based on the frequency point allocation information.

Optionally, as another embodiment, the processor 152 may send node configuration information to the base station through the transceiver 151 according to the cell subset information. The node configuration information is used to instruct the base station to select an optimal coordinated node (COMP node) that satisfies a PRS received power or SNR difference threshold, so as to transmit a PRS. The transceiver 151 may receive, from the base station, a configuration of the PRS that is obtained by the base station after the base station performs selection based on the node configuration information.

Optionally, as another embodiment, the processor 152 may select, according to the cell subset information, a cell that satisfies a PRS received power or SNR difference threshold from a neighboring cell list of a serving cell of the terminal. The transceiver 151 may receive the configuration of the PRS from a base station of the selected cell.

Optionally, as another embodiment, the processor 152 may send beamforming configuration information to the base station through the transceiver 151 according to the cell subset information. The beamforming configuration information is used to instruct the base station to select beamforming that satisfies a PRS received power or SNR difference threshold, so as to transmit a PRS. The transceiver 152 may receive, from the base station, a configuration of the PRS that is obtained by the base station after the base station performs selection based on the beamforming configuration information.

Optionally, as another embodiment, the transceiver 151 may carry the allocation information in a message for requesting the base station to report the PRS configuration or in a dedicated message before a message for requesting the base station to report the PRS configuration (such as the power allocation information, the frequency point allocation information, the node configuration information, and the beamforming configuration information).

In this way, in the embodiment of the present invention, a difference threshold of a reference signal measured value is set, thereby avoiding that a measured value difference of PRSs is excessively large, and reducing interference between the PRSs.

Figure 16:
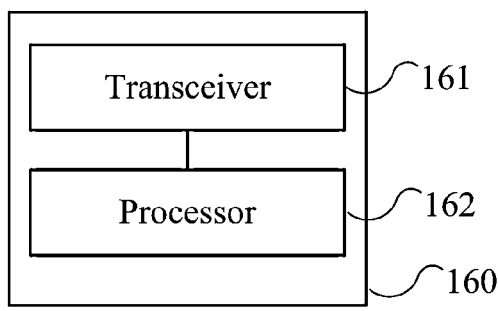
FIG. 16 is a block diagram of a terminal according to an embodiment of the present invention.

FIG. 16 is a block diagram of a terminal according to an embodiment of the present invention. An example of a terminal 160 in FIG. 16 is a UE, including a transceiver 161 and a processor 162.

The transceiver 161 receives difference threshold information notified by a positioning server. The difference threshold information is used to indicate a difference threshold of a reference signal measured value of two cells in a cell pair. The processor 162 determines cell subset information according to the difference threshold information. The cell subset information is used to indicate a cell pair whose reference signal measured value difference exceeds the difference threshold, or the cell subset information is used to indicate a cell pair whose reference signal measured value difference does not exceed the difference threshold.

The transceiver 161 sends the cell subset information to the positioning server, and receives a configuration of a positioning reference signal PRS, where the configuration of the PRS is determined by the positioning server according to the cell subset information. The processor 162 obtains an RSTD through measurement according to the configuration of the PRS. The transceiver 161 sends the RSTD to the positioning server.

In this way, in the embodiment of the present invention, a difference threshold of a reference signal measured value is set, thereby avoiding that a measured value difference of PRSs is excessively large, and reducing interference between the PRSs.

The terminal 160 can implement each step related to the terminal in the methods in FIG. 1 to FIG. 9, which is no longer described in detail in order to avoid repetition.

Optionally, as an embodiment, the difference threshold information may include at least one of the following: a difference threshold of RSRP of the two cells, a difference threshold of CRS SNRs of the two cells, a difference threshold of PRS received power PRP of the two cells and a first mapping factor, and a difference threshold of PRS SNRs of the two cells and a second mapping factor. The first mapping factor represents a mapping factor between an RSRP difference and a PRP difference, and the second mapping factor represents a mapping factor between a CRS SNR difference and a PRS SNR difference.

Optionally, as another embodiment, the transceiver 161 may receive the difference threshold information that is carried by the positioning server in a message for requesting the terminal to report a capability; or receive the difference threshold information that is carried by the positioning server in a message for requesting the terminal to perform positioning measurement; or receive the difference threshold information that is carried by the positioning server in assistance data that is sent to the terminal and used to help the terminal perform positioning measurement; or receive the difference threshold information that is sent by a serving base station of the terminal to the terminal through a broadcast message or an RRC message, where the difference threshold information is received by the serving base station from the positioning server.

Optionally, as another embodiment, the transceiver 161 may carry the cell subset information in a message for reporting a capability to the positioning server; or carry the cell subset information in a message for requesting assistance data from the positioning server.

Optionally, as another embodiment, the cell subset information may include a list of a cell pair whose reference signal measured value difference exceeds the difference threshold, or the cell subset information includes a list of a cell pair whose reference signal measured value difference does not exceed the difference threshold, or the cell subset information includes a list of a cell, a reference signal measured value difference between which and a current investigated cell exceeds the difference threshold, or the cell subset information includes a list of a cell, a reference signal measured value difference between which and a current investigated cell does not exceed the difference threshold.

In this way, in the embodiment of the present invention, a difference threshold of a reference signal measured value is set, thereby avoiding that a measured value difference of PRSs is excessively large, and reducing interference between the PRSs.

Figure 17:
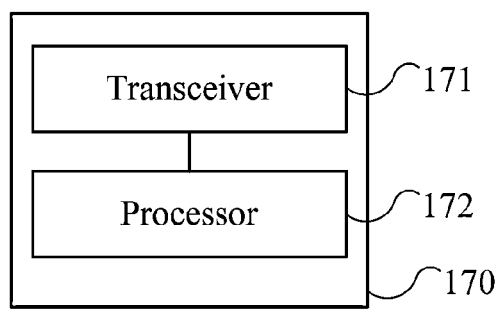
FIG. 17 is a block diagram of a base station according to an embodiment of the present invention.

FIG. 17 is a block diagram of a base station according to an embodiment of the present invention. An example of a base station 170 in FIG. 17 is an eNB, including a transceiver 171 and a processor 172.

The transceiver 171 receives allocation information sent by a positioning server. The processor 172 adjusts a configuration of a PRS according to the allocation information. The transceiver 171 feeds back the adjusted configuration of the PRS to the positioning server. The transceiver 171 transmits the PRS to a terminal according to the adjusted configuration of the PRS.

In this way, in the embodiment of the present invention, a difference threshold of a reference signal measured value is set, thereby avoiding that a measured value difference of PRSs is excessively large, and reducing interference between the PRSs.

The base station 170 in FIG. 17 can implement each step related to the base station in the methods in FIG. 1 to FIG. 12, which is no longer described in detail in order to avoid repetition.

Optionally, as an embodiment, the transceiver 171 may further receive difference threshold information from the positioning server and forward the difference threshold information to the terminal. The difference threshold information is used to indicate a difference threshold of a reference signal measured value of two cells in a cell pair.

The transceiver 171 may further receive, from the terminal, cell subset information that is determined by the terminal according to the difference threshold information, and forward the cell subset information to the positioning server. The cell subset information is used to indicate a cell pair whose reference signal measured value exceeds the difference threshold, or the cell subset information is used to indicate a cell pair whose reference signal measured value does not exceed the difference threshold. The allocation information is sent by the positioning server according to the cell subset information.

Optionally, as another embodiment, the transceiver 171 may receive the difference threshold information from the positioning server, and send the difference threshold information to the terminal through a broadcast message or an RRC message; or transparently transmit the difference threshold information from the positioning server to the terminal.

Optionally, as another embodiment, the processor 172 may execute any one of the following adjustment operations according to the allocation information: adjustment of PRS transmit power, adjustment of a PRS sending frequency point, selection of an optimal coordinated node (COMP node) that is used to transmit a PRS and satisfies a PRS received power or SNR difference threshold, selection of beamforming that is used to transmit a PRS and satisfies a PRS received power or SNR difference threshold, and transmission of a PRS by using a first RAT whose load is the lightest among a plurality of radio access techniques RATs.

Optionally, as another embodiment, the transceiver 171 may receive the allocation information that is carried by the positioning server in a message for requesting the base station to report a PRS configuration; or receive the allocation information that is carried by the positioning server in a dedicated message before a message for requesting the base station to report a PRS configuration.

In this way, in the embodiment of the present invention, a difference threshold of a reference signal measured value is set, thereby avoiding that a measured value difference of PRSs is excessively large, and reducing interference between the PRSs.

Additionally, if the base station transmits, according to the allocation information of the positioning server, a PRS by using a first RAT whose load is the lightest among a plurality of RATs, interference of a service signal with a PRS can also be reduced.

Figure 18:
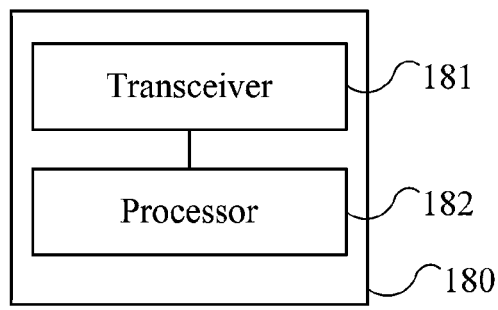
FIG. 18 is a block diagram of a positioning server according to another embodiment of the present invention.

FIG. 18 is a block diagram of a positioning server according to another embodiment of the present invention. An example of a positioning server 180 in FIG. 18 is an e-SMLC, including a transceiver 181 and a processor 182.

The transceiver 181 exchanges, with a terminal, positioning capability information that the terminal supports performing of positioning measurement according to a plurality of RATs. The processor 182 determines a first RAT whose load is the lightest among the plurality of RATs.

The transceiver 181 sends allocation information to a base station, where the allocation information is used to instruct the base station to transmit a PRS to the terminal in the first RAT, and receives a configuration of the PRS fed back by the base station. The transceiver 181 notifies the terminal of the configuration of the PRS. The transceiver 181 receives an RSTD that is obtained by the terminal through measurement according to the configuration of the PRS. The processor 182 determines a location of the terminal according to the RSTD.

In the embodiment of the present invention, a RAT whose load is the lightest is selected, thereby reducing interference caused by a service signal with a PRS. Additionally, in the embodiment of the present invention, a PRS is transmitted in the RAT whose load is the lightest, so that service performance and a throughput in a RAT whose load is high can be maintained.

The positioning server 180 can implement each step related to the positioning server in the methods in FIG. 10 to FIG. 12, which is no longer described in detail in order to avoid repetition.

Optionally, as an embodiment, the transceiver 181 may carry RAT request information in a message for requesting the terminal to report a capability, where the RAT request information is used to request the terminal to report the positioning capability information; and receive the positioning capability information that is carried by the terminal in reported capability information.

Figure 19:
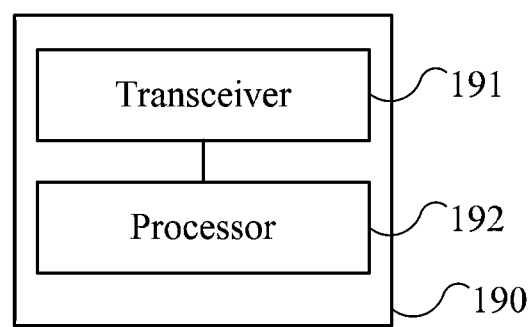
FIG. 19 is a block diagram of a terminal according to another embodiment of the present invention.

FIG. 19 is a block diagram of a terminal according to another embodiment of the present invention. An example of a terminal 190 in FIG. 19 is a UE, including a transceiver 191 and a processor 192.

The transceiver 191 exchanges, with a positioning server, positioning capability information that the terminal supports performing of positioning measurement according to a plurality of RATs, so that the positioning server determines a first RAT whose load is the lightest among the plurality of RATs. The transceiver 191 receives a configuration of a PRS notified by the positioning server, where the configuration of the PRS indicates that a base station transmits the PRS by using the first RAT. The processor 192 obtains an RSTD through measurement according to the configuration of the PRS. The transceiver 191 sends the RSTD to the positioning server.

In the embodiment of the present invention, a RAT whose load is the lightest is selected, thereby reducing interference caused by a service signal with a PRS. Additionally, in the embodiment of the present invention, a PRS is transmitted in the RAT whose load is the lightest, so that service performance and a throughput in a RAT whose load is high can be maintained.

The terminal 190 can implement each step related to the terminal in the methods in FIG. 10 to FIG. 12, which is no longer described in detail in order to avoid repetition.

Optionally, as an embodiment, the transceiver 191 may receive RAT request information that is carried by the positioning server in a message for requesting the terminal to report a capability, where the RAT request information is used to request the terminal to report the positioning capability information; and carry the positioning capability information in capability information that is sent to the positioning server.

Figure 20:
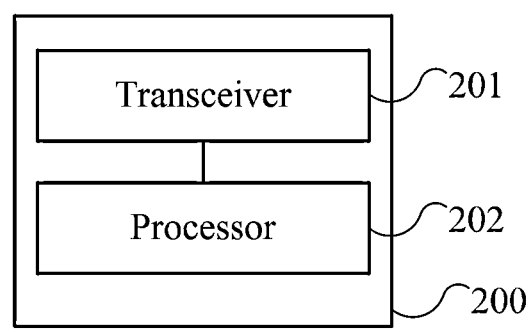
FIG. 20 is a block diagram of a base station according to an embodiment of the present invention.

FIG. 20 is a block diagram of a base station according to an embodiment of the present invention. An example of a base station 200 in FIG. 20 is an eNB, including a transceiver 201 and a processor 202. The base station 200 in FIG. 20 may be applied to the scenario shown in FIG. 13.

The processor 202 determines configurations of positioning reference signals PRSs of a first cell, a second cell and a third cell that are controlled by the base station, so that when any one of the first cell, the second cell and the third cell transmits a PRS, other cells do not transmit a service signal on a frequency band overlapped with that of the one cell. A bandwidth of the base station is divided into a first frequency band, a second frequency band, a third frequency band and a fourth frequency band, the first cell uses the first frequency band and the second frequency band, the second cell uses the third frequency band and the fourth frequency band, and the third cell uses the second frequency band and the third frequency band. The transceiver 201 transmits the PRS to a terminal on the one cell according to a configuration of the PRS.

In the embodiment of the present invention, a service signal is not transmitted on a frequency band overlapped with that of a cell that transmits a PRS, thereby avoiding interference of the service signal with the PRS.

The base station 200 in FIG. 20 can implement each step related to the base station in the method in FIG. 14, which is no longer described in detail in order to avoid repetition.

Optionally, as an embodiment, the processor 202 may limit simultaneous transmission of the PRSs of the first cell, the second cell and the third cell. For example, the processor 202 may configure a PRS subframe offset (prs-SubframeOffset) information element stipulated in TS36.355, so as to implement simultaneous transmission of the PRSs of the three cells. For example, a PRS subframe offset in a configuration of a PRS is configured to 0 or no PRS subframe offset is configured.

prs-SubframeOffset=0 or no configuration is performed (no configuration means 0 by default)

Optionally, as another embodiment, the processor 202 may determine the following PRS configuration: when it is configured that the first cell transmits a PRS, the third cell does not transmit a service signal on the second frequency band; or when it is configured that the second cell transmits a PRS, the third cell does not transmit a service signal on the third frequency band; or when it is configured that the third cell transmits a PRS, the first cell does not transmit a service signal on the second frequency band and the second cell does not transmit a service signal on the third frequency band.

In this way, in the embodiment of the present invention, interference of a service signal with a PRS in the scenario in the FIG. 13 can be avoided.

A person of ordinary skill in the art may appreciate that, with reference to the examples described in the embodiments disclosed in this specification, units and algorithm steps can be implemented by electronic hardware or a combination of computer software and electronic hardware. Whether these functions are executed in hardware or software manner depends upon particular applications and design constraint conditions of the technical solutions. A person skilled in the art may use different methods to implement the described functions for each particular application, but it should not be considered that such implementation goes beyond the scope of the present invention.

It may be clearly understood by a person skilled in the art that, for the purpose of convenient and brief description, for detailed working process of the foregoing system, apparatus and unit, reference may be made to a corresponding process in the method embodiments, which is no longer described herein.

In several embodiments provided in the present application, it should be understood that the disclosed system, apparatus, and method may be implemented in other ways. For example, the described apparatus embodiments are merely exemplary. For example, the unit division is merely logical function division and may be other division in actual implementation. For example, a plurality of units or components may be combined or integrated into another system, or some features may be ignored or not performed. Additionally, the shown or discussed coupling or direct coupling or communication connection may be accomplished through some interfaces, and indirect coupling or communication connection between apparatuses or units may be electrical, mechanical, or in other forms.

The units described as separate components may be or may not be physically separated. Components shown as units may be or may not be physical units, that is, may be located in one place, or may be distributed to a plurality of network units. Some or all of the units may be selected to achieve the objectives of the solutions of the embodiments according to actual demands.

In addition, various functional units in each embodiment of the present invention may be integrated in one processing unit or may exist as various separate physical units, or two or more units may be integrated in one unit.

When the functions are implemented in the form of a software functional unit and sold or used as a separate product, the functions may be stored in a computer readable storage medium. Based on this understanding, the technical solutions of the present invention or the part that makes contributions to the prior art or part of the technical solutions may be substantially embodied in the form of a software product. The computer software product is stored in a storage medium, and includes several instructions to instruct a computer device (which may be a personal computer, a server, or a network device) to perform all or a part of steps of the methods described in the embodiments of the present invention. The storage medium includes various media capable of storing program codes, such as a USB flash disk, a mobile hard disk, a read-only memory (ROM, Read-Only Memory), a random access memory (RAM, Random Access Memory), a magnetic disk or an optical disk.

The foregoing descriptions are merely specific embodiments of the present invention, but are not intended to limit the protection scope of the present invention. Any variation or replacement made by a person skilled in the art within the technical scope disclosed in the present invention shall all fall within the protection scope of the present invention. Therefore, the protection scope of the present invention shall be subject to that of the claims.

What is claimed is:

1. A positioning method comprising:
   exchanging, with a terminal, positioning capability information that the terminal supports performing a positioning measurement according to a plurality of radio access techniques (RATs);
   determining a first RAT whose load is the lightest among the plurality of RATs;
   sending allocation information to a base station, where the allocation information is (a) part of a message requesting the base station report a positioning reference signal (PRS) configuration or (b) a dedicated message sent before the message requesting the base station report the PRS configuration,
      wherein the allocation information instructs the base station to (a) transmit the PRS to the terminal through the first RAT, and (b) adjust a configuration of the PRS by reducing a measured value of a reference signal of a cell pair when the measured value is greater than a threshold, where the cell pair is identified by cell subset information determined by the terminal;
   receiving the configuration of the PRS fed back by the base station;
   notifying the terminal of the configuration of the PRS;
   receiving a reference signal time difference (RSTD) that is obtained by the terminal through measurement according to the configuration of the PRS; and
   determining a location of the terminal according to the RSTD.

2. The method according to claim 1, wherein the exchanging, with the terminal, the positioning capability information that the terminal supports the performing the positioning measurement according to the plurality of RATs comprises:
   carrying RAT request information in a message for requesting the terminal to report a capability, wherein the RAT request information is used to request the terminal to report the positioning capability information; and
   receiving the positioning capability information that is carried by the terminal in the reported capability information.

3. A positioning method comprising:
   exchanging, with a positioning server, positioning capability information that a terminal supports performing a positioning measurement according to a plurality of radio access techniques (RATs), to enable the positioning server to determine a first RAT whose load is the lightest among the plurality of RATs, including (a) receiving by the terminal RAT request information carried by the positioning server, which is included in a message to the terminal requesting the terminal report positioning capability information and (b) sending from the terminal and to the positioning server the positioning capability information;
   receiving a configuration of a positioning reference signal (PRS) notified by the positioning server,
      wherein the configuration of the PRS is determined by the positioning server according to cell subset information indicating a cell pair whose reference signal measured value difference exceeds a threshold, and instructs a base station to (a) transmit the PRS using the first RAT and (b) adjust the configuration of the PRS to reduce the reference signal measured value difference when it is greater than the threshold;
   obtaining a reference signal time difference (RSTD) through measurement according to the configuration of the PRS; and
   sending the RSTD to the positioning server.

4. A positioning server comprising a transceiver and a processor, wherein
   the transceiver is configured to exchange, with a terminal, positioning capability information that the terminal supports performing a positioning measurement according to a plurality of radio access techniques (RATs);
   the processor is configured to determine a first RAT whose load is the lightest among the plurality of RATs;
   the transceiver is configured to send allocation information to a base station and receive a configuration of a positioning reference signal (PRS) fed back by the base station, where the allocation information is (a) part of a message requesting the base station report the PRS configuration or (b) a dedicated message sent before the message requesting the base station report the PRS configuration,
  wherein the allocation information instructs the base station to (a) transmit the PRS to the terminal through the first RAT, and (b) adjust the configuration of the PRS by reducing a measured value of a reference signal of a cell pair when the measured value is greater than a threshold, where the cell pair is identified by cell subset information determined by the terminal;
the transceiver is configured to notify the terminal of the configuration of the PRS;
the transceiver is configured to receive a reference signal time difference (RSTD) that is obtained by the terminal through measurement according to the configuration of the PRS; and
the processor is configured to determine a location of the terminal according to the RSTD.

5. The positioning server according to claim 4, wherein the transceiver is configured to carry RAT request information in a message for requesting the terminal to report a capability, wherein the RAT request information is used to request the terminal to report the positioning capability information; and receive the positioning capability information that is carried by the terminal in reported capability information.

6. A terminal comprising a transceiver and a processor, wherein
  the transceiver is configured to exchange, with a positioning server, positioning capability information that the terminal supports performing a positioning measurement according to a plurality of radio access techniques (RATs), to enable the positioning server to determine a first RAT whose load is the lightest among the plurality of RATs;
the transceiver is configured to (a) receive a configuration of a positioning reference signal (PRS) notified by the positioning server and RAT request information carried by the positioning server, which is included in a message requesting the terminal report positioning capability information and (b) send to the positioning server the positioning capability information,
  wherein the configuration of the PRS is determined by the positioning server according to cell subset information indicating a cell pair whose reference signal measured value difference exceeds a threshold, and instructs a base station to (a) transmit the PRS using the first RAT, and (b) adjust a configuration of the PRS to reduce the reference signal measured value difference which is greater than the threshold;
the processor is configured to obtain a reference signal time difference (RSTD) through measurement according to the configuration of the PRS; and
the transceiver is configured to send the RSTD to the positioning server.

7. The method according to claim 6, wherein the transceiver is configured to receive RAT request information that is carried by the positioning server in a message for requesting the terminal to report a capability, wherein the RAT request information is used to request the terminal to report the positioning capability information; and carry the positioning capability information in capability information that is sent to the positioning server.

\* \* \* \* \*